US012469418B2

(12) United States Patent
Huang et al.

(10) Patent No.: US 12,469,418 B2
(45) Date of Patent: Nov. 11, 2025

(54) DRIVING CIRCUIT, DRIVING METHOD, DISPLAY SUBSTRATE, MANUFACTURING METHOD THEREOF AND DISPLAY DEVICE

(71) Applicants: CHENGDU BOE OPTOELECTRONICS TECHNOLOGY CO., LTD., Sichuan (CN); BOE TECHNOLOGY GROUP CO., LTD., Beijing (CN)

(72) Inventors: Yao Huang, Beijing (CN); Xing Yao, Beijing (CN); Tingliang Liu, Beijing (CN); Xilei Cao, Beijing (CN)

(73) Assignees: CHENGDU BOE OPTOELECTRONICS TECHNOLOGY CO., LTD., Sichuan (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 18/576,869

(22) PCT Filed: Feb. 27, 2023

(86) PCT No.: PCT/CN2023/078486
§ 371 (c)(1),
(2) Date: Jan. 5, 2024

(87) PCT Pub. No.: WO2024/178547
PCT Pub. Date: Sep. 6, 2024

(65) Prior Publication Data
US 2025/0006094 A1 Jan. 2, 2025

(51) Int. Cl.
*G09G 3/20* (2006.01)

(52) U.S. Cl.
CPC ....... *G09G 3/20* (2013.01); *G09G 2300/0426* (2013.01); *G09G 2330/08* (2013.01)

(58) Field of Classification Search
CPC ............ G09G 3/20; G09G 2300/0426; G09G 2330/08; G09G 3/3266; G11C 19/28
See application file for complete search history.

(56) References Cited

U.S. PATENT DOCUMENTS

| | | | | |
|---|---|---|---|---|
| 11,568,781 | B2 * | 1/2023 | Lai | G11C 19/28 |
| 11,893,918 | B2 * | 2/2024 | Qing | G09G 3/20 |
| 12,112,708 | B2 * | 10/2024 | Lai | G09G 3/3266 |
| 12,131,685 | B2 * | 10/2024 | Zhao | G09G 3/3266 |
| 12,236,897 | B2 * | 2/2025 | Yao | G09G 3/3266 |

(Continued)

FOREIGN PATENT DOCUMENTS

| | | | |
|---|---|---|---|
| CN | 104464657 | A | 3/2015 |
| CN | 105047155 | A | 11/2015 |

(Continued)

*Primary Examiner* — William Lu
(74) *Attorney, Agent, or Firm* — Muncy, Geissler, Olds & Lowe, P.C.

(57) ABSTRACT

A includes an output circuit and a first control circuit; the output circuit controls to connect or disconnect the driving signal terminal and the first voltage lines under the control of a potential of the first node; the first control circuit controls to connect or disconnect the first node and the second voltage line under the control of a potential of the second node; a potential of the first voltage signal is different from a potential of the second voltage signal.

14 Claims, 30 Drawing Sheets

(56) References Cited

U.S. PATENT DOCUMENTS

| | | | | |
|---|---|---|---|---|
| 2016/0343321 | A1 | 11/2016 | Xiao | |
| 2016/0358566 | A1* | 12/2016 | Li | G09G 3/3677 |
| 2017/0116926 | A1* | 4/2017 | Bong | G09G 3/3266 |
| 2017/0162154 | A1 | 6/2017 | Cao et al. | |
| 2017/0193960 | A1* | 7/2017 | Peng | G11C 19/28 |
| 2018/0033389 | A1 | 2/2018 | Li et al. | |
| 2018/0046048 | A1 | 2/2018 | Zhao | |
| 2018/0261164 | A1* | 9/2018 | Zhu | G11C 19/287 |
| 2018/0335814 | A1* | 11/2018 | Shao | G06F 1/24 |
| 2019/0073948 | A1* | 3/2019 | Wang | G09G 3/3225 |
| 2019/0304382 | A1* | 10/2019 | Gao | G09G 3/3685 |
| 2021/0193007 | A1* | 6/2021 | Cheng | G09G 3/3266 |
| 2021/0193025 | A1* | 6/2021 | Xu | G09G 3/3266 |
| 2021/0217341 | A1* | 7/2021 | Huang | G11C 19/28 |
| 2021/0217361 | A1* | 7/2021 | Feng | G09G 3/3233 |
| 2021/0225251 | A1 | 7/2021 | Xu et al. | |
| 2021/0241673 | A1 | 8/2021 | Liu et al. | |
| 2021/0287581 | A1* | 9/2021 | Zhang | G09G 3/20 |
| 2021/0327324 | A1* | 10/2021 | Wang | G09G 3/20 |
| 2021/0358381 | A1* | 11/2021 | Wang | G09G 3/3266 |
| 2021/0366354 | A1* | 11/2021 | Li | G09G 3/007 |
| 2021/0366408 | A1 | 11/2021 | In et al. | |
| 2022/0028323 | A1 | 1/2022 | In | |
| 2022/0223084 | A1* | 7/2022 | Lai | G09G 3/20 |
| 2022/0246100 | A1* | 8/2022 | Long | G09G 3/3266 |
| 2022/0246101 | A1* | 8/2022 | Long | G09G 3/3225 |
| 2023/0282145 | A1* | 9/2023 | Lai | G11C 19/28 345/214 |
| 2024/0221584 | A1* | 7/2024 | Li | G09G 3/32 |
| 2024/0379061 | A1* | 11/2024 | Huang | G11C 19/28 |

FOREIGN PATENT DOCUMENTS

| | | | |
|---|---|---|---|
| CN | 105469760 | A | 4/2016 |
| CN | 105609072 | A | 5/2016 |
| CN | 109427310 | A | 3/2019 |
| CN | 110164352 | A | 8/2019 |
| CN | 209265989 | U | 8/2019 |
| CN | 110956919 | A | 4/2020 |
| CN | 111243650 | A | 6/2020 |
| CN | 214541584 | U | 1/2021 |
| CN | 113707096 | A | 11/2021 |
| CN | 113724770 | A | 11/2021 |
| CN | 114842900 | A | 8/2022 |
| CN | 114842901 | A | 8/2022 |
| CN | 115631711 | A | 1/2023 |

* cited by examiner

DRIVING CIRCUIT, DRIVING METHOD, DISPLAY SUBSTRATE, MANUFACTURING METHOD THEREOF AND DISPLAY DEVICE

CROSS-REFERENCE TO RELATED APPLICATION

The present disclosure is the U.S. national phase of PCT Application No. PCT/CN2023/078486 filed on Feb. 27, 2023, which are incorporated herein by reference in their entireties.

TECHNICAL FIELD

The present disclosure relates to the field of display technology, in particular to a driving circuit, a driving method, a display substrate, a manufacturing method thereof and a display device.

BACKGROUND

In a related driving circuit, the output circuit controls to connect or disconnect the driving signal terminal and the first voltage line under the control of the potential of the first node. When the transistor included in the output circuit needs to be turned off, if the characteristics of the transistor drift, so that the transistor cannot be turned off correctly, the current leakage will occur.

SUMMARY

In one aspect, the present disclosure provides in some embodiments a driving circuit, including an output circuit and a first control circuit; wherein the output circuit is electrically connected to a first node, a first voltage line and a driving signal terminal, and is configured to control to connect or disconnect the driving signal terminal and the first voltage line under the control of a potential of the first node; the first control circuit is respectively electrically connected to a second node, a second voltage line and the first node, and is configured to control to connect or disconnect the first node and the second voltage line under the control of a potential of the second node; the first voltage line is configured to provide a first voltage signal, and the second voltage line is configured to provide a second voltage signal; a potential of the first voltage signal is different from a potential of the second voltage signal.

Optionally, the output circuit comprises an output transistor; a gate electrode of the output transistor is electrically connected to the first node, a first electrode of the output transistor is electrically connected to the first voltage line, and a second electrode of the output transistor is electrically connected to the driving signal terminal; a width-to-length ratio of the output transistor is less than a width-to-length ratio threshold; the width-to-length ratio threshold is greater than or equal to 34 and less than or equal to 45.

Optionally, the driving circuit further includes an output reset circuit; wherein the output reset circuit is electrically connected to the second node, the driving signal terminal and a third voltage line, and is configured to control to connect or disconnect the driving signal terminal and the third voltage line under the control of the potential of the second node.

Optionally, the driving circuit further includes a second control circuit; wherein the second control circuit is electrically connected to a control signal line, the second voltage line and the second node, and is configured to control to connect or disconnect the second node and the second voltage line under the control of a control signal provided by the control signal line.

Optionally, the driving circuit further includes a third node control circuit and a first node control circuit; wherein the third node control circuit is electrically connected to a first clock signal line, a fourth voltage line and the third node, and is configured to control to connect or disconnect the third node and the fourth voltage line under the control of a first clock signal provided by the first clock signal line; the first node control circuit is respectively electrically connected to a second clock signal line, the third node and the first node, and is configured to control the potential of the first node under the control of the potential of the third node and a second clock signal provided by the second clock signal line; the third voltage line is configured to provide a third voltage signal, and the fourth voltage line is configured to provide a fourth voltage signal; a potential of the third voltage signal is different from a potential of the fourth voltage signal.

Optionally, the third node control circuit is further electrically connected to the second node, and is configured to control to connect or disconnect the third node and the first clock signal line under the control of the potential of the second node; the first node control circuit is further electrically connected to the fourth node, and is configured to control to connect or disconnect the fourth node and the second clock signal line under the control of the potential of the third node, control a potential of the fourth node according to the potential of the third node, and control to connect or disconnect the fourth node and the first node under the control of the second clock signal provided by the second clock signal line, and maintain the potential of the first node.

Optionally, the driving circuit further includes a first on-off control circuit; wherein the third node control circuit is electrically connected to the first control node, and the first control node is electrically connected to the third node through the first on-off control circuit; a control terminal of the first on-off control circuit is electrically connected to a fifth voltage line, and the first on-off control circuit is configured to control to connect or disconnect the first control node and the third node under the control of a fifth voltage signal provided by the fifth voltage line; the fifth voltage line is the third voltage line, the fourth voltage line or the control voltage line; the control voltage line is configured to provide a control voltage, a voltage value of the control voltage is different from a voltage value of the third voltage signal, and the voltage value of the control voltage is different from a voltage value of the fourth voltage signal.

Optionally, the driving circuit further includes a second node control circuit; wherein the second node control circuit is respectively electrically connected to an input terminal, the first clock signal line and the second node, and is configured to control to connect or disconnect the second node and the input terminal under the control of the first clock signal provided by the first clock signal line.

Optionally, the driving circuit further includes a second on-off control circuit; wherein the second node control circuit is electrically connected to a second control node, and the second control node is electrically connected to the second node through the second on-off control circuit; a control terminal of the second on-off control circuit is electrically connected to a sixth voltage line, and the second on-off control circuit is configured to control to connect or disconnect the second control node and the second node under the control of a sixth voltage signal provided by the sixth voltage line; the sixth voltage line is the third voltage line, the fourth voltage line or the control voltage line; the control voltage line is configured to provide a control voltage, a voltage value of the control voltage is different from a voltage value of the third voltage signal, and the voltage value of the control voltage is different from a voltage value of the fourth voltage signal.

Optionally, the driving circuit further includes a third control circuit; wherein the third control circuit is electrically connected to the second node, a fifth node, the first control node, a seventh voltage line and the second clock signal line, and is configured to control to connect or disconnect the fifth node and the seventh voltage line under the control of the potential of the first control node, and control to connect or disconnect the fifth node and the second clock signal line under the control of the potential of the second node, and control the potential of the second node according to the potential of the fifth node; the seventh voltage line is the first voltage line or the second voltage line.

Optionally, the driving circuit further includes a third control circuit; wherein the third control circuit is electrically connected to a seventh voltage line, a sixth node, a seventh node, the first control node, the second clock signal line, an eighth voltage line, the first clock signal line, the input terminal and the second node respectively, is configured to control to connect or disconnect the sixth node and the seventh voltage line under the control of the potential of the first control node, and control to connect or disconnect the sixth node and the second clock signal line under the control of a potential of the seventh node, control the potential of the seventh node according to the potential of the sixth node; control to connect or disconnect the second node and the input terminal under the control of the potential of the seventh node, an eighth voltage signal provided by the eighth voltage line and the first clock signal provided by the first clock signal line; the seventh voltage line is the first voltage line or the second voltage line, and the eighth voltage line is the third voltage line or the fourth voltage line.

Optionally, the first control circuit comprises a first transistor; a gate electrode of the first transistor is electrically connected to the second node, a first electrode of the first transistor is electrically connected to the second voltage line, and a second electrode of the first transistor is electrically connected to the first node.

Optionally, the output reset circuit comprises an output reset transistor, and the second control circuit comprises a second transistor; a gate electrode of the output reset transistor is electrically connected to the second node, a first electrode of the output reset transistor is electrically connected to the driving signal terminal, and a second electrode of the output reset transistor is connected to the third voltage line; a gate electrode of the second transistor is electrically connected to the control signal line, a first electrode of the second transistor is electrically connected to the second voltage line, and a second electrode of the second transistor is electrically connected to the second node.

Optionally, the third node control circuit includes a third transistor and a fourth transistor, and the first node control circuit includes a fifth transistor, a sixth transistor, a first capacitor, and a second capacitor; a gate electrode of the third transistor is electrically connected to the first clock signal line, a first electrode of the third transistor is electrically connected to the fourth voltage line, and a second electrode of the third transistor is electrically connected to the third node; a gate electrode of the fourth transistor is electrically connected to the second node, a first electrode of the fourth transistor is electrically connected to the first clock signal line, and a second electrode of the fourth transistor is electrically connected to the third node; a gate electrode of the fifth transistor is electrically connected to the third node, a first electrode of the fifth transistor is electrically connected to the second clock signal line, a second electrode of the fifth transistor is electrically connected to the fourth node; a gate electrode of the sixth transistor is electrically connected to the second clock signal line, a first electrode of the sixth transistor is electrically connected to the fourth node, and a second electrode of the sixth transistor is electrically connected to the first node; a first electrode plate of the first capacitor is electrically connected to the third node, and a second electrode plate of the first capacitor is electrically connected to the fourth node; a first electrode plate of the second capacitor is electrically connected to the first node, and a second electrode plate of the second capacitor is electrically connected to the first voltage line.

Optionally, the first on-off control circuit comprises a seventh transistor; a gate electrode of the seventh transistor is electrically connected to the fifth voltage line, a first electrode of the seventh transistor is electrically connected to the first control node, and a second electrode of the seventh transistor is electrically connected to the third node.

Optionally, the second node control circuit comprises an eighth transistor; a gate electrode of the eighth transistor is electrically connected to the first clock signal line, a first electrode of the eighth transistor is electrically connected to the input terminal, and a second electrode of the eighth transistor is electrically connected to the second node.

Optionally, the second on-off control circuit comprises a ninth transistor; a gate electrode of the ninth transistor is electrically connected to the sixth voltage line, a first electrode of the ninth transistor is electrically connected to the second control node, and a second electrode of the ninth transistor is electrically connected to the second node.

Optionally, the third control circuit comprises a tenth transistor, an eleventh transistor and a third capacitor; a gate electrode of the tenth transistor is electrically connected to the first control node, a first electrode of the tenth transistor is electrically connected to the seventh voltage line, and a second electrode of the tenth transistor is electrically connected to the fifth node; a gate electrode of the eleventh transistor is electrically connected to the second node, a first electrode of the eleventh transistor is electrically connected to the fifth node, and a second electrode of the eleventh transistor is electrically connected to the second clock signal line; a first electrode plate of the third capacitor is electrically connected to the second node, and the second electrode plate of the third capacitor is electrically connected to the fifth node.

Optionally, the third control circuit includes a tenth transistor, an eleventh transistor, a third capacitor, a twelfth transistor, a thirteenth transistor, and a fourteenth transistor; a gate electrode of the tenth transistor is electrically connected to the first control node, a first electrode of the tenth transistor is electrically connected to the seventh voltage line, and a second electrode of the tenth transistor is electrically connected to the sixth node; a gate electrode of the eleventh transistor is electrically connected to the seventh node, a first electrode of the eleventh transistor is electrically connected to the sixth node, a second electrode of the eleventh transistor is electrically connected to the second clock signal line; a first electrode plate of the third capacitor is electrically connected to the seventh node, and a second electrode plate of the third capacitor is electrically connected to the sixth node; a gate electrode of the twelfth transistor is electrically connected to the first clock signal line, a first electrode of the twelfth transistor is electrically connected to the input terminal, and a second electrode of the twelfth transistor is electrically connected to a first electrode of the thirteen transistor; a gate electrode of the thirteenth transistor is electrically connected to the eighth voltage line, and a second electrode of the thirteenth transistor is electrically connected to a first electrode of the fourteenth transistor; a gate electrode of the fourteenth transistor is electrically connected to the seventh node, and a second electrode of the fourteenth transistor is electrically connected to the second node.

In a second aspect, an embodiment of the present disclosure provides a driving method applied to the driving circuit, includes: when the first control circuit controls to connect the first node and the second voltage line under the control of the potential of the second node, controlling, by the output circuit, to disconnect the driving signal terminal from the first voltage line under the control of the potential of the first node.

In a third aspect, an embodiment of the present disclosure provides a display substrate, including a base substrate, and the driving circuit arranged on the base substrate.

Optionally, the driving circuit comprises an output circuit and an output reset circuit; the output circuit comprises an output transistor, and the output reset circuit comprises an output reset transistor; a width-to-length ratio of the output transistor is smaller than a width-to-length ratio of a channel of the output reset transistor.

Optionally, the display substrate further includes a first voltage line arranged on the base substrate; the driving circuit includes an output circuit and an output reset circuit; the output circuit and the output reset circuit are arranged on a side of the first voltage line close to the display area; at least part of circuits included in the driving circuit other than the output circuit and the output reset circuit are arranged on a side of the first voltage line away from the display area.

Optionally, the display substrate further includes a second voltage line, a third voltage line and a fourth voltage line arranged on the base substrate; wherein a part of the third voltage line extending along a first direction is arranged on the side of the first voltage line close to the display area; the output circuit and the output reset circuit are arranged along a first direction; the second voltage line is arranged between the first voltage line and the at least part of circuits included in the driving circuit other than the output circuit and the output reset circuit; the fourth voltage line is arranged on a side of the at least part of circuits included in the driving circuit other than the output circuit and the output reset circuit away from the display area.

Optionally, the driving circuit further includes a first control circuit, a third node control circuit, a first node control circuit, a first on-off control circuit, a second node control circuit, a second on-off control circuit and a third control circuit; the first control circuit includes a first transistor; the third node control circuit includes a third transistor and a fourth transistor, and the first node control circuit includes a fifth transistor, a sixth transistor, a first capacitor, and a second capacitor; the first on-off control circuit includes a seventh transistor; the second node control circuit includes an eighth transistor; the second on-off control circuit includes a ninth transistor; the third control circuit includes a tenth transistor, an eleventh transistor and a third capacitor; the first direction intersects a second direction; the sixth transistor and the eleventh transistor are arranged along the first direction; the first transistor and the tenth transistor are arranged along the first direction; the third transistor and the eighth transistor are arranged along the second direction; the ninth transistor and the seventh transistor are arranged along the second direction; the fourth transistor and the first transistor are arranged along the second direction; the first capacitor is arranged between the eighth transistor and the sixth transistor; the third capacitor is arranged on a side of the eleventh transistor away from the sixth transistor; an orthographic projection of the first electrode plate of the second capacitor on the base substrate, an orthographic projection of the second electrode plate of the second capacitor on the base substrate at least partially overlap an orthographic projection of the first voltage line on the base substrate.

Optionally, the driving circuit further comprises a second control circuit; the second control circuit comprises a second transistor; the second transistor is arranged between the first capacitor and the third capacitor; the first capacitor, the second transistor and the third capacitor are arranged along the first direction.

Optionally, the driving circuit further includes a first control circuit, a third node control circuit, a first node control circuit, a first on-off control circuit, a second node control circuit, a second on-off control circuit and a third control circuit; the first control circuit includes a first transistor; the third node control circuit includes a third transistor and a fourth transistor, and the first node control circuit includes a fifth transistor, a sixth transistor, a first capacitor, and a second capacitor; the first on-off control circuit includes a seventh transistor; the second node control circuit includes an eighth transistor; the second on-off control circuit includes a ninth transistor; the third control circuit includes a tenth transistor, an eleventh transistor and a third capacitor; the first direction intersects with a second direction; the sixth transistor, the first transistor, and the tenth transistor are arranged along the first direction; the ninth transistor and the seventh transistor are arranged along the second direction; the first capacitor and the sixth transistor are arranged along the second direction; the eighth transistor and the fifth transistor are arranged along the second direction; the fourth transistor and the first transistor are arranged along the second direction; the eleventh transistor and the third capacitor are arranged along the first direction; an orthographic projection of the first electrode plate of the second capacitor on the base substrate, an orthographic projection of the second electrode plate of the second capacitor on the base substrate at least partially overlap an orthographic projection of the first voltage line on the base substrate; and/or, the orthographic projection of the first electrode plate of the second capacitor on the base substrate, the orthographic projection of the second electrode plate of the second capacitor on the base substrate at least partially overlap an orthographic projection of the second voltage line on the base substrate.

Optionally, an orthographic projection of the first electrode plate of the third capacitor on the base substrate, an orthographic projection of the second electrode plate of the third capacitor on the base substrate at least partially overlap an orthographic projection of the first voltage line on the base substrate; the orthographic projection of the first electrode plate of the third capacitor on the base substrate, the orthographic projection of the second electrode plate of the third capacitor on the base substrate at least partially overlap the orthographic projection of the second voltage line on the base substrate.

Optionally, the driving circuit further comprises a second control circuit; the second control circuit comprises a second transistor; the second transistor is arranged on a side of the eleventh transistor away from the second capacitor.

Optionally, a gate electrode of the second transistor is electrically connected to a control signal line, and the control signal line is arranged on a side of the fourth voltage line away from the display area.

Optionally, the display substrate further includes a second voltage line, a third voltage line, a fourth voltage line and a control signal line arranged on the base substrate; wherein the control signal line, the second voltage line, the fourth voltage line and the third voltage line are arranged on a side of the first voltage line away from the display area; the first voltage line, the control signal line, the second voltage line, the fourth voltage line and the third voltage line are arranged in sequence along a direction away from the display area; the first voltage line, the control signal line and the third voltage line are arranged on a same layer, the second voltage line and the fourth voltage line are arranged on a same layer, and the first voltage line and the second voltage line are arranged on different layers; at least part of circuits included in the driving circuit other than the output circuit and the output reset circuit are arranged between the control signal line and the third voltage line.

Optionally, the driving circuit further includes a first control circuit, a second control circuit, a third node control circuit, a first node control circuit, a first on-off control circuit, a second node control circuit, a second on-off control circuit and a third control circuit; the first control circuit includes a first transistor; the second control circuit includes a second transistor; the third node control circuit includes a third transistor and a fourth transistor, and the first node control circuit includes a fifth transistor, a sixth transistor, a first capacitor, and a second capacitor; the first on-off control circuit includes a seventh transistor; the second node control circuit includes an eighth transistor; the second on-off control circuit includes a ninth transistor; the third control circuit includes a tenth transistor, an eleventh transistor, a third capacitor, a twelfth transistor, a thirteenth transistor, and a fourteenth transistor; the first direction intersects the second direction; the eighth transistor, the third transistor and the eleventh transistor are arranged along the first direction; the sixth transistor, the first transistor, the tenth transistor, and the ninth transistor are arranged along the first direction; the twelfth transistor and the thirteenth transistor are arranged along the first direction; a gate electrode of the fourth transistor and a gate electrode of the seventh transistor are arranged along the first direction; a gate electrode of the eighth transistor and a gate electrode of the fifth transistor are arranged along the second direction; a gate electrode of the thirteenth transistor and a gate electrode of the seventh transistor are arranged along the second direction; the fifth transistor, the second transistor and the fourteenth transistor are arranged along the first direction; the first capacitor and the third capacitor are arranged along the first direction; the second capacitor is arranged on a side of the first voltage line close to the display area.

Optionally, an orthographic projection of the first electrode plate of the third capacitor on the base substrate, an orthographic projection of the second electrode plate of the third capacitor on the base substrate at least partially overlap an orthographic projection of the fourth voltage line on the base substrate.

Optionally, an active layer pattern of the eighth transistor, an active layer pattern of the third transistor, an active layer pattern of the eleventh transistor, an active layer pattern of the sixth transistor, an active layer pattern of the first transistor, an active layer pattern of the tenth transistor and an active layer pattern of the ninth transistor are arranged in a same layer, and an active layer of the eighth transistor and the second voltage line are arranged at different layers; an orthographic projection of the active layer pattern of the eighth transistor on the base substrate at least partially overlaps an orthographic projection of the fourth voltage line on the base substrate, and an orthographic projection of the active layer pattern of the third transistor on the base substrate at least partially overlaps the orthographic projection of the fourth voltage line on the base substrate, and an orthographic projection of the active layer pattern of the eleventh transistor on the base substrate at least partially overlaps the orthographic projection of the fourth voltage line on the base substrate; an orthographic projection of the active layer pattern of the sixth transistor on the base substrate at least partially overlaps an orthographic projection of the second voltage line on the base substrate, and an orthographic projection of the active layer pattern of the first transistor on the base substrate at least partially overlaps the orthographic projection of the second voltage line on the base substrate, and an orthographic projection of the active layer pattern of the tenth transistor on the base substrate at least partially overlaps the orthographic projection of the second voltage line on the base substrate, and an orthographic projection of the active layer pattern of the ninth transistor on the base substrate at least partially overlaps the orthographic projection of the second voltage line on the base substrate.

In a fourth aspect, an embodiment of the present disclosure provides a method for manufacturing a display substrate, comprising: forming a base substrate; forming the driving circuit on the base substrate.

In a fifth aspect, an embodiment of the present disclosure provides a display device including the display substrate.

BRIEF DESCRIPTION OF THE DRAWINGS

FIG. 11B is a schematic diagram of the relationship between the voltage difference and the width of the channel of To;

DETAILED DESCRIPTION

The following will clearly and completely describe the technical solutions in the embodiments of the present disclosure with reference to the accompanying drawings. Obviously, the described embodiments are only some of the embodiments of the present disclosure, not all of them. Based on the embodiments in the present disclosure, all other embodiments obtained by those ordinary skill in the art without making creative work belong to the protection scope of the present disclosure.

The transistors used in all the embodiments of the present disclosure may be thin film transistors or field effect transistors or other devices with the same characteristics. In the embodiments of the present disclosure, in order to distinguish the two electrodes of the transistor except the control electrode, one electrode is called the first electrode, and the other electrode is called the second electrode.

In actual operation, when the transistor is a thin film transistor or a field effect transistor, the control electrode may be a gate electrode, the first electrode may be a drain electrode, and the second electrode may be a source electrode; or, the control electrode may be a gate electrode, the first electrode may be a source electrode, and the second electrode may be a drain electrode.

Figure 1:
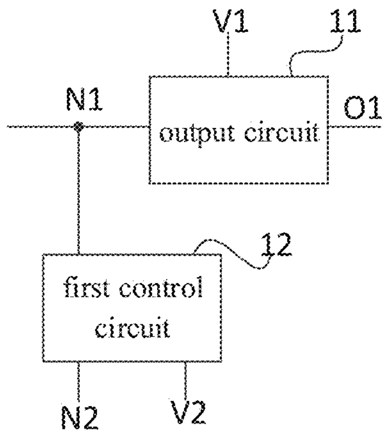
FIG. 1 is a structural diagram of a driving circuit according to at least one embodiment of the present disclosure.

As shown in FIG. 1, the driving circuit described in the embodiment of the present disclosure includes an output circuit 11 and a first control circuit 12;

The output circuit 11 is electrically connected to a first node N1, a first voltage line V1 and a driving signal terminal O1, and is configured to control to connect or disconnect the driving signal terminal O1 and the first voltage lines V1 under the control of a potential of the first node N1;

The first control circuit 12 is respectively electrically connected to a second node N2, a second voltage line V2 and the first node N1, and is configured to control to connect or disconnect the first node and the second voltage line V2 under the control of a potential of the second node N2;

The first voltage line V1 is configured to provide a first voltage signal, and the second voltage line V2 is configured to provide a second voltage signal; a potential of the first voltage signal is different from a potential of the second voltage signal.

When the driving circuit described in the embodiment of the present disclosure is working, when the first control circuit 12 controls to write the second voltage signal provided by the second voltage line V2 into the first node N1 under the control of the potential of the second node N2, the output circuit 11 controls to disconnect the driving signal terminal O1 from the first voltage line V1 under the control of the potential of the first node N1, so that when the transistor included in the output circuit 11 needs to be turned off, even if the characteristics of the transistor drift, and the transistor can also be turned off without incurring the current leakage.

Optionally, the first voltage line is a first high voltage line, and the second voltage line is a second high voltage line; when the transistors included in the output circuit 11 are p-type transistors, the voltage value of the first high voltage signal provided by the first high voltage line may be smaller than the voltage value of the second high voltage signal provided by the second high voltage line.

In at least one embodiment of the present disclosure, by setting the potential of the first voltage signal and the potential of the second voltage signal to be different, the width-to-length ratio of the transistors included in the output circuit can be reduced, thereby saving the layout space.

Optionally, the output circuit includes an output transistor;

A gate electrode of the output transistor is electrically connected to the first node, a first electrode of the output transistor is electrically connected to the first voltage line, and a second electrode of the output transistor is electrically connected to the driving signal terminal;

The width-to-length ratio of the output transistor is less than a width-to-length ratio threshold;

The width-to-length ratio threshold is greater than or equal to 34 and less than or equal to 45.

In at least one embodiment of the present disclosure, the width-to-length ratio threshold may be, for example, greater than or equal to 34 and less than or equal to 45, but is not limited thereto. During actual operation, the width-to-length ratio threshold may be selected according to actual conditions.

The driving circuit described in at least one embodiment of the present disclosure further includes an output reset circuit;

The output reset circuit is electrically connected to the second node, the driving signal terminal and a third voltage line, and is configured to control to connect or disconnect the driving signal terminal and the third voltage line under the control of the potential of the second node.

In a specific implementation, the driving circuit may further include an output reset circuit, and the output reset circuit controls to connect or disconnect the driving signal terminal and the third voltage line under the control of the potential of the second node.

Optionally, the third voltage line may be the first low voltage line.

Figure 2:
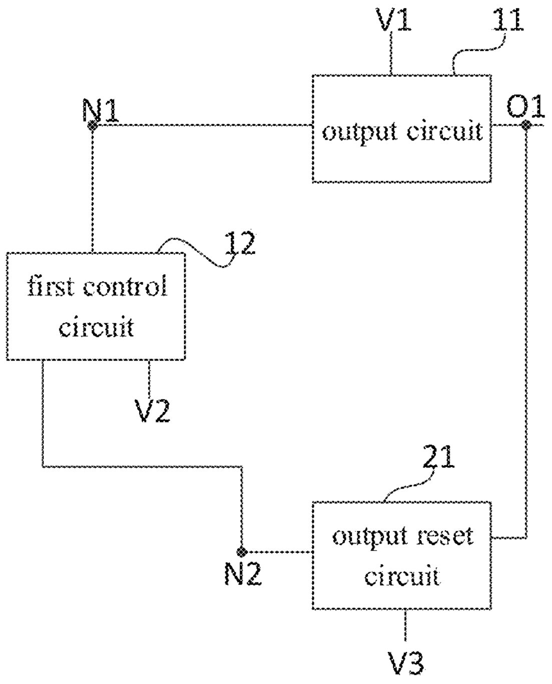
FIG. 2 is a structural diagram of a driving circuit according to at least one embodiment of the present disclosure.

As shown in FIG. 2, on the basis of the embodiment of the driving circuit shown in FIG. 1, at least one embodiment of the driving circuit further includes an output reset circuit 21;

The output reset circuit 21 is electrically connected to the second node N2, the driving signal terminal O1 and the third voltage line V3, and is configured to control to connect or disconnect the driving signal terminal O1 and the third voltage line V3 under the control of the potential of the second node N2.

The driving circuit described in at least one embodiment of the present disclosure further includes a second control circuit;

The second control circuit is electrically connected to a control signal line, the second voltage line and the second node, and is configured to control to connect or disconnect the second node and the voltage line under the control of the control signal provided by the control signal line.

In a specific implementation, the driving circuit may further include a second control circuit, and the second control circuit controls to connect or disconnect the second node and the second voltage line under the control of the control signal.

Figure 3:
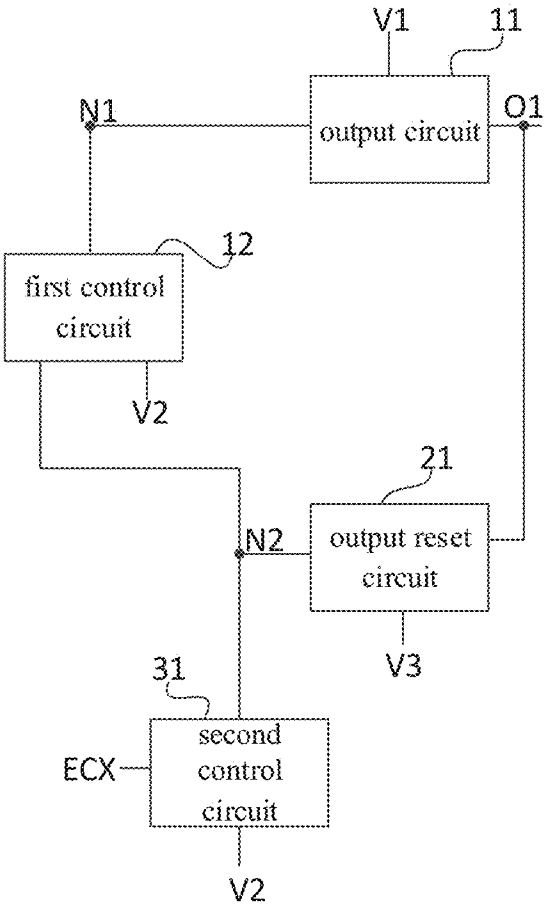
FIG. 3 is a structural diagram of a driving circuit according to at least one embodiment of the present disclosure.

As shown in FIG. 3, on the basis of at least one embodiment of the driving circuit shown in FIG. 2, the driving circuit described in at least one embodiment of the present disclosure further includes a second control circuit 31;

The second control circuit 31 is electrically connected to the control signal line ECX, the second voltage line V2 and the second node N2, and is configured to control to connect or disconnect the second node N2 and the second voltage line V2 under the control of the control signal provided by the control signal line ECX.

When at least one embodiment of the driving circuit shown in FIG. 3 of the present disclosure is working, the second control circuit 31 writes the second voltage signal provided by the second voltage line V2 into the second node N2 under the control of the control signal; the first control circuit 12 controls to write the second voltage signal provided by the second voltage line V2 into the first node N1 under the control of the potential of the second node N2.

In at least one embodiment of the present disclosure, the second control circuit may not be electrically connected to the second voltage line, but electrically connected to the first voltage line. At this time, the second control circuit controls to connect or disconnect the second node and the first voltage line under the control of the control signal.

In at least one embodiment of the present disclosure, the driving circuit further includes a third node control circuit and a first node control circuit;

The third node control circuit is electrically connected to the first clock signal line, the fourth voltage line and the third node, and is configured to control to connect or disconnect the third node and the fourth voltage line under the control of the first clock signal provided by the first clock signal line;

The first node control circuit is respectively electrically connected to the second clock signal line, the third node and the first node, and is configured to control the potential of the first node under the control of the potential of the third node and the second clock signal provided by the second clock signal line;

The third voltage line is configured to provide a third voltage signal, and the fourth voltage line is configured to provide a fourth voltage signal;

A potential of the third voltage signal is different from a potential of the fourth voltage signal.

In a specific implementation, the driving circuit further includes a third node control circuit and a first node control circuit, and the third node control circuit controls to write the fourth voltage signal provided by the fourth voltage line into the third node under the control of the first clock signal, the first node control circuit controls the potential of the first node under the control of the potential of the third node and the second clock signal.

Optionally, the third voltage signal may be a first low voltage signal, and the fourth voltage signal may be a second low voltage signal, but not limited thereto.

In at least one embodiment of the present disclosure, an absolute value of the first low voltage signal may be smaller than an absolute value of the second low voltage signal, and the absolute value of the voltage value of the first low voltage signal may be greater than or equal to −20V and less than equal to 0V, the absolute value of the voltage value of the second low voltage signal may be greater than or equal to −20V and less than or equal to 0V.

Figure 4:
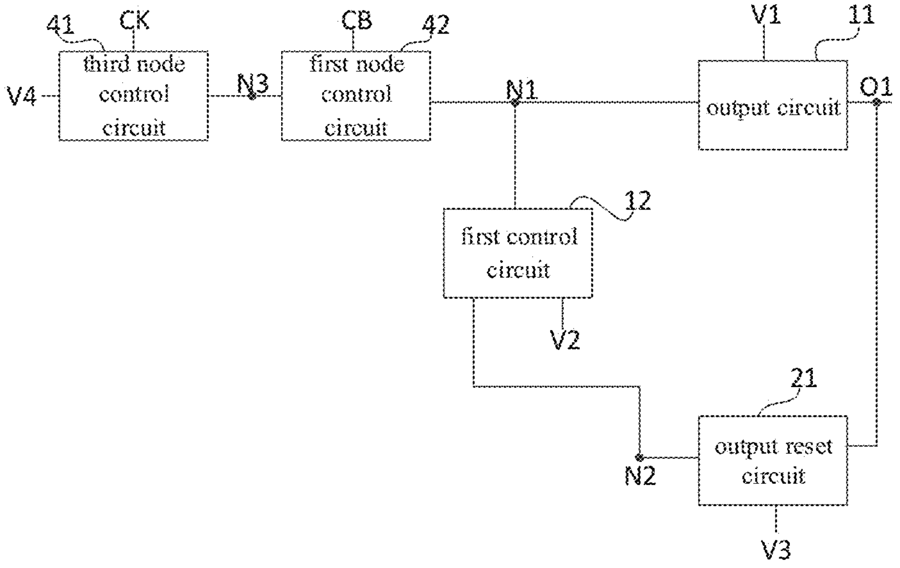
FIG. 4 is a structural diagram of a driving circuit according to at least one embodiment of the present disclosure.

As shown in FIG. 4, on the basis of at least one embodiment of the driving circuit shown in FIG. 2, the driving circuit further includes a third node control circuit 41 and a first node control circuit 42;

The third node control circuit 41 is electrically connected to a first clock signal line CK, a fourth voltage line V4 and a third node N3 respectively, and is configured to control to connect or disconnect the third node N3 and the fourth voltage line V4 under the control of the first clock signal provided by the first clock signal line CK;

The first node control circuit 42 is electrically connected to the second clock signal line CB, the third node N3 and the first node N1 respectively, and is configured to control the potential of the first node N1 under the control of the potential of the third node N3 and the second clock signal provided by the second clock signal line CB;

The third voltage line V3 is configured to provide a third voltage signal, and the fourth voltage line V4 is configured to provide a fourth voltage signal;

A potential of the third voltage signal is different from a potential of the fourth voltage signal.

In at least one embodiment of the present disclosure, the third node control circuit is further electrically connected to the second node, and is configured to control to connect or disconnect the third node and the first clock signal line under the control of the potential of the second node;

The first node control circuit is also electrically connected to the fourth node, and is configured to control to connect or disconnect the fourth node and the second clock signal line under the control of the potential of the third node. The potential of the fourth node is controlled according to the potential of the third node, and the fourth node and the first node are controlled to be connect or disconnect from each other under the control of the second clock signal provided by the second clock signal line, and the potential of the first node is maintained.

During specific implementation, the third node control circuit also controls to write the first clock signal provided by the first clock signal line into the third node under the control of the potential of the second node, and the first node control circuit controls the potential of the fourth node according to the potential of the third node, and the fourth node is controlled to be connected to the first node under the control of the second clock signal, to maintain the potential of the first node.

Figure 5:
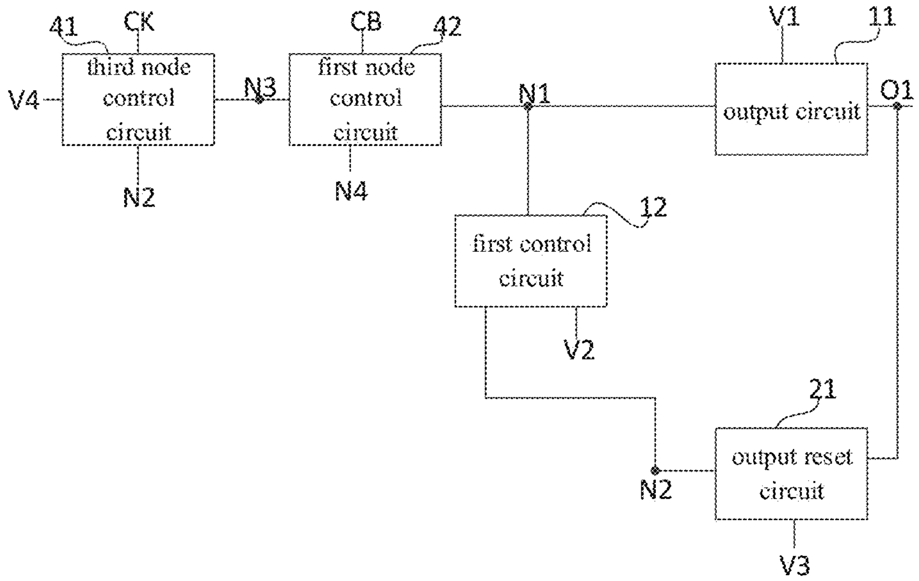
FIG. 5 is a structural diagram of a driving circuit according to at least one embodiment of the present disclosure.

As shown in FIG. 5, on the basis of at least one embodiment of the driving circuit shown in FIG. 4, the third node control circuit 41 is also electrically connected to the second node N2, control to connect or disconnect the third node N3 and the first clock signal line CK under the control of the potential of the second node N2;

The first node control circuit 42 is also electrically connected to the fourth node N4, and is configured to control to connect or disconnect the fourth node N4 and the second clock signal line CB under the control of the potential of the third node N3, control the potential of the fourth node N4 according to the potential of the third node N3, and control to connect or disconnect the fourth node N4 and the first node N1 under the control of the second clock signal provided by the second clock signal line CB, and maintain the potential of the first node N1.

The driving circuit described in at least one embodiment of the present disclosure further includes a first on-off control circuit;

The third node control circuit is electrically connected to the first control node, and the first control node is electrically connected to the third node through the first on-off control circuit;

A control terminal of the first on-off control circuit is electrically connected to a fifth voltage line, and the first on-off control circuit is configured to control to connect or disconnect the first control node and the third node under the control of the fifth voltage signal provided by the fifth voltage line;

The fifth voltage line is a third voltage line, a fourth voltage line or a control voltage line;

The control voltage line is configured to provide a control voltage, the voltage value of the control voltage is different from the voltage value of the third voltage signal, and the voltage value of the control voltage is different from the voltage value of the fourth voltage signal.

In a specific implementation, the driving circuit may include a first on-off control circuit, and the first on-off control circuit controls to connect or disconnect the first control node and the third node under the control of the fifth voltage signal.

In at least one embodiment of the present disclosure, the control voltage line may be a third low voltage line, but not limited thereto.

Figure 6:
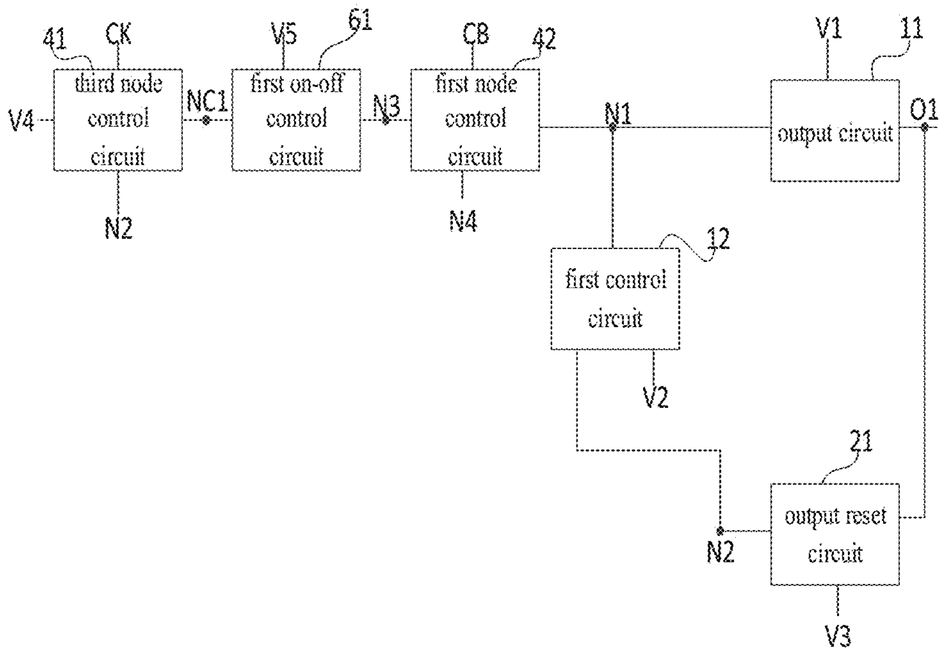
FIG. 6 is a structural diagram of a driving circuit according to at least one embodiment of the present disclosure.

As shown in FIG. 6, on the basis of at least one embodiment of the driving circuit shown in FIG. 5, the driving circuit described in at least one embodiment of the present disclosure further includes a first on-off control circuit 61;

The third node control circuit 41 is electrically connected to the first control node NC1, and the first control node NC1 is electrically connected to the third node N3 through the first on-off control circuit 61;

A control terminal of the first on-off control circuit 61 is electrically connected to the fifth voltage line V5, and the first on-off control circuit 61 is configured to control to connect or disconnect the first control node NC1 and the third node N3 under the control of the fifth voltage signal provided by the fifth voltage line V5;

The driving circuit described in at least one embodiment of the present disclosure further includes a second node control circuit;

The second node control circuit is respectively electrically connected to an input terminal, the first clock signal line and the second node, and is configured to control to connect or disconnect the second node and the input terminal under the control of the first clock signal provided by the first clock signal line.

In a specific implementation, the driving circuit may further include a second node control circuit, and the second node control circuit controls to connect or disconnect the second node and the input terminal under the control of the first clock signal.

Figure 7:
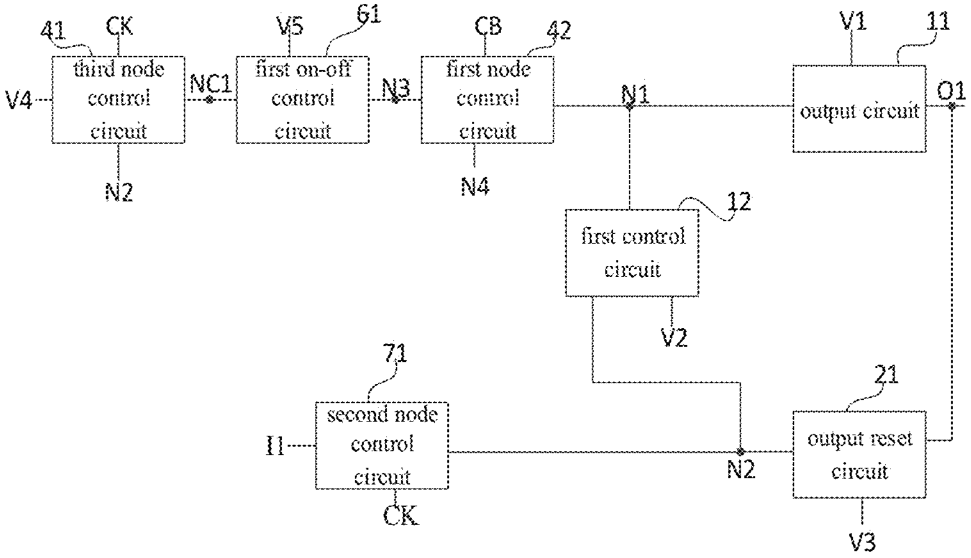
FIG. 7 is a structural diagram of a driving circuit according to at least one embodiment of the present disclosure.

As shown in FIG. 7, on the basis of at least one embodiment of the driving circuit shown in FIG. 6, the driving circuit described in at least one embodiment of the present disclosure further includes a second node control circuit 71;

The second node control circuit 71 is electrically connected to the input terminal I1, the first clock signal line CK and the second node N2, and is configured to control to connect or disconnect the second node N2 and the input terminal I1 under the control of the first clock signal provided by the first clock signal line CK.

In at least one embodiment of the present disclosure, the driving circuit further includes a second on-off control circuit;

The second node control circuit is electrically connected to a second control node, and the second control node is electrically connected to the second node through the second on-off control circuit;

A control terminal of the second on-off control circuit is electrically connected to a sixth voltage line, and the second on-off control circuit is configured to control to connect or disconnect the second control node and the second node under the control of the sixth voltage signal provided by the sixth voltage line;

The sixth voltage line is a third voltage line, a fourth voltage line or a control voltage line;

The control voltage line is configured to provide a control voltage, the voltage value of the control voltage is different from the voltage value of the third voltage signal, and the voltage value of the control voltage is different from the voltage value of the fourth voltage signal.

In a specific implementation, the driving circuit may further include a second on-off control circuit, and the second on-off control circuit controls to connect or disconnect the second control node and the second node under the control of the sixth voltage signal.

In at least one embodiment of the present disclosure, the control voltage line may be a third low voltage line, but not limited thereto.

Figure 8:
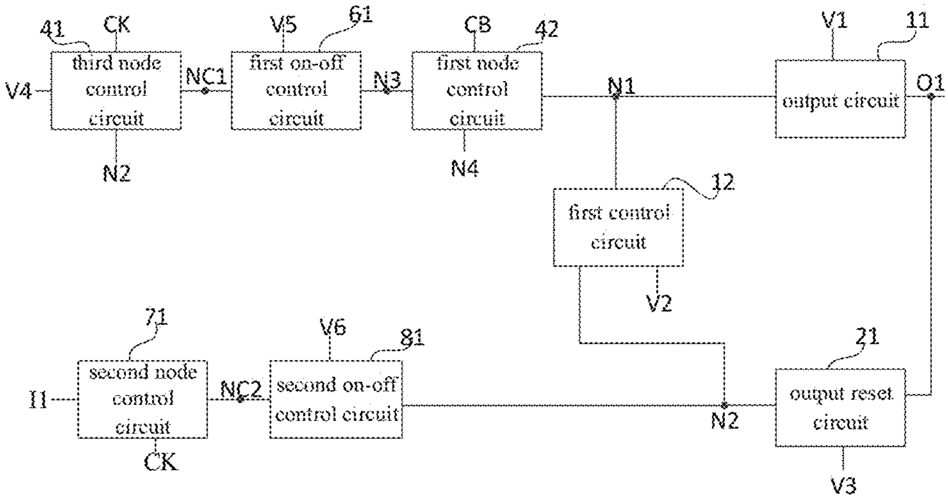
FIG. 8 is a structural diagram of a driving circuit according to at least one embodiment of the present disclosure.

As shown in FIG. 8, on the basis of at least one embodiment of the driving circuit shown in FIG. 7, the driving circuit described in at least one embodiment of the present disclosure further includes a second on-off control circuit 81;

The second node control circuit 71 is electrically connected to the second control node NC2, and the second control node NC2 is electrically connected to the second node N2 through the second on-off control circuit 81;

A control terminal of the second on-off control circuit 81 is electrically connected to the sixth voltage line V6, and the second on-off control circuit 81 is configured to control to connect or disconnect the second control node NC2 and the second node N2 under the control of the sixth voltage signal provided by the sixth voltage line V6;

In at least one embodiment of the present disclosure, the driving circuit further includes a third control circuit;

The third control circuit is electrically connected to the second node, the fifth node, the first control node, the seventh voltage line and the second clock signal line, and is configured to control to connect or disconnect the fifth node and the seventh voltage line under the control of the potential of the first control node, and control to connect or disconnect the fifth node and the second clock signal line under the control of the potential of the second node, and control the potential of the second node according to the potential of the fifth node;

The seventh voltage line is the first voltage line or the second voltage line.

In specific implementation, the driving circuit may further include a third control circuit, and the third control circuit controls to connect or disconnect the fifth node and the seventh voltage line under the control of the potential of the first control node, the third control circuit controls to connect or disconnect the fifth node and the second clock signal line under the control of the potential of the second node, and the third control circuit controls to connect or disconnect the fifth node and the second clock signal line under the control of the potential of the second node, and the third control circuit controls the potential of the second node according to the potential of the fifth node.

Figure 9:
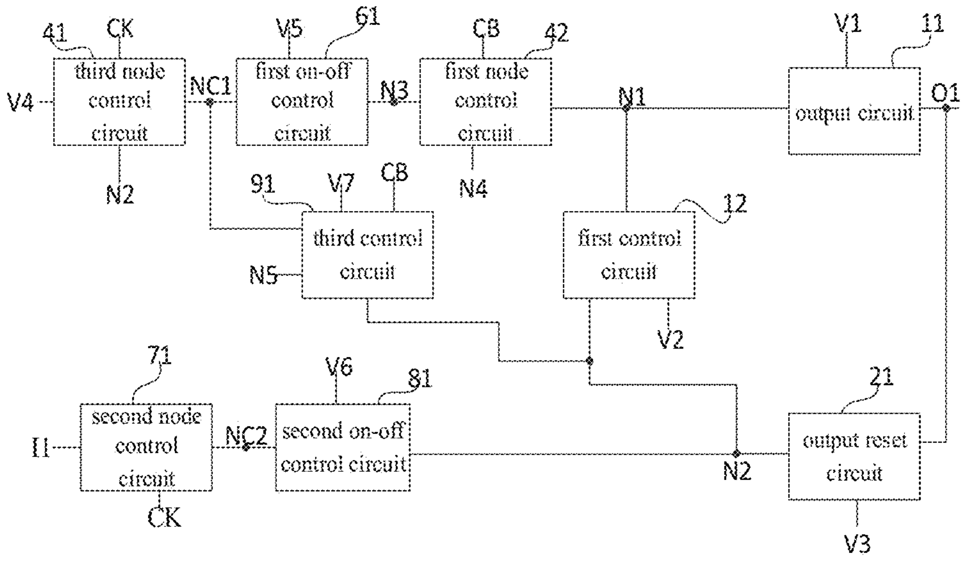
FIG. 9 is a structural diagram of a driving circuit according to at least one embodiment of the present disclosure.

As shown in FIG. 9, on the basis of at least one embodiment of the driving circuit shown in FIG. 8, the driving circuit described in at least one embodiment of the present disclosure further includes a third control circuit 91;

The third control circuit 91 is electrically connected to the second node N2, the fifth node N5, the first control node NC1, the seventh voltage line V7, and the second clock signal line CB, and is configured to control to connect or disconnect the fifth node N5 and the seventh voltage line V7 under the control of the potential of the first control node NC1, control to connect or disconnect the fifth node N5 and the second clock signal line CB under the control of the potential of the second node N2, and control the potential of the second node N2 according to the potential of the fifth node N5.

The driving circuit described in at least one embodiment of the present disclosure further includes a third control circuit;

The third control circuit is electrically connected to a seventh voltage line, a sixth node, a seventh node, the first control node, the second clock signal line, an eighth voltage line, the first clock signal line, the input terminal and the second node respectively, is configured to control to connect or disconnect the sixth node and the seventh voltage line under the control of the potential of the first control node, and control to connect or disconnect the sixth node and the seventh voltage line under the control of the potential of the seventh node, control the potential of the seventh node according to the potential of the sixth node; control to connect or disconnect the second node and the input terminal under the control of the potential of the seventh node, an eighth voltage signal provided by the eighth voltage line and the first clock signal provided by the first clock signal line;

The seventh voltage line is the first voltage line or the second voltage line, and the eighth voltage line is the third voltage line or the fourth voltage line.

During specific implementation, the driving circuit may further include a third control circuit, and the third control circuit controls to connect or disconnect the sixth node and the seventh voltage line under the control of the potential of the first control node, control to connect or disconnect the sixth node and the second clock signal line under the control of the potential of the seventh node, control the potential of the seventh node according to the potential of the sixth node, and control to connect or disconnect the second node and the input terminal under the control of the potential of the seventh node, the eighth voltage signal and the first clock signal.

Figure 10:
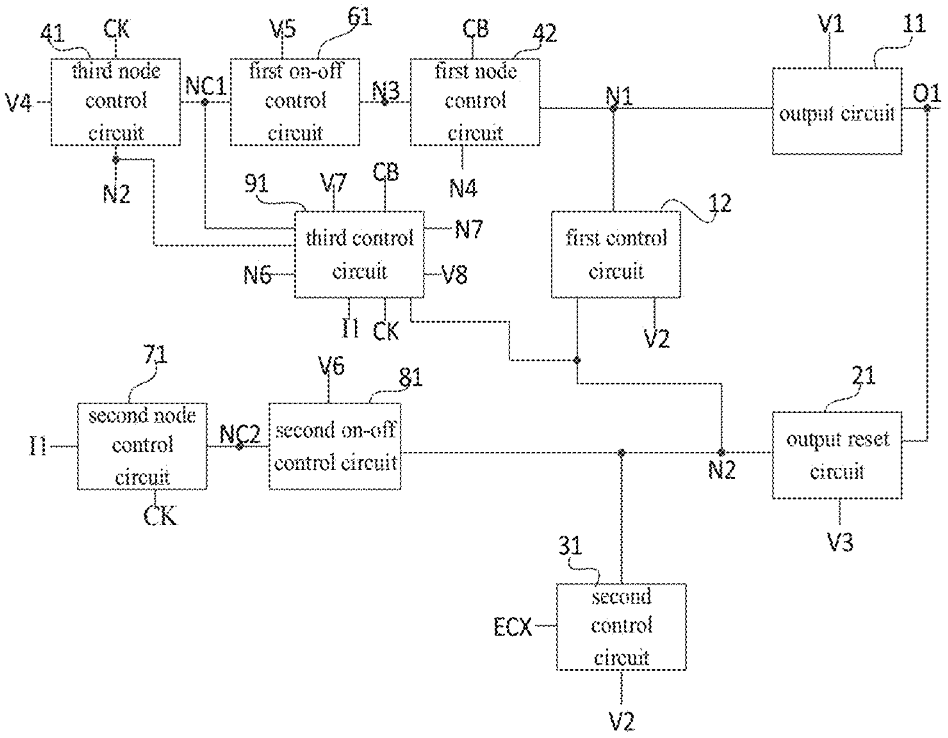
FIG. 10 is a structural diagram of a driving circuit according to at least one embodiment of the present disclosure.

As shown in FIG. 10, on the basis of at least one embodiment of the driving circuit shown in FIG. 8, the driving circuit described in at least one embodiment of the present disclosure further includes a second control circuit 31 and a third control circuit 91;

The second control circuit 31 is electrically connected to the control signal line ECX, the second voltage line V2 and the second node N2, and is configured to control to connect or disconnect the second node N2 and the second voltage line V2 under the control of the control signal provided by the control signal line ECX;

The third control circuit 91 is respectively connected to the seventh voltage line V7, the sixth node N6, the seventh node N7, the first control node NC1, the second clock signal line CB, the eighth voltage line V8, the first clock signal line CK, the input terminal I1 and the second node N2, and is configured to control to connect or disconnect the sixth node N6 and the seventh voltage line V7 under the control of the potential of the first control node NC1, control to connect or disconnect the sixth node N6 and the second clock signal line CB under the control of the potential of the seventh node N7, control the potential of the seventh node N7 according to the potential of the seventh node N6, control to connect or disconnect the second node N2 and the input terminal I1 under the control of the potential of the seventh node N7, the eighth voltage signal provided by the eighth voltage line V8, and the first clock signal provided by the first clock signal line CK;

Optionally, the first control circuit includes a first transistor;

A gate electrode of the first transistor is electrically connected to the second node, a first electrode of the first transistor is electrically connected to the second voltage line, and a second electrode of the first transistor is electrically connected to the first node.

Optionally, the output reset circuit includes an output reset transistor, and the second control circuit includes a second transistor;

A gate electrode of the output reset transistor is electrically connected to the second node, a first electrode of the output reset transistor is electrically connected to the driving signal terminal, and a second electrode of the output reset transistor is connected to the third voltage line;

A gate electrode of the second transistor is electrically connected to the control signal line, a first electrode of the second transistor is electrically connected to the second voltage line, and a second electrode of the second transistor is electrically connected to the second node.

Optionally, the third node control circuit includes a third transistor and a fourth transistor, and the first node control circuit includes a fifth transistor, a sixth transistor, a first capacitor, and a second capacitor;

A gate electrode of the third transistor is electrically connected to the first clock signal line, a first electrode of the third transistor is electrically connected to the fourth voltage line, and a second electrode of the third transistor is electrically connected to the third node;

A gate electrode of the fourth transistor is electrically connected to the second node, a first electrode of the fourth transistor is electrically connected to the first clock signal line, and a second electrode of the fourth transistor is electrically connected to the third node;

A gate electrode of the fifth transistor is electrically connected to the third node, a first electrode of the fifth transistor is electrically connected to the second clock signal line, a second electrode of the fifth transistor is electrically connected to the fourth node;

A gate electrode of the sixth transistor is electrically connected to the second clock signal line, a first electrode of the sixth transistor is electrically connected to the fourth node, and a second electrode of the sixth transistor is electrically connected to the first node;

A first electrode plate of the first capacitor is electrically connected to the third node, and a second electrode plate of the first capacitor is electrically connected to the fourth node;

A first electrode plate of the second capacitor is electrically connected to the first node, and a second electrode plate of the second capacitor is electrically connected to the first voltage line.

Optionally, the first on-off control circuit includes a seventh transistor;

A gate electrode of the seventh transistor is electrically connected to the fifth voltage line, a first electrode of the seventh transistor is electrically connected to the first control node, and a second electrode of the seventh transistor is electrically connected to the third node.

Optionally, the second node control circuit includes an eighth transistor;

A gate electrode of the eighth transistor is electrically connected to the first clock signal line, a first electrode of the eighth transistor is electrically connected to the input terminal, and a second electrode of the eighth transistor is electrically connected to the second node.

Optionally, the second on-off control circuit includes a ninth transistor;

A gate electrode of the ninth transistor is electrically connected to the sixth voltage line, a first electrode of the ninth transistor is electrically connected to the second control node, and a second electrode of the ninth transistor is electrically connected to the second node.

In at least one embodiment of the present disclosure, the third control circuit includes a tenth transistor, an eleventh transistor, and a third capacitor;

A gate electrode of the tenth transistor is electrically connected to the first control node, a first electrode of the tenth transistor is electrically connected to the seventh voltage line, and a second electrode of the tenth transistor is electrically connected to the fifth node;

A gate electrode of the eleventh transistor is electrically connected to the second node, a first electrode of the eleventh transistor is electrically connected to the fifth node, and a second electrode of the eleventh transistor is electrically connected to the second clock signal line;

A first electrode plate of the third capacitor is electrically connected to the second node, and the second electrode plate of the third capacitor is electrically connected to the fifth node.

Optionally, the third control circuit includes a tenth transistor, an eleventh transistor, a third capacitor, a twelfth transistor, a thirteenth transistor, and a fourteenth transistor;

A gate electrode of the tenth transistor is electrically connected to the first control node, a first electrode of the tenth transistor is electrically connected to the seventh voltage line, and a second electrode of the tenth transistor is electrically connected to the sixth node;

A gate electrode of the eleventh transistor is electrically connected to the seventh node, a first electrode of the eleventh transistor is electrically connected to the sixth node, a second electrode of the eleventh transistor is electrically connected to the second clock signal line;

A first electrode plate of the third capacitor is electrically connected to the seventh node, and a second electrode plate of the third capacitor is electrically connected to the sixth node;

A gate electrode of the twelfth transistor is electrically connected to the first clock signal line, a first electrode of the twelfth transistor is electrically connected to the input terminal, and a second electrode of the twelfth transistor is electrically connected to a first electrode of the thirteen transistor;

A gate electrode of the thirteenth transistor is electrically connected to the eighth voltage line, and a second electrode of the thirteenth transistor is electrically connected to a first electrode of the fourteenth transistor;

A gate electrode of the fourteenth transistor is electrically connected to the seventh node, and a second electrode of the fourteenth transistor is electrically connected to the second node.

Figure 11A:
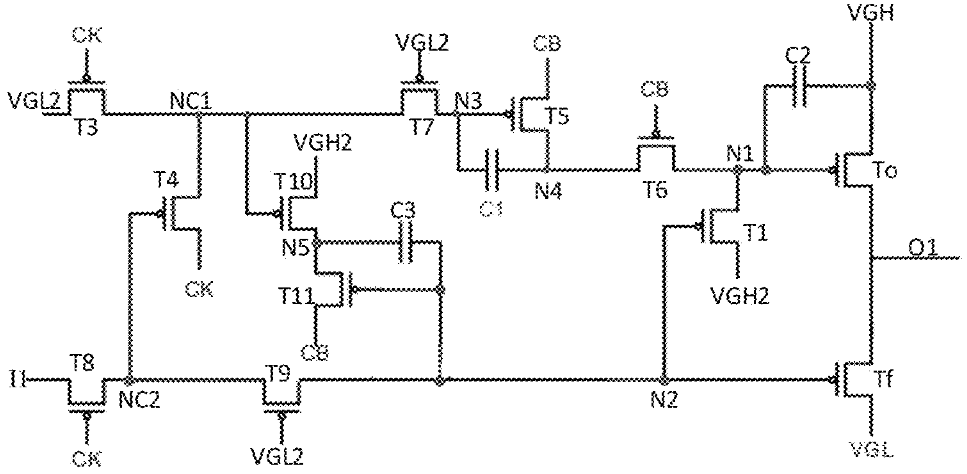
FIG. 11A is a circuit diagram of a driving circuit according to at least one embodiment of the present disclosure.

As shown in FIG. 11A, on the basis of at least one embodiment of the driving circuit shown in FIG. 9, The first control circuit includes a first transistor T1;

The gate electrode of the first transistor T1 is electrically connected to the second node N2, the drain electrode of the first transistor T1 is electrically connected to the second high voltage line VGH2, and the source electrode of the first transistor T1 is electrically connected to the first node N1;

The output reset circuit includes an output reset transistor Tf, and the output circuit includes an output transistor To;

The gate electrode of the output transistor To is electrically connected to the first node N1, the source electrode of the output transistor To is electrically connected to the first high voltage line VGH, and the drain electrode of the output transistor To is electrically connected to the driving signal terminal O1;

The gate electrode of the output reset transistor Tf is electrically connected to the second node N2, the source electrode of the output reset transistor Tf is electrically connected to the driving signal terminal O1, and the drain electrode of the output reset transistor Tf is electrically connected to the first low voltage line VGL;

The third node control circuit includes a third transistor T3 and a fourth transistor T4, and the first node control circuit includes a fifth transistor T5, a sixth transistor T6, a first capacitor C1 and a second capacitor C2;

The gate electrode of the third transistor T3 is electrically connected to the first clock signal line CK, the drain electrode of the third transistor T3 is electrically connected to the second low voltage line VGL2, and the source electrode of the third transistor T3 is electrically connected to the first control node NC1;

The gate electrode of the fourth transistor T4 is electrically connected to the second control node NC2, the drain electrode of the fourth transistor T4 is electrically connected to the first clock signal line CK, and the source electrode of the fourth transistor T4 is electrically connected to the first control node NC2;

The gate electrode of the fifth transistor T5 is electrically connected to the third node N3, the source electrode of the fifth transistor T5 is electrically connected to the second clock signal line CB, and the drain electrode of the fifth transistor T5 is electrically connected to the fourth node N4;

The gate electrode of the sixth transistor T6 is electrically connected to the second clock signal line CB, the source electrode of the sixth transistor T6 is electrically connected to the fourth node N4, and the drain electrode of the sixth transistor T6 is electrically connected to the first node N1;

The first electrode plate of the first capacitor C1 is electrically connected to the third node N3, and the second electrode plate of the first capacitor C1 is electrically connected to the fourth node N4;

The first electrode plate of the second capacitor C2 is electrically connected to the first node N1, and the second electrode plate of the second capacitor C2 is electrically connected to the first high voltage line VGH;

The first on-off control circuit includes a seventh transistor T7;

The gate electrode of the seventh transistor T7 is electrically connected to the second low voltage line VGL2, the drain electrode of the seventh transistor T7 is electrically connected to the first control node NC1, and the source electrode of the seventh transistor T7 is electrically connected to the third node N3;

The second node control circuit includes an eighth transistor T8;

The gate electrode of the eighth transistor T8 is electrically connected to the first clock signal line CK, the source electrode of the eighth transistor T8 is electrically connected to the input terminal I1, and the drain electrode of the eighth transistor T8 is electrically connected to the second control Node NC2;

The second on-off control circuit includes a ninth transistor T9;

The gate electrode of the ninth transistor T9 is electrically connected to the second low voltage line VGL2, the source electrode of the ninth transistor T9 is electrically connected to the second control node NC2, and the drain electrode of the ninth transistor T9 is electrically connected to the second node N2;

The third control circuit includes a tenth transistor T10, an eleventh transistor T11 and a third capacitor C3;

The gate electrode of the tenth transistor T10 is electrically connected to the first control node NC1, the source electrode of the tenth transistor T10 is electrically connected to the second high voltage line VGH2, and the drain electrode of the tenth transistor T10 is electrically connected to the fifth node N5;

The gate electrode of the eleventh transistor T11 is electrically connected to the second node N2, the source electrode of the eleventh transistor T11 is electrically connected to the fifth node N5, and the drain electrode of the eleventh transistor T11 is electrically connected to the second clock signal line CB;

The first electrode plate of the third capacitor C3 is electrically connected to the second node N2, and the second electrode plate of the third capacitor C3 is electrically connected to the fifth node N5.

In at least one embodiment of the driving circuit shown in FIG. 11A, all transistors are p-type transistors, but not limited thereto.

In at least one embodiment of the driving circuit shown in FIG. 11A, the first high voltage line VGH is configured to provide a first high voltage signal, the second high voltage line VGH1 is configured to provide a second high voltage signal, and the voltage value of the first high voltage signal may be, for example, 7V, the voltage value of the second high voltage signal may be, for example, 10V;

The first low voltage line VGL is configured to provide the first low voltage signal, the second low voltage line VGL2 is configured to provide the second low voltage signal, the voltage value of the first low voltage signal and the voltage value of the second low voltage signal can be negative, the voltage value of the first low voltage signal may be −7V, and the voltage value of the second low voltage signal may be −10V.

In at least one embodiment of the present disclosure, the absolute value of the voltage value of the first low voltage signal is smaller than the absolute value of the voltage value of the second low voltage signal; the voltage value of the first low voltage signal may be greater than equal to −20V and less than or equal to 0V, the voltage value of the second low voltage signal may be greater than or equal to −20V and less than or equal to 0V;

The absolute value of the voltage value of the first high voltage signal is smaller than the absolute value of the voltage value of the second high voltage signal; the voltage value of the first high voltage signal may be greater than 0V and less than or equal to 20V, and the voltage value of the second high voltage signal may be greater than 0V and less than or equal to 20V.

When at least one embodiment of the driving circuit shown in FIG. 11A of the present disclosure is working, and when T1 is turned on, N1 is connected to a 10V voltage signal, and the source electrode of To is connected to a 7V voltage signal. Even if the threshold voltage of To shifts forward, To can also be turned off to prevent O1 from outputting a high voltage signal by mistake;

Since there is a threshold voltage loss when T3 transmits a low voltage signal, in at least one embodiment of the present disclosure, the source electrode of T3 is connected to the second low voltage signal to reduce the potential of NC1, thereby improving the control capability of T5.

In specific implementation, when the source electrode of T3 is connected to the first low voltage signal, the voltage value of the first low voltage signal can be −7V. Since there is a threshold voltage loss when the p-type transistor transmits the low voltage signal, the potential of NC1 can be −5V. Since the potential of NC1 is higher, the control ability of T5 is weakened. Based on this, in at least one embodiment of the present disclosure, the source electrode of T3 is a second low voltage signal with a lower voltage value, to improve the above problems.

In at least one embodiment of the driving circuit shown in FIG. 11A of the present disclosure, the source electrode of T10 is electrically connected to the second high voltage line VGH2 to facilitate circuit layout.

Figure 17A:
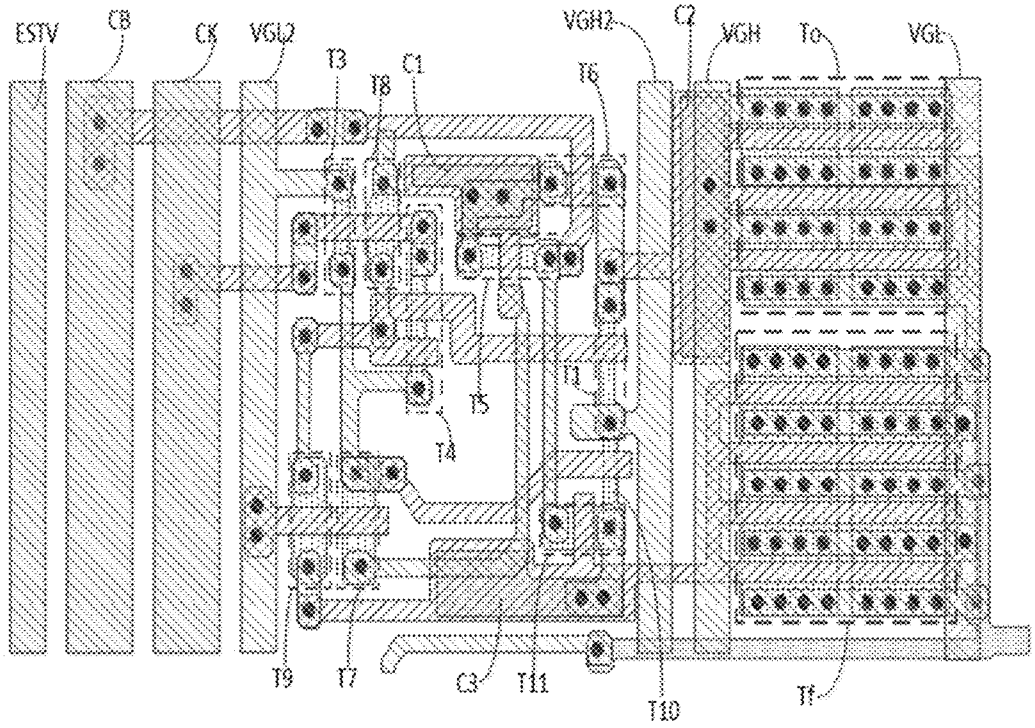
FIG. 17A is a layout diagram of the driving circuit shown in FIG. 11A.

As shown in FIG. 17A, the distance between T1 and T11 is relatively close, so both T1 and T11 are set to be electrically connected to the second high voltage line VGH2, so as to facilitate the electrical connection between the transistor and the voltage line.

In the driving circuit shown in FIG. 11A of at least one embodiment of the present disclosure, by setting the first high voltage line VGH and the second high voltage line VGH2, the width-to-length ratio of To can be reduced, and the layout space can be saved. At the same time, there will be a larger design space for Tf.

In at least one embodiment of the present disclosure, the width of the channel of To can be reduced from 180 um to 120 um, which reduces the space by ⅓ and greatly saves the layout space.

Optionally, the length of the channel of To may be 3.5 um, but not limited thereto.

In at least one embodiment of the driving circuit shown in FIG. 11A, the width-to-length ratio of Tf may be 180/3.5, but not limited thereto.

Figure 11B:
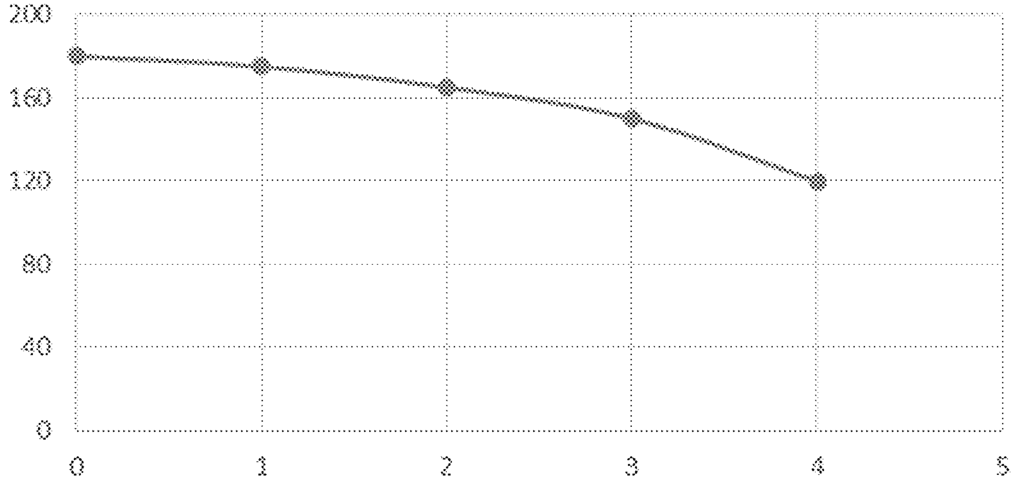

FIG. 11B is a schematic diagram of the relationship between the voltage difference and the width of the channel of To;

The voltage difference is the difference between the voltage value of the second high voltage signal and the voltage value of the first high voltage signal;

In FIG. 11B, the horizontal axis is the voltage difference, the unit is volt (V), and the vertical axis is the channel width of To, the unit is um.

Figure 11C:
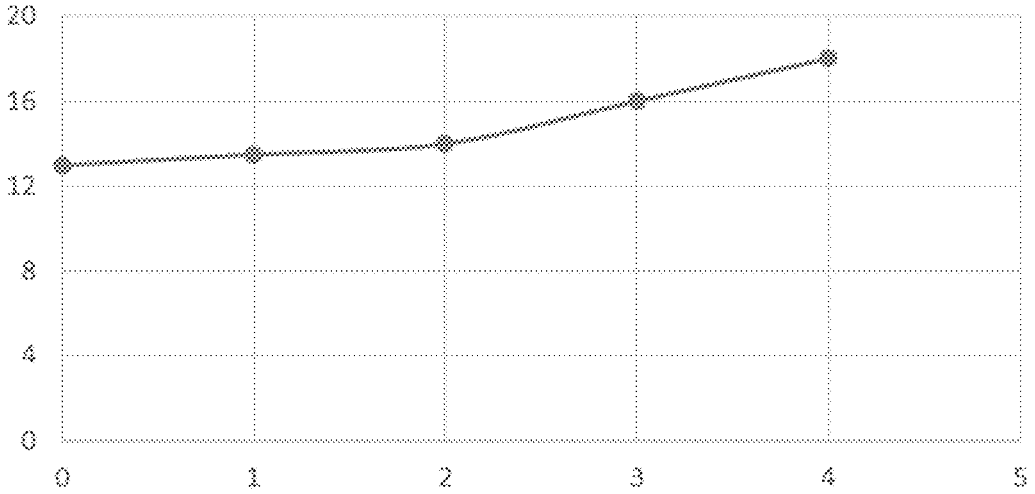
FIG. 11C is a schematic diagram of the relationship between the voltage difference and the size of the display panel.

FIG. 11C is a schematic diagram of the relationship between the voltage difference and the size of the display panel;

In FIG. 11C, the horizontal axis is the voltage difference in volts (V), and the vertical axis is the size of the display panel in inches.

Figure 12:
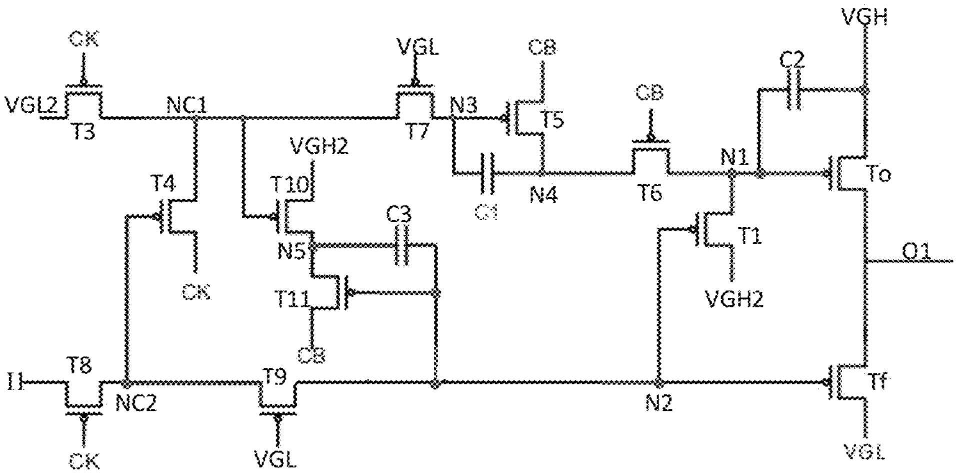
FIG. 12 is a circuit diagram of a driving circuit according to at least one embodiment of the present disclosure.

The difference between the driving circuit shown in FIG. 12 of at least one embodiment of the present disclosure and the driving circuit shown in FIG. 11A of the present disclosure is that the gate electrode of T7 and the gate electrode of T9 can be replaced to be electrically connected to the first low voltage line VGL.

Figure 13:
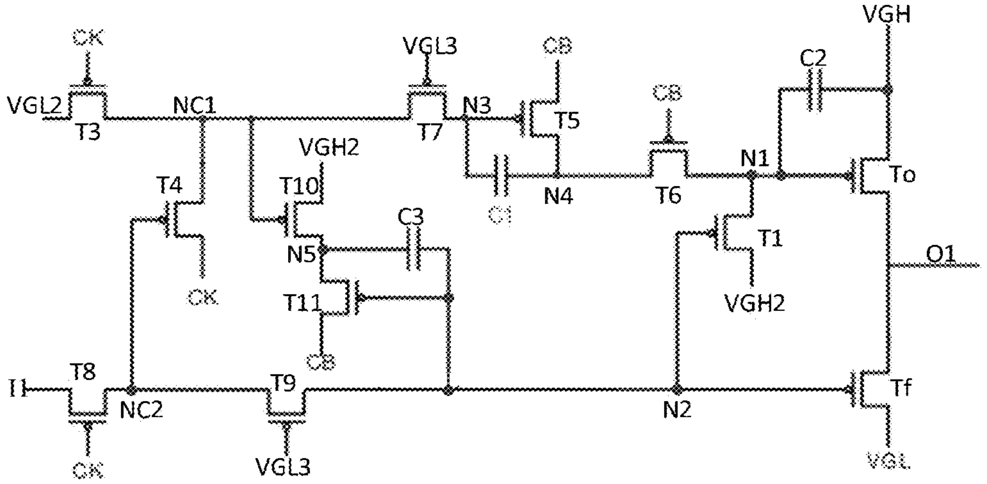
FIG. 13 is a circuit diagram of a driving circuit according to at least one embodiment of the present disclosure.

The difference between the driving circuit shown in FIG. 13 of at least one embodiment of the present disclosure and the driving circuit shown in FIG. 11A of the present disclosure is that the gate electrode of T7 and the gate electrode of T9 can be replaced to be electrically connected to the third low voltage line VGL3.

In at least one embodiment of the present disclosure, the absolute value of the voltage value of the third low voltage signal provided by the third low voltage line VGL3 may be greater than the absolute value of the voltage value of the second low voltage signal;

The voltage value of the third low voltage signal may be greater than or equal to −20V and less than or equal to 0V.

In the driving circuit shown in FIG. 13 of at least one embodiment of the present disclosure, the voltage value of the third low voltage signal is set lower to control T7 to be turned on better.

Figure 14:
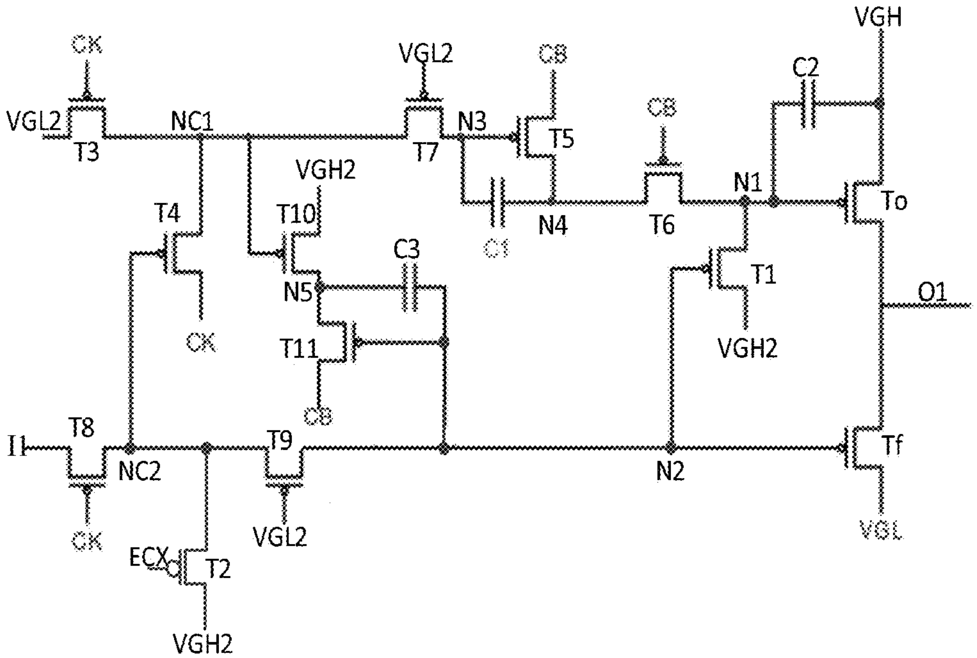
FIG. 14 is a circuit diagram of a driving circuit according to at least one embodiment of the present disclosure.

The difference between the driving circuit shown in FIG. 14 of at least one embodiment of the present disclosure and the driving circuit shown in FIG. 11A of the present disclosure is that the driving circuit shown in FIG. 14 of at least one embodiment of the present disclosure further includes a second transistor T2;

The gate electrode of the second transistor T2 is electrically connected to the control signal line ECX, the drain electrode of the second transistor T2 is electrically connected to the second high voltage line VGH2, and the source electrode of the second transistor T2 is electrically connected to the second control node NC2.

In at least one embodiment of the driving circuit shown in FIG. 14 of the present disclosure, all transistors are p-type transistors, but not limited thereto.

During operation of the driving circuit shown in FIG. 14 of at least one embodiment of the present disclosure, when ECX provides a low voltage signal, T2 is turned on to control to connect the second control node NC2 and the second high voltage line VGH2.

When the driving circuit shown in FIG. 14 of the present disclosure is working, when O1 outputs a high voltage signal, ECX outputs a low voltage signal, so that T2 is turned on, and the second high voltage signal provided by VGH2 is written into the second node N2, since the voltage value of the second high voltage signal is relatively high, the leakage current of Tf can be reduced.

Figure 15:
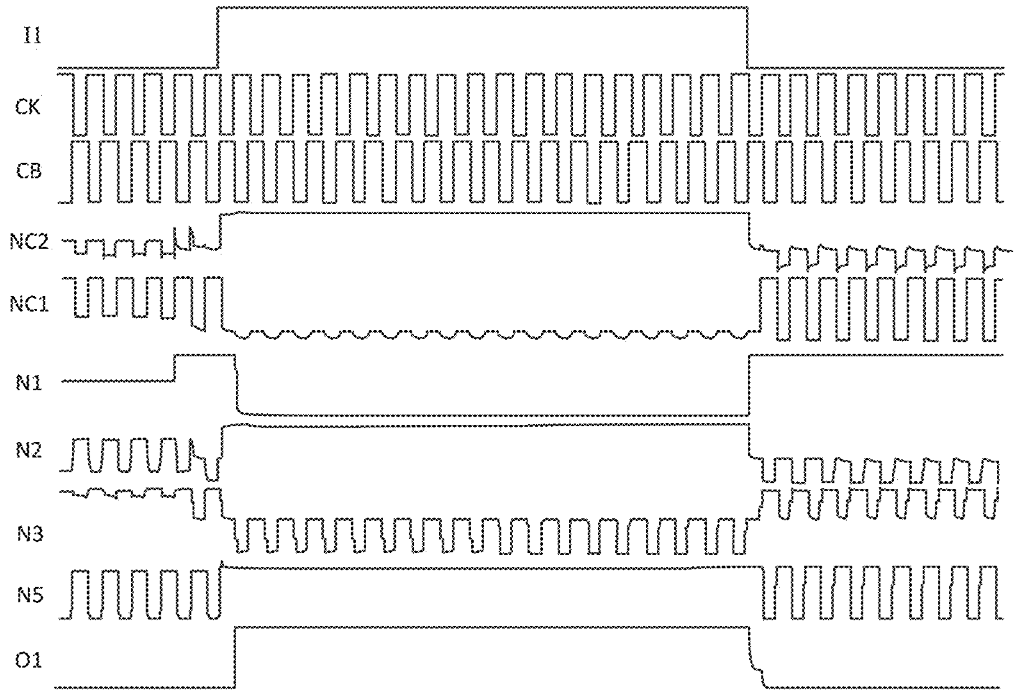
FIG. 15 is a simulation working timing diagram of the driving circuit shown in FIG. 14.

FIG. 15 is a simulation timing diagram of the driving circuit shown in FIG. 14 of at least one embodiment of the present disclosure.

Figure 16:
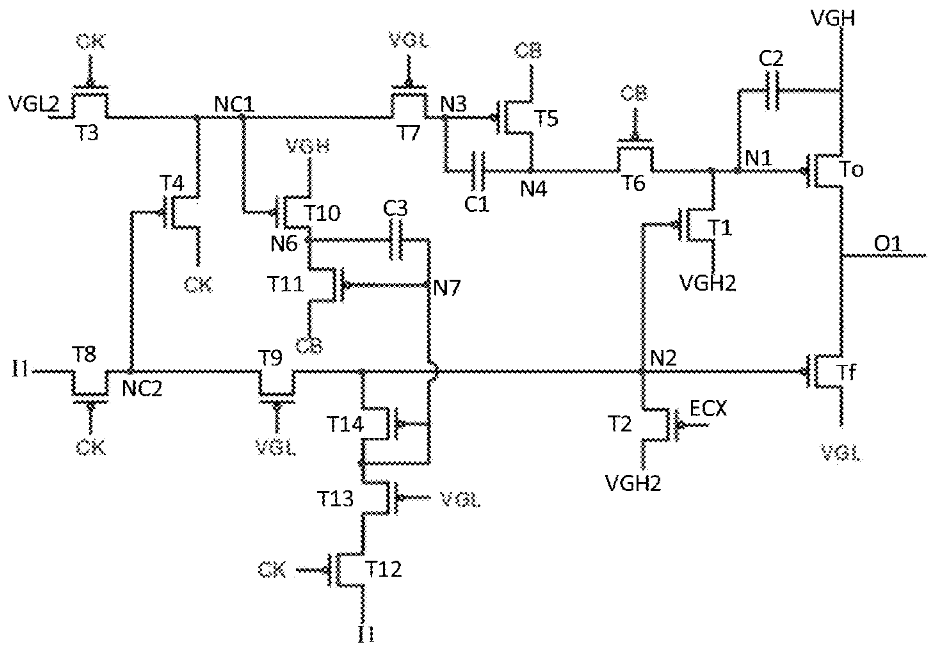
FIG. 16 is a circuit diagram of a driving circuit according to at least one embodiment of the present disclosure.

As shown in FIG. 16, on the basis of the driving circuit shown in FIG. 10, The first control circuit includes a first transistor T1;

The gate electrode of the first transistor T1 is electrically connected to the second node N2, the drain electrode of the first transistor T1 is electrically connected to the second high voltage line VGH2, and the source electrode of the first transistor T1 is electrically connected to the first node N1;

The second control circuit includes a second transistor T2;

The gate electrode of the second transistor T2 is electrically connected to the control signal line ECX, the drain electrode of the second transistor T2 is electrically connected to the second high voltage line VGH2, and the source electrode of the second transistor T2 is electrically connected to the second node N2;

The output reset circuit includes an output reset transistor Tf, and the output circuit includes an output transistor To;

The gate electrode of the output transistor To is electrically connected to the first node N1, the source electrode of the output transistor To is electrically connected to the first high voltage line VGH, and the drain electrode of the output transistor To is connected to the driving signal terminal O1;

The gate electrode of the output reset transistor Tf is electrically connected to the second node N2, the source electrode of the output reset transistor Tf is electrically connected to the driving signal terminal O1, and the drain electrode of the output reset transistor Tf is electrically connected to the first low voltage line VGL1;

The third node control circuit includes a third transistor T3 and a fourth transistor T4, and the first node control circuit includes a fifth transistor T5, a sixth transistor T6, a first capacitor C1 and a second capacitor C2;

The gate electrode of the third transistor T3 is electrically connected to the first clock signal line CK, the drain electrode of the third transistor T3 is electrically connected to the second low voltage line VGL2, and the source electrode of the third transistor T3 is electrically connected to the first control node NC1;

The gate electrode of the fourth transistor T4 is electrically connected to the second node N2, the drain electrode of the fourth transistor T4 is electrically connected to the first clock signal line CK, and the source electrode of the fourth transistor T4 is electrically connected to the first control node NC1;

The gate electrode of the fifth transistor T5 is electrically connected to the third node N3, the source electrode of the fifth transistor T5 is electrically connected to the second clock signal line CB, and the drain electrode of the fifth transistor T5 is electrically connected to the fourth node N4;

The gate electrode of the sixth transistor T6 is electrically connected to the second clock signal line CB, the source electrode of the sixth transistor T6 is electrically connected to the fourth node N4, and the drain electrode of the sixth transistor T6 is electrically connected to the first node N1;

The first electrode plate of the first capacitor C1 is electrically connected to the third node N3, and the second electrode plate of the first capacitor C1 is electrically connected to the fourth node N4;

The first electrode plate of the second capacitor C2 is electrically connected to the first node N1, and the second electrode plate of the second capacitor C2 is electrically connected to the first high voltage line VGH;

The first on-off control circuit includes a seventh transistor T7;

The gate electrode of the seventh transistor T7 is electrically connected to the first low voltage line VGL, the drain electrode of the seventh transistor T7 is electrically connected to the first control node NC1, and the source electrode of the seventh transistor T7 is electrically connected to the third node N3;

The second node control circuit includes an eighth transistor T8;

The gate electrode of the eighth transistor T8 is electrically connected to the first clock signal line CK, the source electrode of the eighth transistor T8 is electrically connected to the input terminal I1, and the drain electrode of the eighth transistor T8 is electrically connected to the second control node NC2;

The second on-off control circuit includes a ninth transistor T9;

The gate electrode of the ninth transistor T9 is electrically connected to the first low voltage line VGL, the source electrode of the ninth transistor T9 is electrically connected to the second control node NC2, and the drain electrode of the ninth transistor T9 is electrically connected to the second node N2;

The third control circuit includes a tenth transistor T10, an eleventh transistor T11, a third capacitor C3, a twelfth transistor T12, a thirteenth transistor T13, and a fourteenth transistor T14;

The gate electrode of the tenth transistor T10 is electrically connected to the first control node NC1, the source electrode of the tenth transistor T10 is electrically connected to the first high voltage line VGH, and the drain electrode of the tenth transistor T10 is electrically connected to the sixth node N6;

The gate electrode of the eleventh transistor T11 is electrically connected to the seventh node N7, the source electrode of the eleventh transistor T11 is electrically connected to the sixth node N6, and the drain electrode of the eleventh transistor T11 is electrically connected to the second clock signal line CB;

The first electrode plate of the third capacitor C3 is electrically connected to the seventh node N7, and the second electrode plate of the third capacitor C3 is electrically connected to the sixth node N6;

The gate electrode of the twelfth transistor T12 is electrically connected to the first clock signal line CK, the source electrode of the twelfth transistor is electrically connected to the input terminal I1, and the drain electrode of the twelfth transistor T12 is electrically connected to the source electrode of the thirteenth transistor T13;

The gate electrode of the thirteenth transistor T13 is electrically connected to the first low voltage line VGL, and the drain electrode of the thirteenth transistor T13 is electrically connected to the source electrode of the fourteenth transistor T14;

The gate electrode of the fourteenth transistor T14 is electrically connected to the seventh node N7, and the drain electrode of the fourteenth transistor T14 is electrically connected to the second node N2.

In at least one embodiment of the driving circuit shown in FIG. 16, all transistors are p-type transistors, but not limited thereto.

FIG. 17A is a layout diagram of the driving circuit shown in FIG. 11A.

Figure 17B:
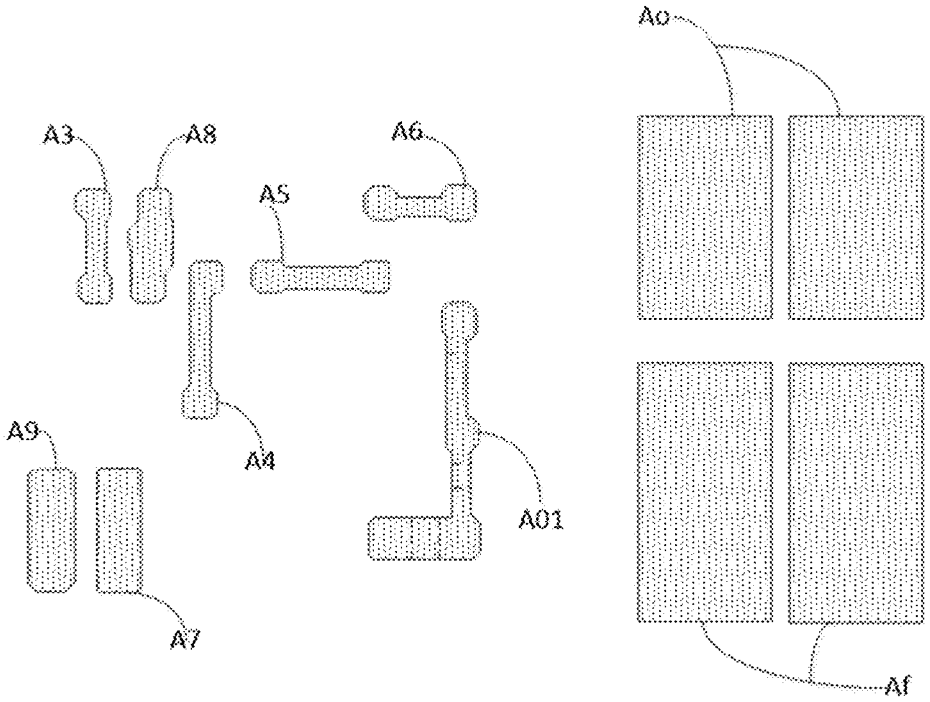
FIG. 17B is a layout diagram of the semiconductor layer in FIG. 17A.
Figure 17C:
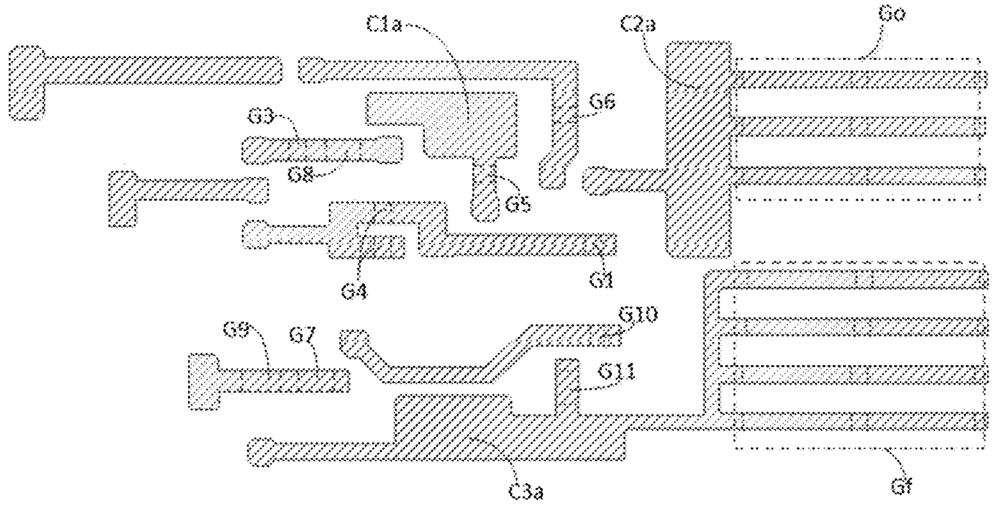
FIG. 17C is a layout diagram of the first gate metal layer in FIG. 17A.
Figure 17D:
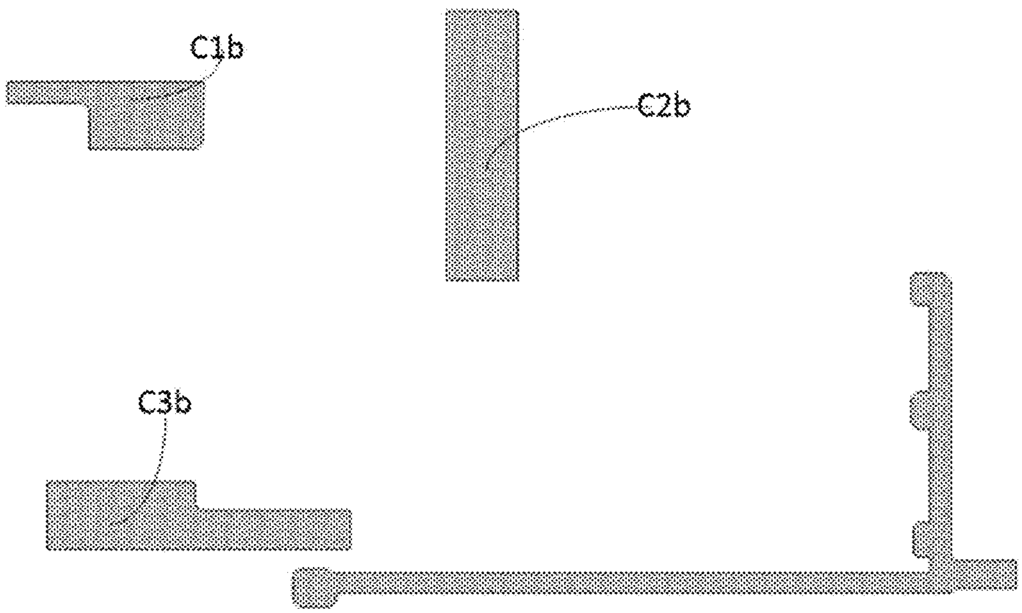
FIG. 17D is a layout diagram of the second gate metal layer in FIG. 17A.
Figure 17E:
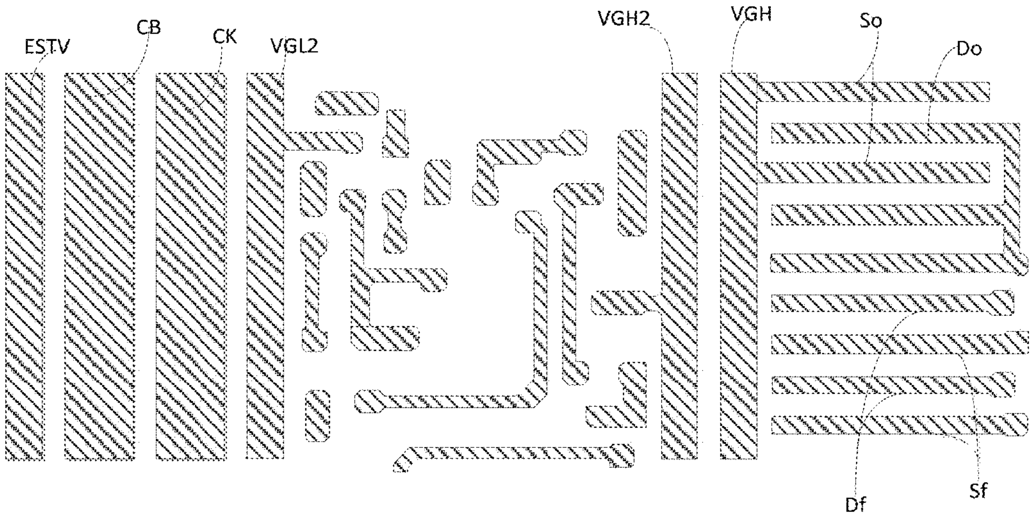
FIG. 17E is a layout diagram of the first source-drain metal layer in FIG. 17A.
Figure 17F:
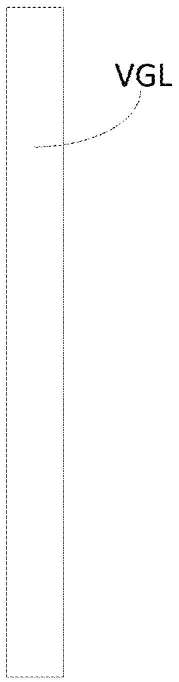
FIG. 17F is a layout diagram of the second source-drain metal layer in FIG. 17A.

FIG. 17B is a layout diagram of the semiconductor layer in FIG. 17A, FIG. 17C is a layout diagram of the first gate metal layer in FIG. 17A, FIG. 17D is a layout diagram of the second gate metal layer in FIG. 17A, and FIG. 17E is a layout diagram of the first source-drain metal layer in FIG. 17A, FIG. 17F is a layout diagram of the second source-drain metal layer in FIG. 17A.

Figure 18A:
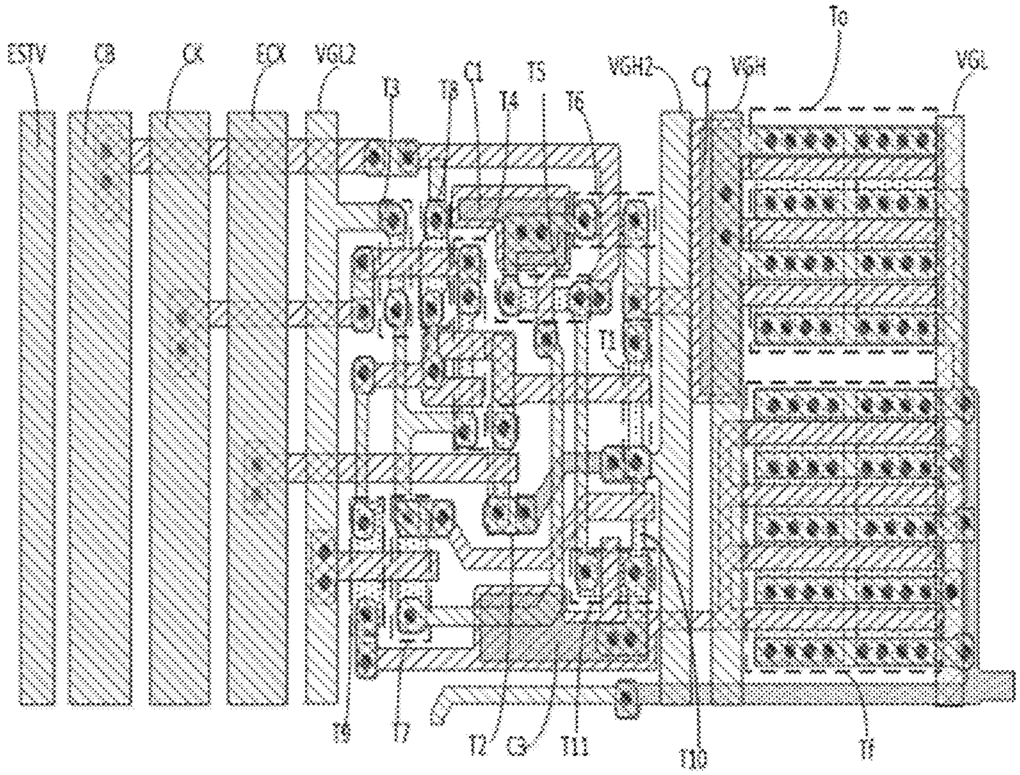
FIG. 18A is a layout diagram of the driving circuit shown in FIG. 14.

FIG. 18A is a layout diagram of the driving circuit shown in FIG. 14.

Figure 18B:
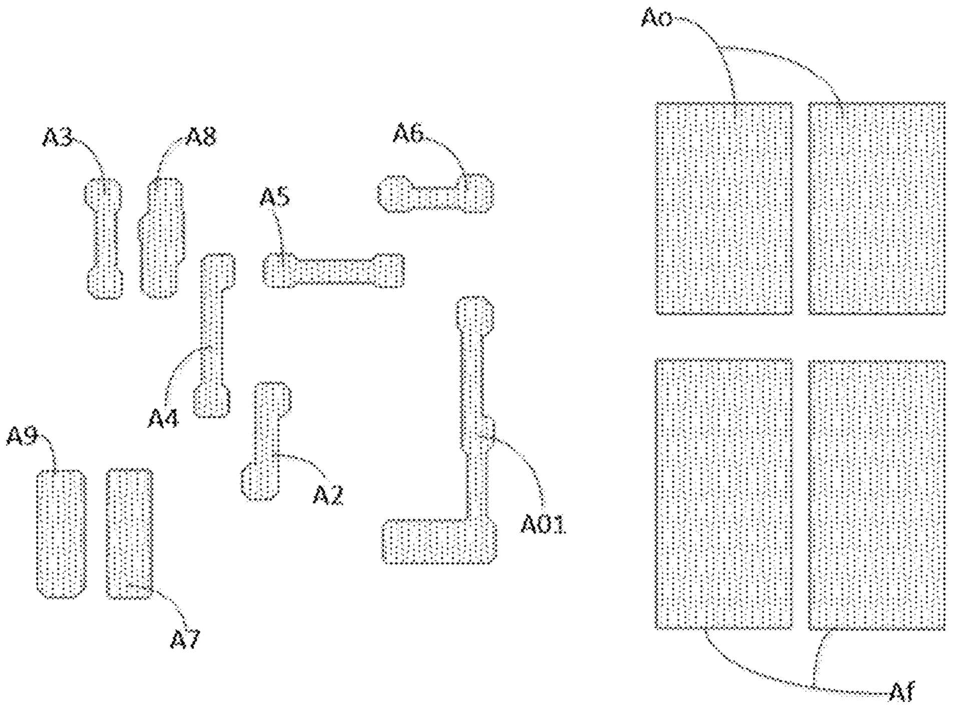
FIG. 18B is a layout diagram of the semiconductor layer in FIG. 18A.
Figure 18C:
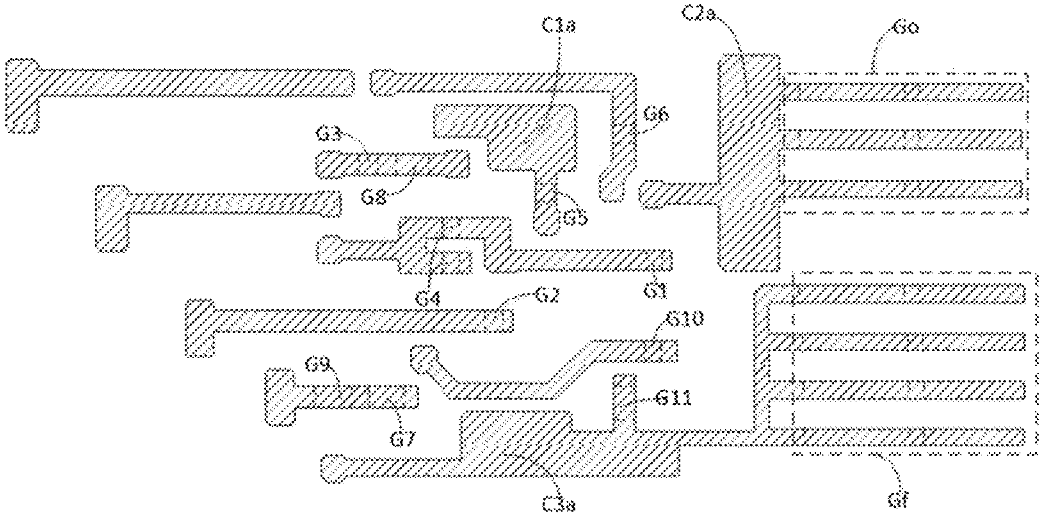
FIG. 18C is a layout diagram of the first gate metal layer in FIG. 18A.
Figure 18D:
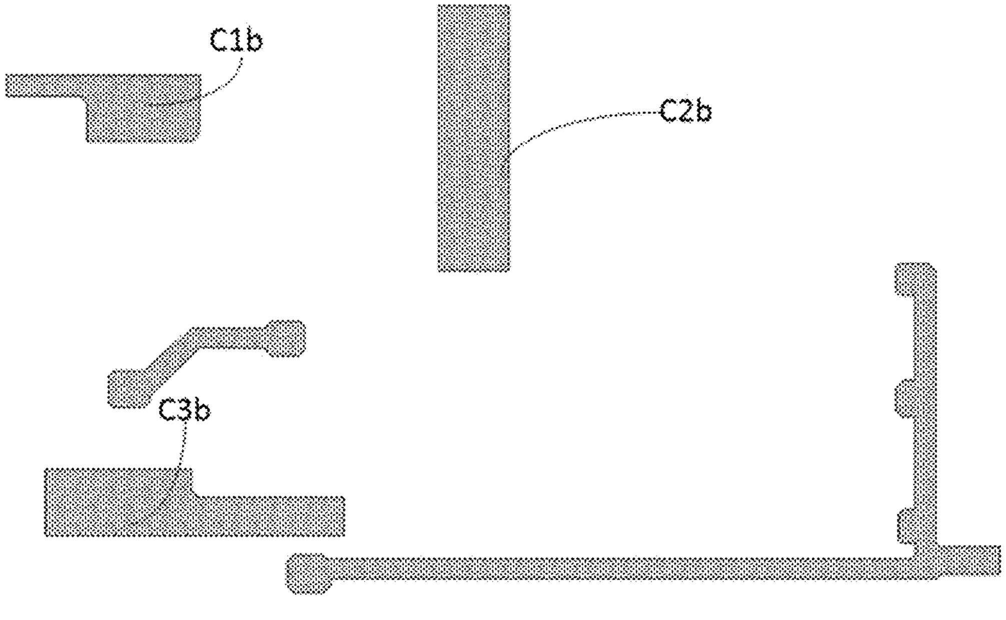
FIG. 18D is a layout diagram of the second gate metal layer in FIG. 18A.
Figure 18E:
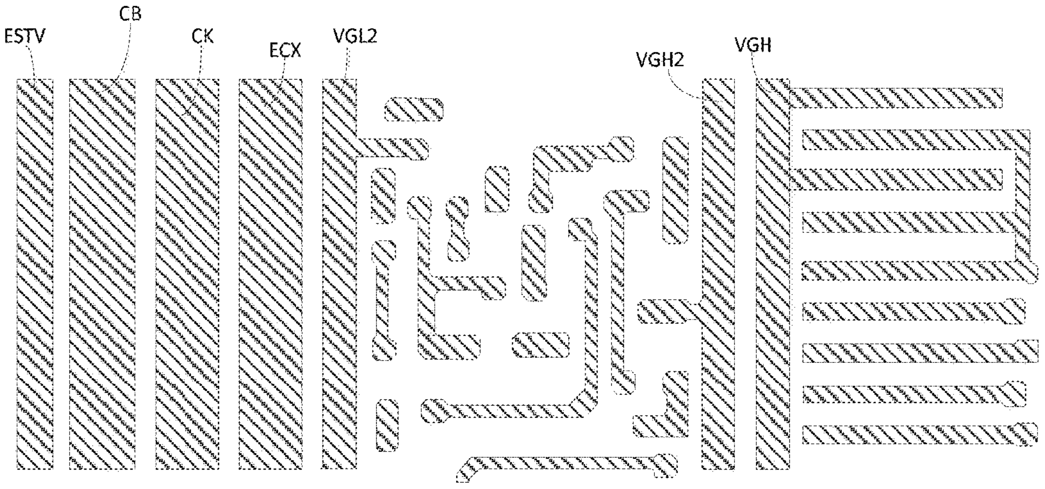
FIG. 18E is a layout diagram of the first source-drain metal layer in FIG. 18A.
Figure 18F:
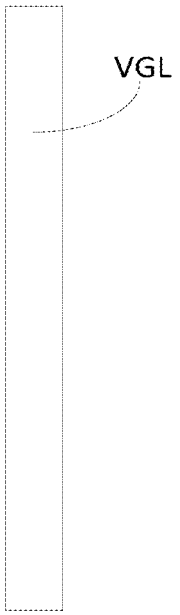
FIG. 18F is a layout diagram of the second source-drain metal layer in FIG. 18A.

FIG. 18B is a layout diagram of the semiconductor layer in FIG. 18A, FIG. 18C is a layout diagram of the first gate metal layer in FIG. 18A, FIG. 18D is a layout diagram of the second gate metal layer in FIG. 18A, and FIG. 18E is a layout diagram of the first source-drain metal layer in FIG. 18A, FIG. 18F is a layout diagram of the second source-drain metal layer in FIG. 18A.

Figure 19A:
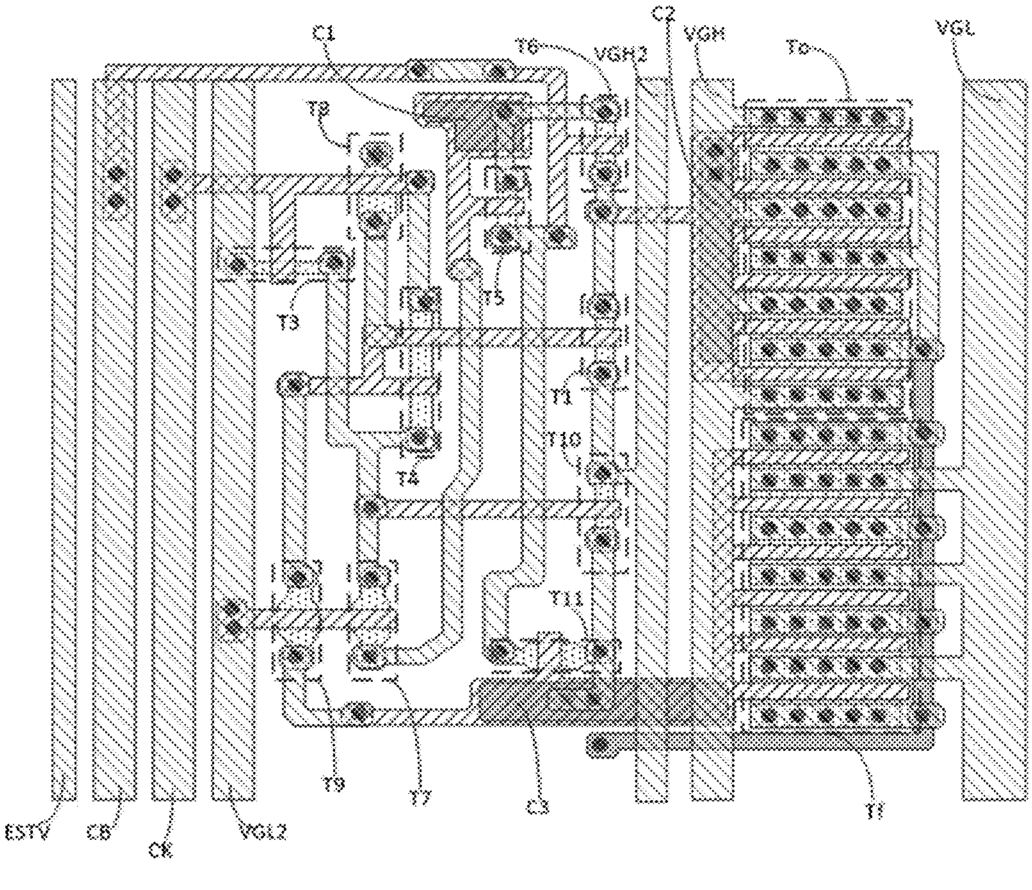
FIG. 19A is a layout diagram of the driving circuit shown in FIG. 11A.

FIG. 19A is a layout diagram of the driving circuit shown in FIG. 11A.

Figure 19B:
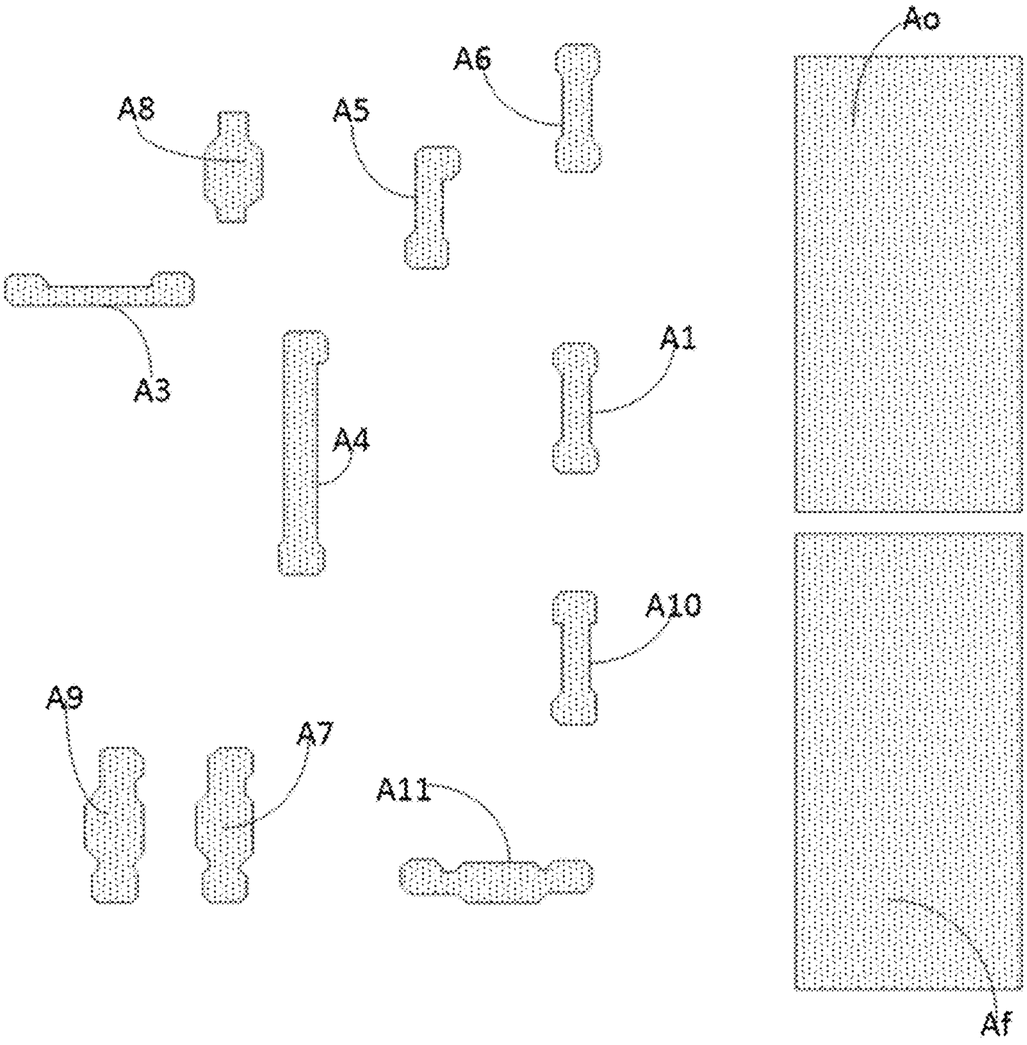
FIG. 19B is a layout diagram of the semiconductor layer in FIG. 19A.
Figure 19C:
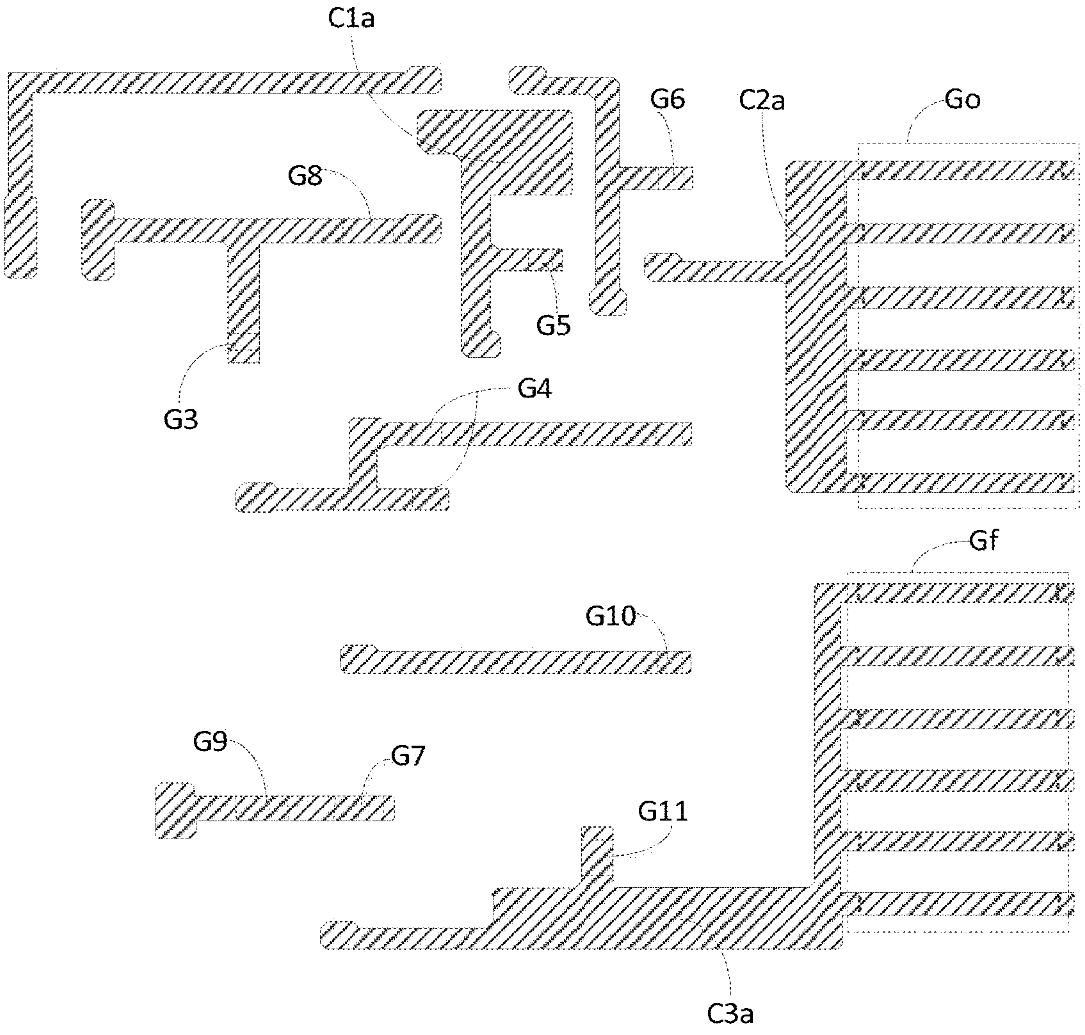
FIG. 19C is a layout diagram of the first gate metal layer in FIG. 19A.
Figure 19D:
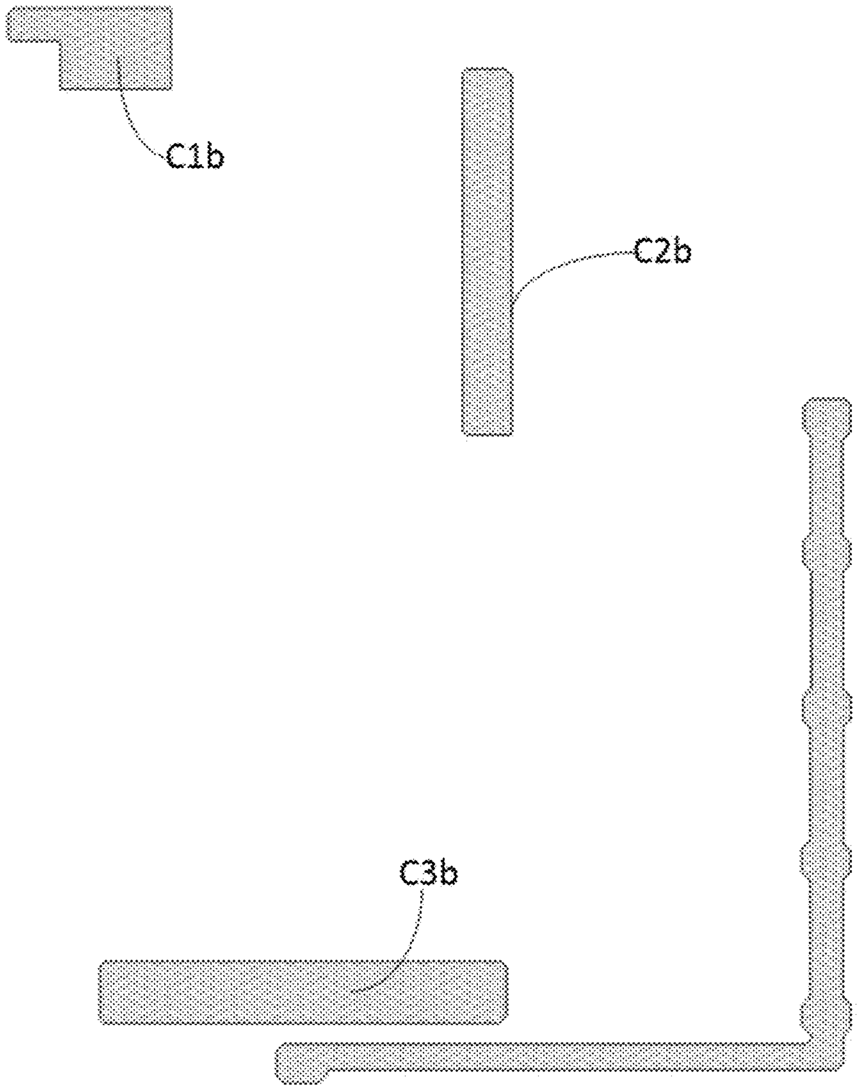
FIG. 19D is a layout diagram of the second gate metal layer in FIG. 19A.
Figure 19E:
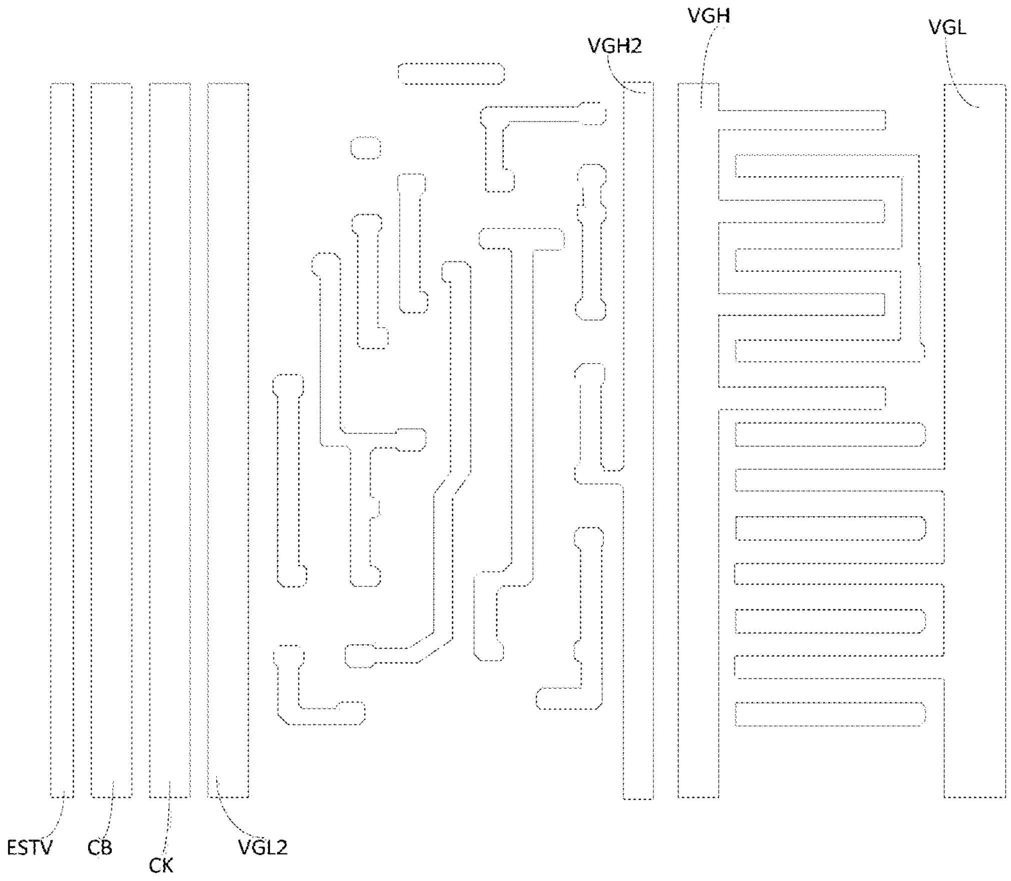
FIG. 19E is a layout diagram of the first source-drain metal layer in FIG. 19A.

FIG. 19B is a layout diagram of the semiconductor layer in FIG. 19A, FIG. 19C is a layout diagram of the first gate metal layer in FIG. 19A, FIG. 19D is a layout diagram of the second gate metal layer in FIG. 19A, and FIG. 19E is a layout diagram of the first source-drain metal layer in FIG. 19A.

Figure 20A:
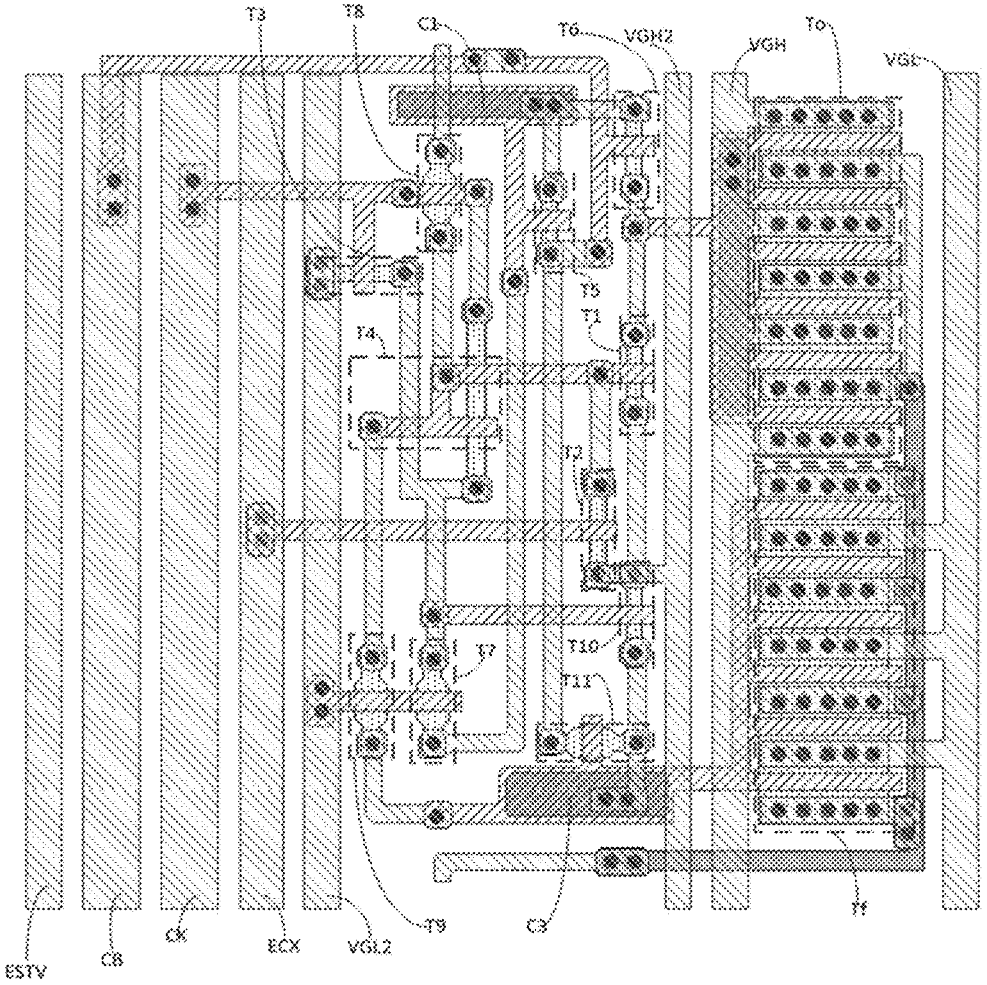
FIG. 20A is a layout diagram of the driving circuit shown in FIG. 14.

FIG. 20A is a layout diagram of the driving circuit shown in FIG. 14.

Figure 20B:
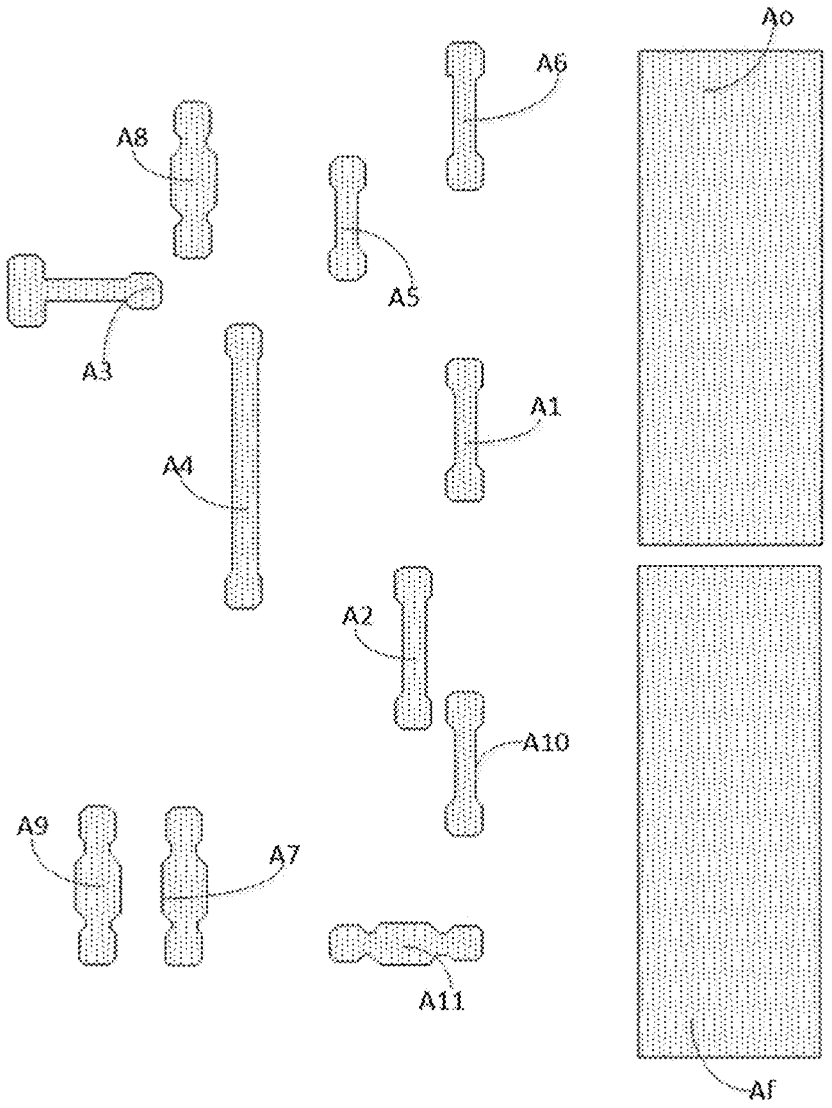
FIG. 20B is a layout diagram of the semiconductor layer in FIG. 20A.
Figure 20C:
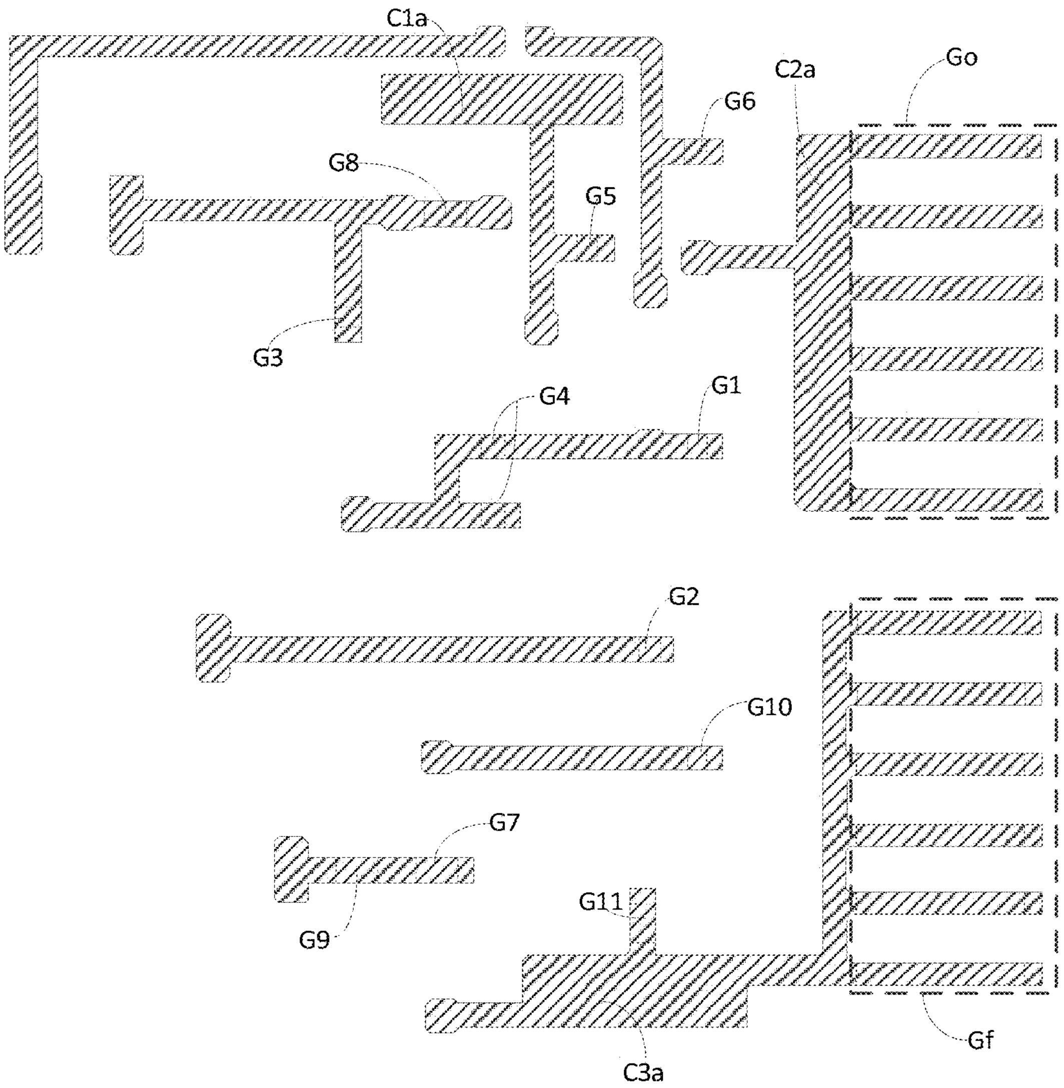
FIG. 20C is a layout diagram of the first gate metal layer in FIG. 20A.
Figure 20D:
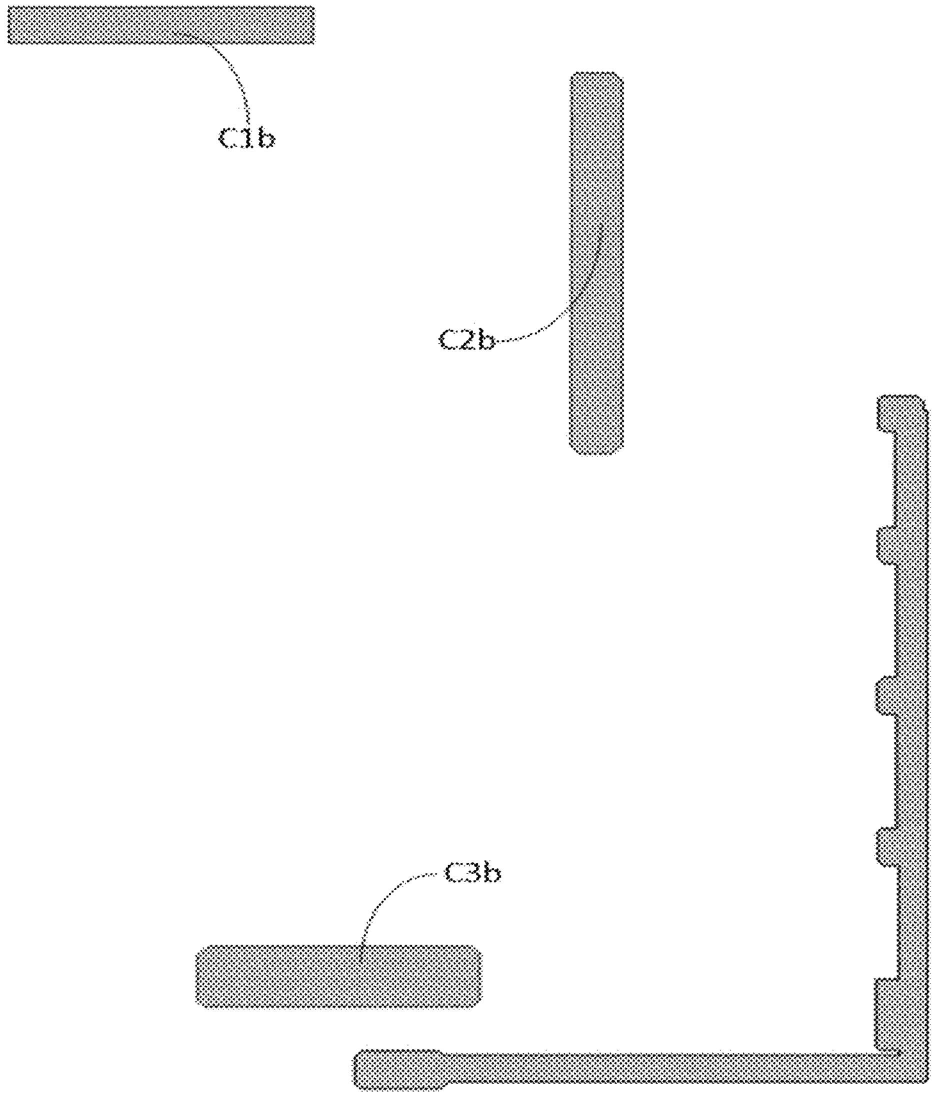
FIG. 20D is a layout diagram of the second gate metal layer in FIG. 20A.
Figure 20E:
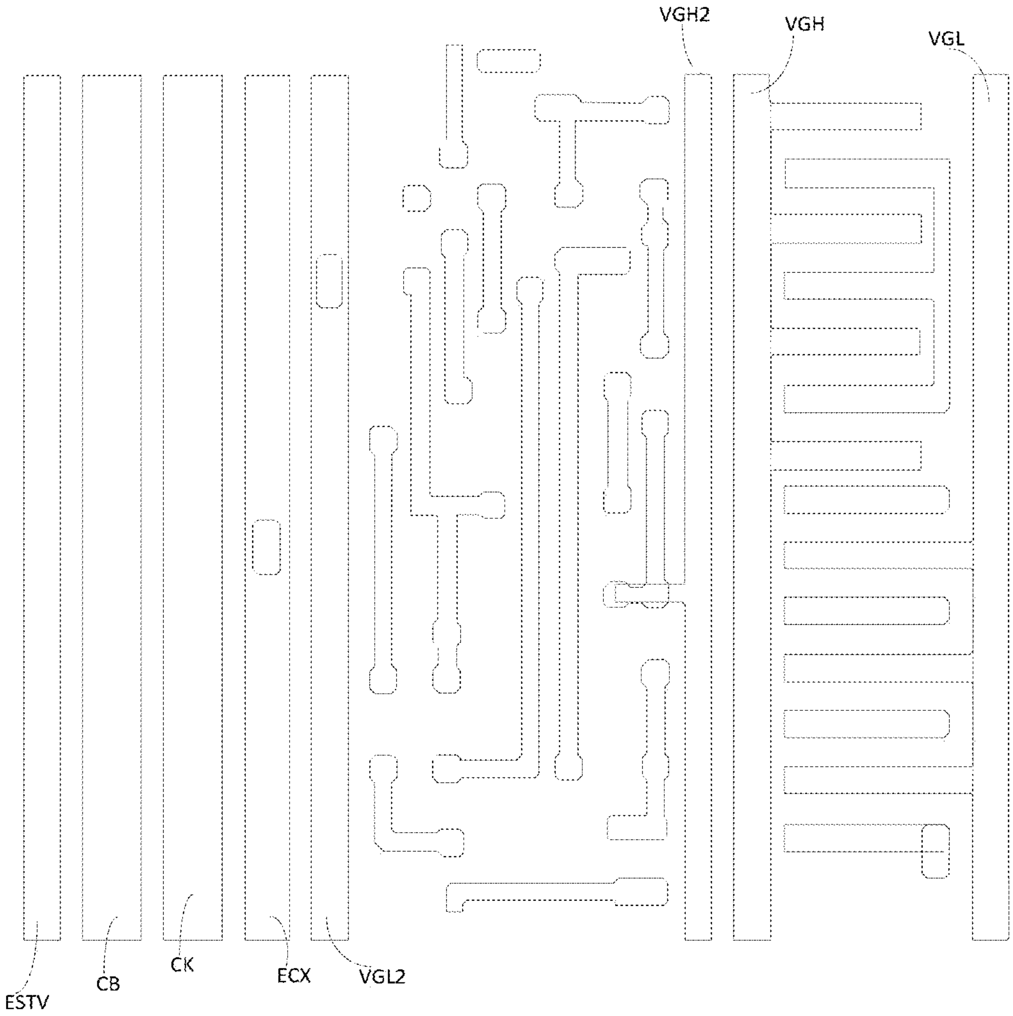
FIG. 20E is a layout diagram of the first source-drain metal layer in FIG. 20A.

FIG. 20B is a layout diagram of the semiconductor layer in FIG. 20A, FIG. 20C is a layout diagram of the first gate metal layer in FIG. 20A, FIG. 20D is a layout diagram of the second gate metal layer in FIG. 20A, and FIG. 20E is a layout diagram of the first source-drain metal layer in FIG. 20A.

Figure 21A:
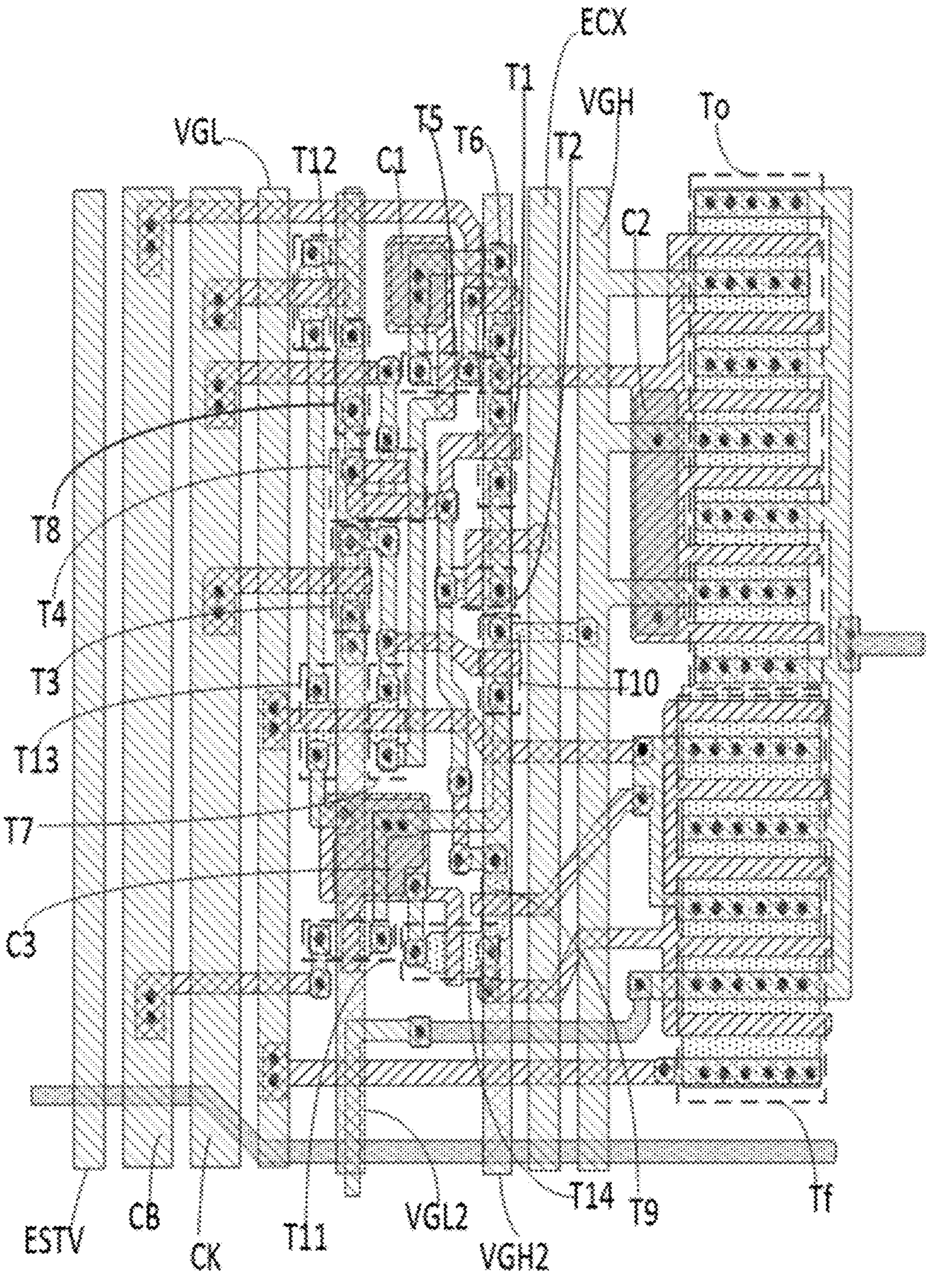
FIG. 21A is a layout diagram of the driving circuit shown in FIG. 16.

FIG. 21A is a layout diagram of the driving circuit shown in FIG. 16.

Figure 21B:
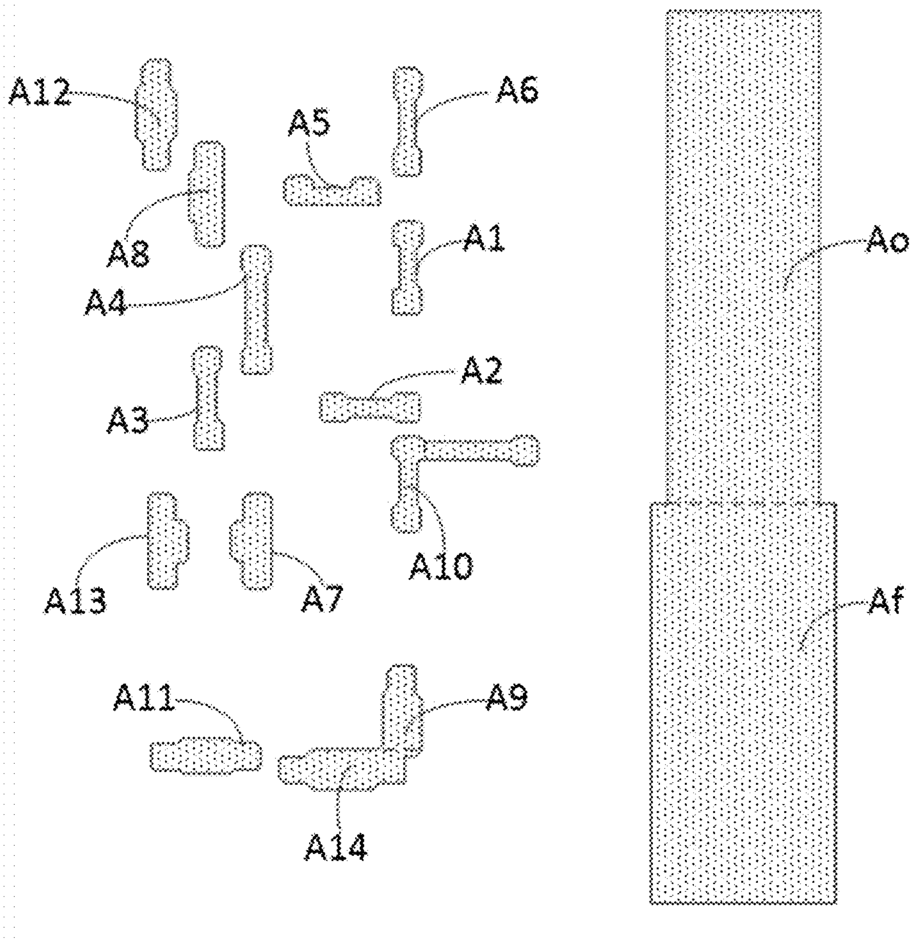
FIG. 21B is a layout diagram of the semiconductor layer in FIG. 21A.
Figure 21C:
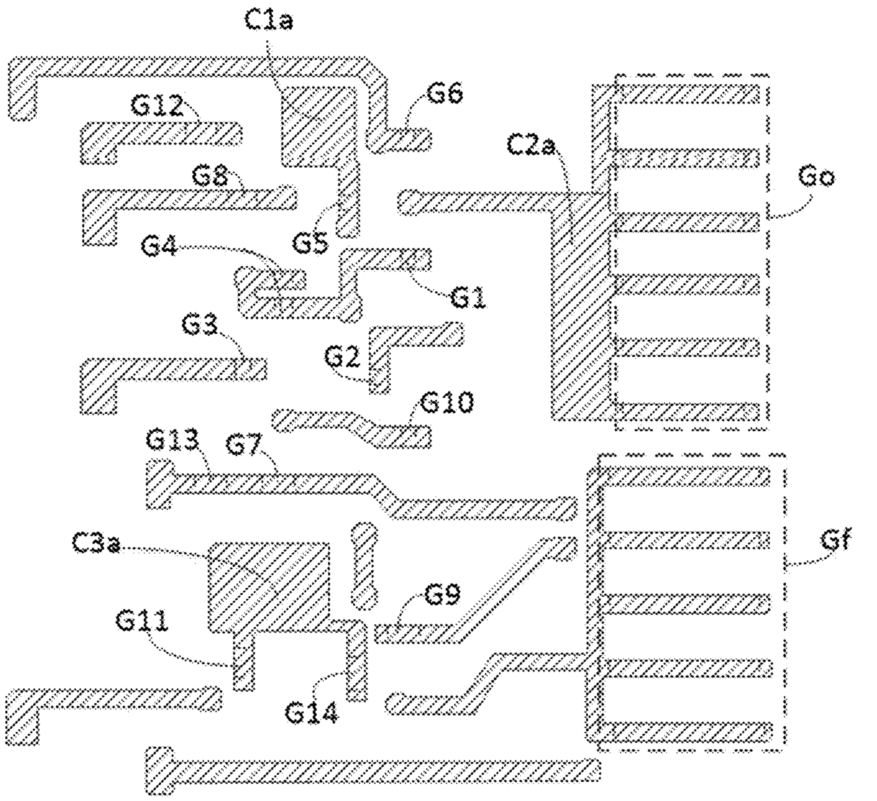
FIG. 21C is a layout diagram of the first gate metal layer in FIG. 21A.
Figure 21D:
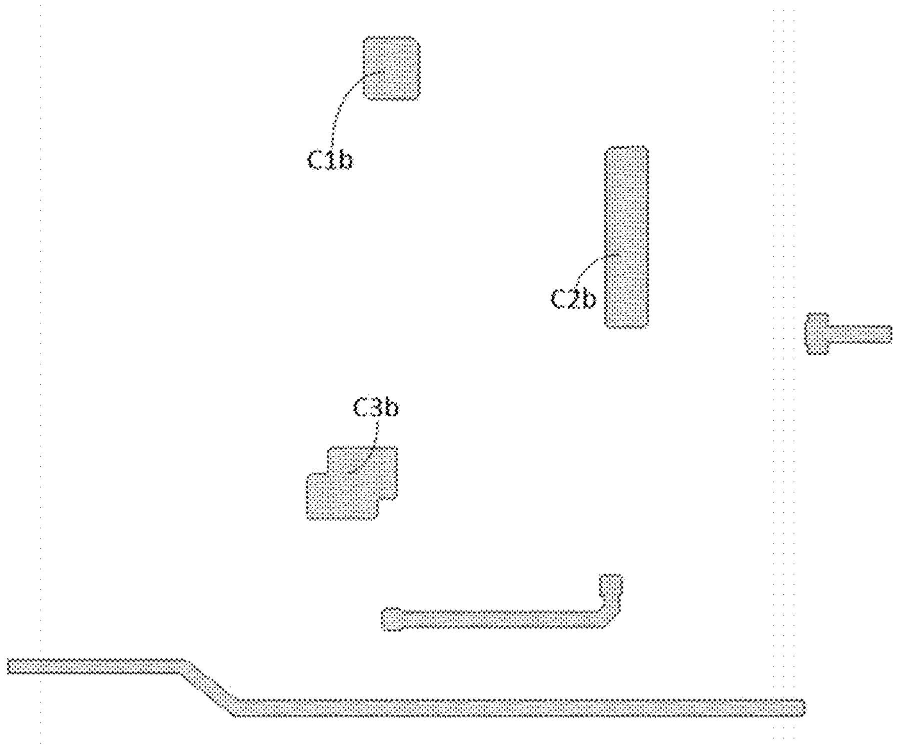
FIG. 21D is a layout diagram of the second gate metal layer in FIG. 21A.
Figure 21E:
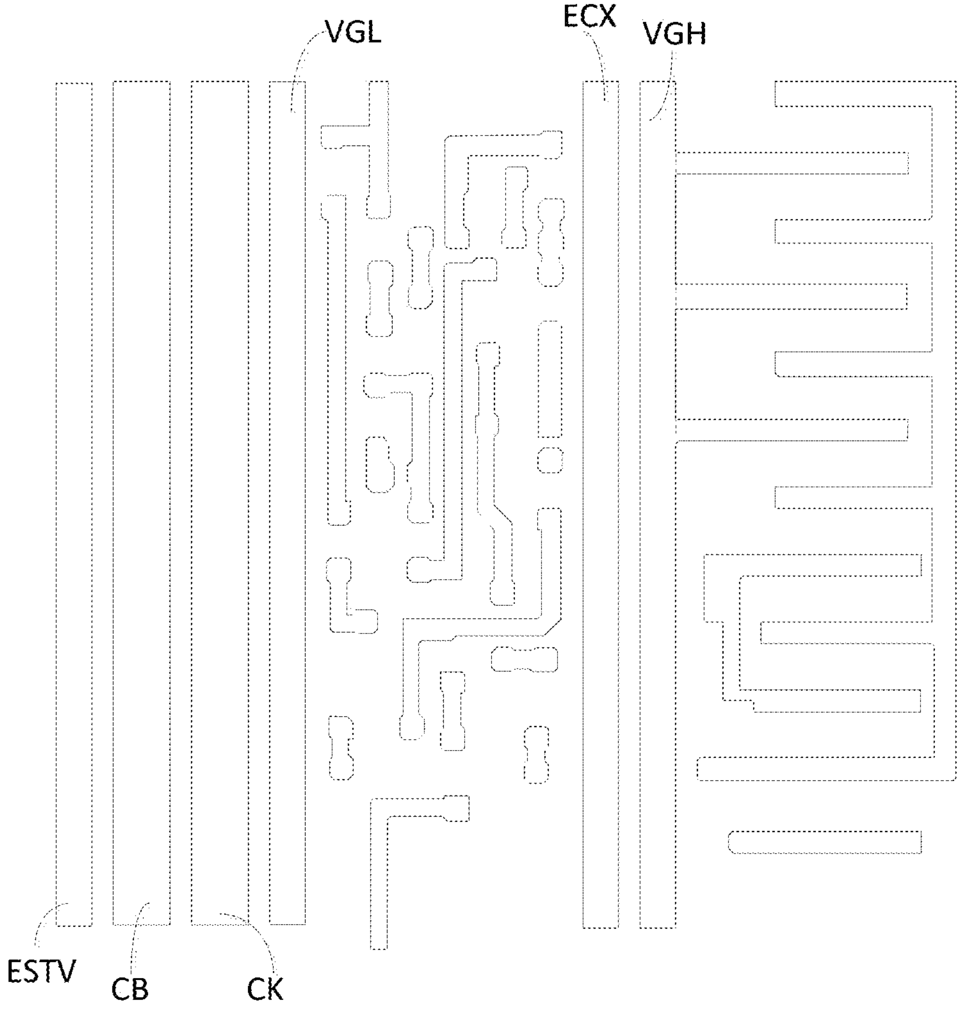
FIG. 21E is a layout diagram of the first source-drain metal layer in FIG. 21A.
Figure 21F:
FIG. 21F is a layout diagram of the second source-drain metal layer in FIG. 21A.

FIG. 21B is a layout diagram of the semiconductor layer in FIG. 21A, FIG. 21C is a layout diagram of the first gate metal layer in FIG. 21A, FIG. 21D is a layout diagram of the second gate metal layer in FIG. 21A, and FIG. 21E is a layout diagram of the first source-drain metal layer in FIG. 21A, FIG. 21F is a layout diagram of the second source-drain metal layer in FIG. 21A.

In at least one embodiment of the present disclosure, the semiconductor layer, the first gate metal layer, the second gate metal layer, the first source-drain metal layer and the second source-drain metal layer may be sequentially arranged along a direction away from the base substrate.

In FIG. 17A, the first transistor is labeled T1, the third transistor is labeled T3, the fourth transistor is labeled T4, the fifth transistor is labeled T5, the sixth transistor is labeled T6, the seventh transistor is labeled T7, the eighth transistor is labeled T8, the ninth transistor is labeled T9, the tenth transistor is labeled T11, the eleventh transistor is labeled T11, and the output transistor is labeled To, and the output reset transistor is labeled Tf; the one labeled C1 is the first capacitor, the one labeled C2 is the second capacitor, and the one labeled C3 is the third capacitor.

In FIG. 17B, the one labeled A01 is the first active pattern, the one labeled A3 is the active pattern of the third transistor T3, the one labeled A4 is the active pattern of the fourth transistor T4, and the one labeled A5 is the active pattern of the fifth transistor T5, the one labeled A7 is the active pattern of the seventh transistor T7, the one labeled A8 is the active pattern of the eighth transistor T8, the one labeled A9 is the active pattern of the ninth transistor T9, the one labeled Ao is the active pattern of the output transistor To, and the one labeled Af is the active pattern of the output reset transistor Tf;

The first active pattern A01 includes an active pattern of the sixth transistor T6, an active pattern of the first transistor T1, an active pattern of the tenth transistor T10, and an active pattern of the eleventh transistor T11.

In FIG. 17C, the one labeled G1 is the gate electrode of the first transistor T1. the one labeled G3 is the gate electrode of the third transistor T3, the one labeled G4 is the gate electrode of the fourth transistor T4, and the one labeled G5 is the gate electrode of the fifth transistor T5, the one labeled G6 is the gate electrode of the sixth transistor T6, the one labeled G7 is the gate electrode of the seventh transistor T7, the one labeled G8 is the gate electrode of the eighth transistor T8, and the one labeled G9 is the gate electrode of the ninth transistor T9, the one labeled G10 is the gate electrode of the tenth transistor T10, the one labeled G11 is the gate electrode of the eleventh transistor T11, and the one labeled Go is the gate electrode of the output transistor To, the one labeled Gf is the gate electrode of the output reset transistor Tf, the one labeled C1*a* is the first electrode plate of the first capacitor C1, the one labeled C2*a* is the first electrode plate of the second capacitor C2, and the one labeled C3*a* is the first electrode plate of the third capacitor C3.

In FIG. 17D, the one labeled C1*b* is the second electrode plate of the first capacitor C1, the one labeled C2*b* is the second electrode plate of the second capacitor C2, and the one labeled C3*b* is the second electrode plate of the third capacitor C3.

In FIG. 17A and FIG. 17E, the one labeled ESTV is the initial voltage line, the one labeled CK is the first clock signal line, the one labeled CB is the second clock signal line, and the one labeled VGL2 is the second low voltage line, the one labeled VGH2 is the second high voltage line, and the one labeled VGH is the first high voltage line.

In FIG. 17A and FIG. 17F, the one labeled VGL is the first low voltage line.

As shown in FIG. 17A-FIG. 17F, VGL is formed on the second source-drain metal layer, and VGL2, VGH2 and VGH are arranged on the first source-drain metal layer;

In at least one embodiment shown in FIG. 17A-FIG. 17F, since there is an overlapping area between the orthographic projection of VGL on the base substrate and the orthographic projection of the source electrode of To on the base substrate, there is an overlapping area between the orthographic projection of VGL on the base substrate and the orthographic projection of the drain electrode of To on the base substrate, there is an overlapping area between the orthographic projection of VGL on the base substrate and the orthographic projection of the source electrode of Tf on the base substrate, there is an overlapping area between the orthographic projection of VGL on the base substrate and the orthographic projection of the drain electrode of Tf on the base substrate, while the source electrode of To, the drain electrode of To, the source electrode of Tf and the drain electrode of Tf are formed in the first source-drain metal layer, so the VGL is set on the second source-drain metal layer.

In FIG. 17E, the one labeled So is the source electrode of To, the one labeled Do is the drain electrode of To, the one labeled Sf is the source electrode of Tf, and the one labeled Df is the drain electrode of Tf.

In FIG. 18A, the first transistor is labeled T1, the second transistor is labeled T2, the third transistor is labeled T3, the fourth transistor is labeled T4, and the fifth transistor is labeled T5, the sixth transistor is labeled T6, the seventh transistor is labeled T7, the eighth transistor is labeled T9, the ninth transistor is labeled T10, the tenth transistor is labeled T10, the eleventh transistor is labeled T11, the output transistor is labeled To, the output reset transistor is labeled Tf; the first capacitor is labeled C1, the second capacitor is labeled C2, and the third capacitor is labeled C3.

In FIG. 18B, the one labeled A01 is the first active pattern, the one labeled A2 is the active pattern of the second transistor T2, the one labeled A3 is the active pattern of the third transistor T3, and the one labeled A4 is the active pattern of the fourth transistor T4, the one labeled A5 is the active pattern of the fifth transistor T5, the one labeled A7 is the active pattern of the seventh transistor T7, the one labeled A8 is the active pattern of the eighth transistor T8, the one labeled A9 is the active pattern of the ninth transistor T9, the one labeled Ao is the active pattern of the output transistor To, and the one labeled Af is the active pattern of the output reset transistor Tf;

The first active pattern A01 includes an active pattern of the sixth transistor T6, an active pattern of the first transistor T1, an active pattern of the tenth transistor T10, and an active pattern of the eleventh transistor T11.

In FIG. 18C, the one labeled G1 is the gate electrode of the first transistor T1, the one labeled G2 is the gate electrode of the first transistor T1, the one labeled G3 is the gate electrode of the third transistor T3, and the one labeled G4 is the gate electrode of the first transistor T1, the one labeled G4 is the gate electrode of the fourth transistor T4, the one labeled G5 is the gate electrode of the fifth transistor T5, the one labeled G6 is the gate electrode of the sixth transistor T6, the one labeled G7 is the gate electrode of the seventh transistor T7, and the one labeled G8 is the gate electrode of the eighth transistor T8, the one labeled G9 is the gate electrode of the ninth transistor T9, the one labeled G10 is the gate electrode of the tenth transistor T10, and the one labeled G11 is the gate electrode of the eleventh transistor T11, the one labeled Go is the electrode of the output transistor To, the one labeled Gf is the gate electrode of the output reset transistor Tf, the one labeled C1*a* is the first electrode plate of the first capacitor C1, and the one labeled C2*a* is the first electrode plate of the second capacitor C2, the one labeled C3*a* is the first electrode plate of the third capacitor C3.

In FIG. 18D, the one labeled C1*b* is the second electrode plate of the first capacitor C1, the one labeled C2*b* is the second electrode plate of the second capacitor C2, and the one labeled C3*b* is the second electrode plate of the third capacitor C3.

In FIG. 18A and FIG. 18E, the one labeled ESTV is the initial voltage line, the one labeled CK is the first clock signal line, the one labeled CB is the second clock signal line, and the one labeled VGL2 is the second low voltage line, the one labeled VGH2 is the second high voltage line, the one labeled VGH is the first high voltage line, and the one labeled ECX is the control signal line.

In FIG. 18A and FIG. 18F, the one labeled VGL is the first low voltage line.

In FIG. 19A, the first transistor is labeled T1, the third transistor is labeled T3, the fourth transistor is labeled T4, the fifth transistor is labeled T5, and the sixth transistor is labeled T6, the seventh transistor is labeled T7, the eighth transistor is labeled T8, the ninth transistor is labeled T9, the tenth transistor is labeled T11, the eleventh transistor is labeled T11, and the output transistor is labeled To, and the output reset transistor is labeled Tf; the one labeled C1 is the first capacitor, the one labeled C2 is the second capacitor, and the one labeled C3 is the third capacitor.

In FIG. 19B, the one labeled A1 is the active pattern of the first transistor T1, the one labeled A3 is the active pattern of the third transistor T3, and the one labeled A4 is the active pattern of the fourth transistor T4, the one labeled A5 is the active pattern of the fifth transistor T5, the one labeled A6 is the active pattern of the sixth transistor T6, the one labeled by A7 is the active pattern of the seventh transistor T7, the one labeled A8 is the active pattern of the eighth transistor T8, the one labeled A9 is the active pattern of the ninth transistor T9, the one labeled A10 is the active pattern of the tenth transistor T10, the one labeled A11 is the active pattern of the eleventh transistor T11, the one labeled Ao is the active pattern of the output transistor To, and the one labeled Af is the active pattern of the output reset transistor Tf.

In FIG. 19C, the one labeled G1 is the gate electrode of the first transistor T1, the one labeled G3 is the gate electrode of the third transistor T3, the one labeled G4 is the gate electrode of the fourth transistor T4, and the one labeled G5 is the gate electrode of the fifth transistor T5, the one labeled G6 is the gate electrode of the sixth transistor T6, the one labeled G7 is the gate electrode of the seventh transistor T7, the one labeled G8 is the gate electrode of the eighth transistor T8, and the one labeled G9 is the gate electrode of the ninth transistor T9, the one labeled G10 is the gate electrode of the tenth transistor T10, the one labeled G11 is the gate electrode of the eleventh transistor T11, and the one labeled Go is the gate electrode of the output transistor To, the one labeled Gf is the gate electrode of the output reset transistor Tf, the one labeled C1*a* is the first electrode plate of the first capacitor C1, the one labeled C2*a* is the first electrode plate of the second capacitor C2, and the one labeled C3*a* is the first electrode plate of the third capacitor C3.

In FIG. 19D, the one labeled C1*b* is the second electrode plate of the first capacitor C1, the one labeled C1*b* is the second electrode plate of the second capacitor C2, and the one labeled C3*b* is the second electrode plate of the third capacitor C3.

In FIG. 19A and FIG. 19E, the one labeled ESTV is the initial voltage line, the one labeled CK is the first clock signal line, the one labeled CB is the second clock signal line, and the one labeled VGL2 is the second low voltage line, the one labeled VGH2 is the second high voltage line, the one labeled VGH is the first high voltage line, and the one labeled VGL is the first low voltage line.

In FIG. 20A, the first transistor is labeled T1, the second transistor is labeled T2, the third transistor is labeled T3, the fourth transistor is labeled T4, and the fifth transistor is labeled T5, the sixth transistor is labeled T6, the seventh transistor is labeled T7, the eighth transistor is labeled T8, the ninth transistor is labeled T9, the tenth transistor is labeled T10, the eleventh transistor is labeled T11, the output transistor is labeled To, the output reset transistor is labeled Tf; the first capacitor is labeled C1, the second capacitor is labeled C2, and the third capacitor is labeled C3.

In FIG. 20B, the one labeled A1 is the active pattern of the first transistor T1, the one labeled A2 is the active pattern of the second transistor T2, and the one labeled A3 is the active pattern of the third transistor T3, the one labeled A4 is the active pattern of the fourth transistor T4, the one labeled A5 is the active pattern of the fifth transistor T5, the one labeled A6 is the active pattern of the sixth transistor T6, the one labeled A7 is the active pattern of the seventh transistor T7, the one labeled A8 is the active pattern of the eighth transistor T8, the one labeled A9 is the active graphics of the ninth transistor T9, the one labeled A10 is the active graphics of the tenth transistor T10, the one labeled A11 is the active pattern of the eleventh transistor T11, the one labeled Ao is the active pattern of the output transistor To, and the one labeled Af is the active pattern of the output reset transistor Tf.

In FIG. 20C, the one labeled G1 is the gate electrode of the first transistor T1, the one labeled G2 is the gate electrode of the second transistor T2, the one labeled G3 is the gate electrode of the third transistor T3, and the one labeled G4 is the gate electrode of the fourth transistor T4, the one labeled G5 is the gate electrode of the fifth transistor T5, the one labeled G6 is the gate electrode of the sixth transistor T6, the one labeled G7 is the gate electrode of the seventh transistor T7, and the one labeled G8 is the gate electrode of the eighth transistor T8, the one labeled G9 is the gate electrode of the ninth transistor T9, the one labeled G10 is the gate electrode of the tenth transistor T10, and the one labeled G11 is the gate electrode of the eleventh transistor T11, the one labeled Go is the gate electrode of the output transistor To, the one labeled Gf is the gate electrode of the output reset transistor Tf, the one labeled C1*a* is the first electrode plate of the first capacitor C1, and the one labeled C2*a* is the first electrode plate of the second capacitor C2, the one labeled C3*a* is the first electrode plate of the third capacitor C3.

In FIG. 20D, the one labeled C1*b* is the second electrode plate of the first capacitor C1, the one labeled C1*b* is the second electrode plate of the second capacitor C2, and the one labeled C3*b* is the second electrode plate of the third capacitor C3.

In FIG. 20A and FIG. 20E, the one labeled ESTV is the initial voltage line, the one labeled CK is the first clock signal line, the one labeled CB is the second clock signal line, and the one labeled VGL2 is the second low voltage line, the one labeled VGH2 is the second high voltage line, the one labeled VGH is the first high voltage line, the one labeled VGL is the first low voltage line, and the one labeled ECX is the control signal line.

In FIG. 21A, the first transistor is labeled T1, the second transistor is labeled T2, the third transistor is labeled T3, the fourth transistor is labeled T4, and the fifth transistor is labeled T5, the sixth transistor is labeled T6, the seventh transistor is labeled T7, the eighth transistor is labeled T8, the ninth transistor is labeled T9, the tenth transistor is labeled T10, the eleventh transistor is labeled T11, the twelfth transistor is labeled T12, the thirteenth transistor is labeled T13, the fourteenth transistor is labeled T14, the output transistor is labeled To, and the output reset transistor is labeled Tf; the one labeled C1 is the first capacitor, the one labeled C2 is the second capacitor, and the one labeled C3 is the third capacitor.

In FIG. 21B, the one labeled A1 is the active pattern of the first transistor T1, the one labeled A2 is the active pattern of the second transistor T2, and the one labeled A3 is the active pattern of the third transistor T3, the one labeled A4 is the active pattern of the fourth transistor T4, the one labeled A5 is the active pattern of the fifth transistor T5, the one labeled A6 is the active pattern of the sixth transistor T6, the one labeled A7 is the active pattern of the seventh transistor T7, the one labeled A8 is the active pattern of the eighth transistor T8, the one labeled A9 is the active pattern of the ninth transistor T9, the one labeled A10 is the active graphics of the tenth transistor T10, the one labeled A11 is the active pattern of the eleventh transistor T11, the one labeled A12 is the active pattern of the twelfth transistor T12, the one labeled A13 is the active pattern of the thirteenth transistor T13, the one labeled A14 is the active pattern of the fourteenth transistor T14, the one labeled Ao is the active pattern of the output transistor To, and the one labeled Af is the active pattern of the output reset transistor Tf.

In FIG. 21C, the one labeled G1 is the gate electrode of the first transistor T1, the one labeled G2 is the gate electrode of the second transistor T2, the one labeled G3 is the gate electrode of the third transistor T3, and the one labeled G4 is the gate electrode of the fourth transistor T4, the one labeled G5 is the gate electrode of the fifth transistor T5, the one labeled G6 is the gate electrode of the sixth transistor T6, the one labeled G7 is the gate electrode of the seventh transistor T7, and the one labeled G8 is the gate electrode of the eighth transistor T8, the one labeled G9 is the gate electrode of the ninth transistor T9, the one labeled G10 is the gate electrode of the tenth transistor T10, and the one labeled G11 is the gate electrode of the eleventh transistor T11, the one labeled G12 is the gate electrode of the twelfth transistor T12, the one labeled G13 is the gate electrode of the thirteenth transistor T13, the one labeled G14 is the gate electrode of the fourteenth transistor T14, and the one labeled Go is the gate electrode of the output transistor To Gate, the one labeled Gf is the gate electrode of the output reset transistor Tf, the one labeled C1*a* is the first electrode plate of the first capacitor C1, the one labeled C2*a* is the first electrode plate of the second capacitor C2, and the one labeled C2*a* is the first electrode plate of the third capacitor C3.

In FIG. 21D, the one labeled C1*b* is the second electrode plate of the first capacitor C1, the one labeled C2*b* is the second electrode plate of the second capacitor C2, and the one labeled C3*b* is the second electrode plate of the third capacitor C3.

In FIG. 21A and FIG. 21E, the one labeled ESTV is the initial voltage line, the one labeled CK is the first clock signal line, the one labeled CB is the second clock signal line, the one labeled ECX is the control signal line, and the one labeled ECX is the control signal line, the one labeled VGH is the first high voltage line, and the one labeled VGL is the first low voltage line.

In FIG. 21A and FIG. 21F, the one labeled VGH2 is the second high voltage line, and the one labeled VGL2 is the second low voltage line.

The driving method described in the embodiment of the present disclosure is applied to the above-mentioned driving circuit, and the driving method includes:

When the first control circuit controls to connect the first node and the second voltage line under the control of the potential of the second node, controlling, by the output circuit, to disconnect the driving signal terminal from the first voltage line under the control of the potential of the first node.

In the driving method described in the embodiments of the present disclosure, when the first control circuit controls to write the second voltage signal provided by the second voltage line into the first node under the control of the potential of the second node, the output circuit controls to disconnect the control driving signal terminal from the first voltage line under the control of the potential of the first node, so that when the transistor included in the output circuit needs to be turned off, even if the characteristics of the transistor drift, the transistor can also be turned off, there will be no current leakage.

The display substrate described in the embodiment of the present disclosure includes a base substrate, and the above-mentioned driving circuit arranged on the base substrate.

Embodiments of the present disclosure also include a method for manufacturing the display substrate, and the method for manufacturing the display substrate includes:

Forming the base substrate;

Forming the driving circuit described in any one of the above-mentioned embodiments on the base substrate.

In at least one embodiment of the present disclosure, the driving circuit includes an output circuit and an output reset circuit; the output circuit includes an output transistor, and the output reset circuit includes an output reset transistor;

A width-to-length ratio of the output transistor is smaller than a width-to-length ratio of a channel of the output reset transistor.

In specific implementation, by arranging the first high voltage line and the second high voltage line, the width-to-length ratio of the output transistor can be reduced to save layout space, and at the same time, a larger design space for the output reset transistor can be provided.

As shown in FIG. 17A, FIG. 17B, FIG. 18A and FIG. 18B, the width-to-length ratio of the output transistor To is smaller than the width-to-length ratio of the channel of the output reset transistor Tf.

The display substrate according to at least one embodiment of the present disclosure further includes a first voltage line arranged on the base substrate; the driving circuit includes an output circuit and an output reset circuit;

The output circuit and the output reset circuit are arranged on a side of the first voltage line close to the display area;

At least part of the circuits included in the driving circuit other than the output circuit and the output reset circuit are arranged on a side of the first voltage line away from the display area.

As shown in FIG. 17A and FIG. 18A, the first voltage line is a first high voltage line VGH, the output circuit includes an output transistor To, and the output reset circuit includes an output reset transistor Tf;

To and Tf are arranged on a side of the first high voltage line VGH close to the display area;

At least part of the circuits included in the driving circuit except the output transistor To and the output reset transistor Tf are arranged on the side of the first high voltage line VGH away from the display area.

In at least one embodiment of the present disclosure, the display substrate further includes a second voltage line, a third voltage line and a fourth voltage line arranged on the base substrate;

A part of the third voltage line extending along a first direction is arranged on a side of the first voltage line close to the display area;

The output circuit and the output reset circuit are arranged along the first direction;

The second voltage line is arranged between the first voltage line and at least part of a circuit included in the driving circuit other than the output circuit and the output reset circuit;

The fourth voltage line is arranged on a side of at least part of circuits included in the driving circuit other than the output circuit and the output reset circuit away from the display area.

Optionally, the first direction may be a vertical direction.

As shown in FIG. 17A and FIG. 18A, the second voltage line is the second high voltage line VGH2, the third voltage line is the first low voltage line VGL, and the fourth voltage line is the second low voltage line VGL2;

The vertically extended portion of the first low voltage line VGL is arranged on a side of the first high voltage line VGH close to the display area;

The output transistor To and the output reset transistor Tf are arranged vertically;

The second high voltage line VGH2 is arranged between the first high voltage line VGH and at least part of the circuit included in the driving circuit other than the output transistor To and the output reset transistor Tf;

The second low voltage line VGL2 is arranged on a side of at least part of the circuits included in the driving circuit other than the output transistor To and the output reset transistor Tf away from the display area.

In FIG. 17A, at least part of the circuit included in the driving circuit other than the output transistor To and the output reset transistor Tf may include: a first transistor T1, a third transistor T3, a fourth transistor T4, a fifth transistor T5, a sixth transistor T6, a seventh transistor T7, an eighth transistor T8, a ninth transistor T9, a tenth transistor T10, an eleventh transistor T11, a first capacitor C1 and a third capacitor C3.

In FIG. 18A, at least part of the circuit included in the driving circuit other than the output transistor To and the output reset transistor Tf may include: a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, an eleventh transistor T11, a first capacitor C1 and a third capacitor C3.

Optionally, the driving circuit further includes a first control circuit, a third node control circuit, a first node control circuit, a first on-off control circuit, a second node control circuit, a second on-off control circuit and a third control circuit;

The first control circuit includes a first transistor; the third node control circuit includes a third transistor and a fourth transistor, and the first node control circuit includes a fifth transistor, a sixth transistor, a first capacitor, and a second capacitor; the first on-off control circuit includes a seventh transistor; the second node control circuit includes an eighth transistor; the second on-off control circuit includes a ninth transistor; the third control circuit includes a tenth transistor, an eleventh transistor and a third capacitor; the first direction intersects with the second direction;

The sixth transistor and the eleventh transistor are arranged along a first direction; the first transistor and the tenth transistor are arranged along a first direction;

The third transistor and the eighth transistor are arranged along the second direction; the ninth transistor and the seventh transistor are arranged along the second direction; the fourth transistor and the first transistor are arranged along the second direction;

The first capacitor is arranged between the eighth transistor and the sixth transistor; the third capacitor is arranged on a side of the eleventh transistor away from the sixth transistor;

The orthographic projection of the first electrode plate of the second capacitor on the base substrate, the orthographic projection of the second electrode plate of the second capacitor on the base substrate, and the orthographic projection of the first voltage line on the base substrate at least partially overlap; and/or, the orthographic projections of the first electrode plate of the second capacitor on the base substrate, the orthographic projection of the second electrode plate of the second capacitor on the base substrate and the orthographic projection of the second voltage line on the base substrate at least partially overlap.

Optionally, the second direction may be a horizontal direction, but not limited thereto.

In at least one embodiment of the present disclosure, the first voltage line is a first high voltage line VGH, the first control circuit includes a first transistor T1; the third node control circuit includes a third transistor T3 and a fourth transistor T4, the first node control circuit includes a fifth transistor T5, a sixth transistor T6, a first capacitor C1 and a second capacitor C2; the first on-off control circuit includes a seventh transistor T7; the second node control circuit includes the eighth transistor T8; the second on-off control circuit includes a ninth transistor T9; the third control circuit includes a tenth transistor T10, an eleventh transistor T11 and a third capacitor C3;

As shown in FIG. 17A and FIG. 18A, the sixth transistor T6 and the eleventh transistor T11 are arranged in a vertical direction; the first transistor T1 and the tenth transistor T10 are arranged in a vertical direction;

The third transistor T3 and the eighth transistor T8 are arranged along the horizontal direction; the ninth transistor T9 and the seventh transistor T7 are arranged along the horizontal direction; the fourth transistor T4 and the first transistor T1 are arranged along the horizontal direction;

The first capacitor C1 is arranged between the eighth transistor T8 and the sixth transistor T6; the third capacitor C3 is arranged on a side of the eleventh transistor T11 away from the sixth transistor T6;

As shown in FIG. 17A-FIG. 17F and FIG. 18A-FIG. 18F, the orthographic projection of the first electrode plate C2*a* of the second capacitor C2 on the base substrate, the orthographic projection of the second electrode plate C2*b* of the second capacitor C2 on the base substrate at least partially overlaps the orthographic projection of the first high voltage line VGH on the base substrate.

In at least one embodiment of the present disclosure, the orthographic projection of the first electrode plate C2*a* of the second capacitor C2 on the base substrate, the orthographic projection of the second electrode plate C2*b* of the second capacitor C2 on the base substrate at least partially overlap the orthographic projection of the second high voltage line VGH2 on the base substrate.

In at least one embodiment corresponding to FIG. 17A and FIG. 18A, T6 and T11 are arranged in the vertical direction, and T1 and T10 are arranged in the vertical direction, so as to save horizontal space and facilitate the realization of a narrow frame;

T3 and T8 are arranged horizontally, T9 and T7 are arranged horizontally, T4 and T1 are arranged horizontally, the space between T8 and T6 can be used to set the first capacitor C1, and the third capacitor C3 is arranged in the space at the left bottom of T11, transistors and capacitors can be arranged reasonably.

In at least one embodiment of the present disclosure, the driving circuit further includes a second control circuit; the second control circuit includes a second transistor;

The second transistor is arranged between the first capacitor and the third capacitor;

The first capacitor, the second transistor and the third capacitor are arranged along a first direction.

As shown in FIG. 18A-FIG. 18F, the second control circuit includes a second transistor T2;

The second transistor T2 is arranged between the first capacitor C1 and the third capacitor C3;

The first capacitor C1, the second transistor T2 and the third capacitor C3 are arranged in a vertical direction.

In at least one embodiment shown in FIG. 18A, T2 is arranged between C1 and C3, T2 may be a double-gate transistor to reduce current leakage, and C1, T2 and C3 are arranged vertically to narrow the horizontal space, to facilitate the realization of narrow borders.

In at least one embodiment of the present disclosure, the driving circuit further includes a first control circuit, a third node control circuit, a first node control circuit, a first on-off control circuit, a second node control circuit, a second on-off control circuit and a third control circuit;

The first control circuit includes a first transistor; the third node control circuit includes a third transistor and a fourth transistor, and the first node control circuit includes a fifth transistor, a sixth transistor, a first capacitor, and a second capacitor; the first on-off control circuit includes a seventh transistor; the second node control circuit includes an eighth transistor; the second on-off control circuit includes a ninth transistor; the third control circuit includes a tenth transistor, an eleventh transistor and a third capacitor; the first direction intersects with the second direction;

The sixth transistor, the first transistor, and the tenth transistor are arranged along a first direction;

The ninth transistor and the seventh transistor are arranged along a second direction; the first capacitor and the sixth transistor are arranged along a second direction; the eighth transistor and the fifth transistor are arranged along a second direction; the fourth transistor and the first transistor are arranged along a second direction;

The eleventh transistor and the third capacitor are arranged along a first direction;

The orthographic projection of the first electrode plate of the second capacitor on the base substrate, the orthographic projection of the second electrode plate of the second capacitor on the base substrate at least partially overlap the orthographic projection of the first voltage line on the base substrate.

As shown in FIG. 19A, the first control circuit includes a first transistor T1; the third node control circuit includes a third transistor T3 and a fourth transistor T4, and the first node control circuit includes a fifth transistor T5, a sixth transistors T6, a first capacitor C1 and a second capacitor C2; the first on-off control circuit includes a seventh transistor T7; the second node control circuit includes an eighth transistor T8; the second on-off control circuit includes a ninth transistor T9; the third control circuit includes a tenth transistor T10, an eleventh transistor T11 and a third capacitor C3; the first direction can be a vertical direction, and the second direction can be a horizontal direction; the first voltage line is the first high voltage line VGH;

As shown in FIG. 19A-FIG. 19E and FIG. 20A-FIG. 20E, the sixth transistor T6, the first transistor T1 and the tenth transistor T10 are arranged in a vertical direction;

The ninth transistor T9 and the seventh transistor T7 are arranged along the horizontal direction; the first capacitor C1 and the sixth transistor T6 are arranged along the horizontal direction; the eighth transistor T8 and the fifth transistor T5 are arranged along the horizontal direction; the fourth transistor T4 and the first transistor T1 are arranged in the horizontal direction;

The eleventh transistor T11 and the third capacitor C3 are arranged in a vertical direction;

The orthographic projection of the first electrode plate C2*a* of the second capacitor C2 on the base substrate, the orthographic projection of the second electrode plate C2*b* of the second capacitor C2 on the base substrate and the orthographic projection of the first high voltage line VGH on the base substrate at least partially overlap.

In at least one embodiment shown in FIG. 19A and FIG. 20A, T6, T1, and T10 are arranged in the vertical direction, and T11 and C3 are arranged in the vertical direction, so as to narrow the horizontal dimension and facilitate the realization of a narrow frame;

T9 and T7 are arranged in the horizontal direction, C1 and T6 are arranged in the horizontal direction, T8 and T5 are arranged in the horizontal direction, T4 and T1 are arranged in the horizontal direction, so as to arrange transistors and capacitors reasonably;

The orthographic projection of the first electrode plate C2*a* of C2 on the base substrate, the orthographic projection of the second electrode plate C2*b* of C2 on the base substrate and the orthographic projection of the first high voltage line VGH on the base substrate at least partially overlapped so as to be able to narrow the horizontal dimension and facilitate the realization of a narrow border. Optionally, the orthographic projection of the first electrode plate of the third capacitor on the base substrate, the orthographic projection of the second electrode plate of the third capacitor on the base substrate and the orthographic projection of the first voltage line on the base substrate at least partially overlap;

The orthographic projection of the first electrode plate of the third capacitor on the base substrate, the orthographic projection of the second electrode plate of the third capacitor on the base substrate and the orthographic projection of the second voltage line on the base substrate at least partially overlap.

As shown in FIG. 19A-FIG. 19E and FIG. 20A-FIG. 20E, the first voltage line is the first high voltage line VGH, and the second voltage line is the second high voltage line VGH2;

The orthographic projection of the first electrode plate C3*a* of the third capacitor C3 on the base substrate, the orthographic projection of the second electrode plate C3*b* of the third capacitor C3 on the base substrate and the orthographic projection of the first high voltage line VGH on the base substrate partially overlap;

The orthographic projection of the first electrode plate C3*a* of the third capacitor C3 on the base substrate, the orthographic projection of the second electrode plate C3*b* of the third capacitor C3 on the base substrate and the orthographic projection of the second high voltage line VGH2 on the base substrate partially overlap.

In at least one embodiment shown in FIG. 19A and FIG. 20A, the orthographic projection of the first electrode plate C3*a* of C3 on the base substrate, and the orthographic projection of the second electrode plate C3*b* of C3 on the base substrate and the orthographic projection of the first high voltage line VGH on the base substrate partially overlap, the orthographic projection of the first electrode plate C3*a* of C3 on the base substrate, the orthographic projection of the second electrode plate C3*b* of C3 on the base substrate and the orthographic projection of the second high voltage line VGH2 on the base substrate partially overlap, so as to narrow the horizontal dimension and facilitate the realization of a narrow frame.

In at least one embodiment of the present disclosure, the driving circuit further includes a second control circuit; the second control circuit includes a second transistor;

The second transistor is arranged on a side of the eleventh transistor away from the second capacitor.

As shown in FIG. 20A-FIG. 20E, the second control circuit includes a second transistor T2;

The second transistor T2 is arranged on a side of the eleventh transistor T11 away from the second capacitor C2.

In at least one embodiment shown in FIG. 20A, the second control circuit includes a second transistor T2, and the space above T11 can be used to arranged T2, which is beneficial to realize a narrow border.

Optionally, the gate electrode of the second transistor is electrically connected to a control signal line, and the control signal line is arranged on a side of the fourth voltage line away from the display area.

As shown in FIG. 20A-FIG. 20E, the fourth voltage line may be the second low voltage line VGL2, and the gate electrode G2 of the second transistor T2 is electrically connected to the control signal line ECX;

The control signal line ECX is arranged on a side of the second low voltage line VGL2 away from the display area.

In at least one embodiment shown in FIG. 20A, both the gate electrode of T7 and the gate electrode of T9 are electrically connected to the second low voltage line VGL2, and the second low voltage line VGL2 is designed to be adjacent to T9, and T7 is designed to be close to T9, to facilitate the connection between the gate electrode of T7 and the gate electrode of T9 and VGL2.

In at least one embodiment shown in FIG. 17A, FIG. 18A, FIG. 19A and FIG. 20A, the first high voltage line VGH and the second high voltage line VGH2 are arranged adjacent to each other.

As shown in FIG. 21A, the first low voltage line VGL and the second low voltage line VGL2 are arranged adjacent to each other.

In at least one embodiment of the present disclosure, two high voltage lines are arranged to adjacent to each other, or two low voltage lines are arranged to adjacent to each other, so as to avoid electrostatic discharge (ESD) phenomenon caused by adjacent high voltage lines and low voltage lines.

The display substrate according to at least one embodiment of the present disclosure further includes a second voltage line, a third voltage line, a fourth voltage line and a control signal line arranged on the base substrate;

The control signal line, the second voltage line, the fourth voltage line and the third voltage line are arranged on the side of the first voltage line away from the display area; the first voltage line, the control signal line, the second voltage line, the fourth voltage line and the third voltage line are arranged in sequence along a direction away from the display area;

The first voltage line, the control signal line and the third voltage line are arranged on a same layer, the second voltage line and the fourth voltage line are arranged on a same layer, and the first voltage line and the second voltage line are arranged on different layers;

At least part of circuits included in the driving circuit other than the output circuit and the output reset circuit are arranged between the control signal line and the third voltage line.

As shown in FIG. 21A-FIG. 21E, the first voltage line is the first high voltage line VGH, the second voltage line is the second high voltage line VGH2, the third voltage line is the first low voltage line VGL, and the fourth voltage line is the second low voltage line VGL2; the output circuit includes an output transistor To, and the output reset circuit includes an output reset transistor Tf;

ECX, VGH2, VGL2 and VGL are arranged on the side of VGH away from the display area VGH, ECX, VGH2, VGL2 and VGL are arranged in sequence along the direction away from the display area;

VGH, ECX and VGL are arranged on the same layer, and VGH, ECX and VGL are formed on the first source-drain metal layer;

VGH2 and VGL2 are arranged on the same layer, and VGH2 and VGL2 are formed on the second source-drain metal layer;

At least part of circuits included in the driving circuit other than To and Tf are arranged between the control signal line ECX and the first low voltage line VGL.

As shown in FIG. 21A-FIG. 21E, at least part of the circuits included in the driving circuit other than To and Tf include: a first transistor T1, a second transistor T2, a third transistor T3, a fourth transistor T4, a fifth transistor T5, a sixth transistor T6, a seventh transistor T7, an eighth transistor T8, a ninth transistor T9, a tenth transistor T10, an eleventh transistor T11, a twelfth transistor T12, a thirteenth transistor T13, a fourteenth transistor T14, a first capacitor C1 and a third capacitor C3.

Optionally, the driving circuit further includes a first control circuit, a second control circuit, a third node control circuit, a first node control circuit, a first on-off control circuit, a second node control circuit, a second on-off control circuit and a third control circuit;

The first control circuit includes a first transistor; the second control circuit includes a second transistor; the third node control circuit includes a third transistor and a fourth transistor, and the first node control circuit includes a fifth transistor, a sixth transistor, a first capacitor, and a second capacitor; the first on-off control circuit includes a seventh transistor; the second node control circuit includes an eighth transistor; the second on-off control circuit includes a ninth transistor; the third control circuit includes a tenth transistor, an eleventh transistor, a third capacitor, a twelfth transistor, a thirteenth transistor, and a fourteenth transistor; the first direction intersects the second direction;

The eighth transistor, the third transistor and the eleventh transistor are arranged along a first direction;

The sixth transistor, the first transistor, the tenth transistor, and the ninth transistor are arranged along a first direction; the twelfth transistor and the thirteenth transistor are arranged along a first direction; the gate electrode of the fourth transistor and the gate electrode of the seventh transistor are arranged along the first direction;

The gate electrode of the eighth transistor and the gate electrode of the fifth transistor are arranged along the second direction; the gate electrode of the thirteenth transistor and the gate electrode of the seventh transistor are arranged along the second direction;

The fifth transistor, the second transistor and the fourteenth transistor are arranged along a first direction;

The first capacitor and the third capacitor are arranged along a first direction; the second capacitor is arranged on a side of the first voltage line close to the display area.

As shown in FIG. 21A-FIG. 21E, the first control circuit includes a first transistor T1; the second control circuit includes a second transistor T2; the third node control circuit includes a third transistor T3 and a fourth transistor T4, the first node control circuit includes a fifth transistor T5, a sixth transistor T6, a first capacitor C1 and a second capacitor C2; the first on-off control circuit includes a seventh transistor T7; the second node control circuit includes an eighth transistor T8; the second on-off control circuit includes a ninth transistor T9; the third control circuit includes a tenth transistor T10, an eleventh transistor T11, a third capacitor C3, a twelfth transistor T12, a thirteenth transistor T13 and a fourteenth transistor T14; the first direction may be a vertical direction, and the second direction may be a horizontal direction; the first voltage line is a first high voltage line VGH;

The eighth transistor T8, the third transistor T3 and the eleventh transistor T11 are arranged in a vertical direction;

The sixth transistor T6, the first transistor T1, the tenth transistor T10 and the ninth transistor T9 are arranged in a vertical direction;

The twelfth transistor T12 and the thirteenth transistor T13 are arranged in a vertical direction;

The gate electrode G4 of the fourth transistor T4 and the gate electrode G7 of the seventh transistor T7 are arranged in a vertical direction;

The gate electrode G8 of the eighth transistor T8 and the gate electrode G5 of the fifth transistor T5 are arranged in a horizontal direction;

The gate electrode G13 of the thirteenth transistor T13 and the gate electrode G7 of the seventh transistor T7 are arranged in a horizontal direction;

The fifth transistor T5, the second transistor T2 and the fourteenth transistor T14 are arranged in a vertical direction;

The first capacitor C1 and the third capacitor C3 are arranged in a vertical direction; the second capacitor C2 is arranged on a side of the first high voltage line VGH close to the display area.

In at least one embodiment shown in FIG. 21A, T8, T3 and T11 are arranged in the vertical direction, T6, T1, T10 and T9 are arranged in the vertical direction, T12 and T13 are arranged in the vertical direction, and the gate electrode G4 of T4 and the gate electrode G7 of T7 are arranged in the vertical direction, and T5, T2 and T14 are arranged in the vertical direction; C1 and C3 are arranged in the vertical direction, so as to narrow the horizontal space and realize the narrow frame;

The gate electrode G8 of T8 and the gate electrode G5 of T5 are arranged in the horizontal direction; the gate electrode G13 of T13 and the gate electrode G7 of T7 are arranged in the horizontal direction, and the second capacitor C2 is arranged on the side of the first high voltage line VGH close to the display area, to arrange transistors and capacitors reasonably.

In at least one embodiment of the present disclosure, the orthographic projection of the first electrode plate of the third capacitor on the base substrate, the orthographic projection of the second electrode plate of the third capacitor on the base substrate, and the orthographic projection of the fourth voltage line on the base substrate at least partially overlap.

As shown in FIG. 21A-FIG. 21E, the fourth voltage line is the second low voltage line VGL2;

The orthographic projection of the first electrode plate C3*a* of the third capacitor C3 on the base substrate, the orthographic projection of the second electrode plate C3*b* of the third capacitor C3 on the base substrate, and the orthographic projection of the second low voltage line VGL2 on the base substrate partially overlap.

In at least one embodiment shown in FIG. 21A, the orthographic projection of the first electrode plate C3*a* of C3 on the base substrate, the orthographic projection of the second electrode plate C3*b* of C3 on the base substrate and the orthographic projection of the second low voltage line VGL2 on the base substrate partially overlap, so as to narrow the horizontal space and realize a narrow frame.

Optionally, the active layer pattern of the eighth transistor, the active layer pattern of the third transistor, the active layer pattern of the eleventh transistor, the active layer pattern of the sixth transistor, the active layer pattern of the first transistor, the active layer pattern of the tenth transistor and the active layer pattern of the ninth transistor are arranged in the same layer, and the active layer of the eighth transistor and the second voltage line are arranged at different layers;

The orthographic projection of the active layer pattern of the eighth transistor on the base substrate at least partially overlaps the orthographic projection of the fourth voltage line on the base substrate, and the orthographic projection of the active layer pattern of the third transistor on the base substrate at least partially overlaps the orthographic projection of the fourth voltage line on the base substrate, and the orthographic projection of the active layer pattern of the eleventh transistor on the base substrate at least partially overlaps the orthographic projection of the fourth voltage line on the base substrate;

The orthographic projection of the active layer pattern of the sixth transistor on the base substrate at least partially overlaps the orthographic projection of the second voltage line on the base substrate, and the orthographic projection of the active layer pattern of the first transistor on the base substrate at least partially overlaps the orthographic projection of the second voltage line on the base substrate, and the orthographic projection of the active layer pattern of the tenth transistor on the base substrate at least partially overlaps the orthographic projection of the second voltage line on the base substrate, and the orthographic projection of the active layer pattern of the ninth transistor on the base substrate at least partially overlaps with the orthographic projection of the second voltage line on the base substrate.

As shown in FIG. 21A-FIG. 21E, the second voltage line is the second high voltage line VGH2; the fourth voltage line is the second low voltage line VGL2;

The active layer pattern A8 of the eighth transistor, the active layer pattern A3 of the third transistor, the active layer pattern A11 of the eleventh transistor, the active layer pattern A6 of the sixth transistor, the active layer pattern A1 of the first transistor, the active layer pattern A10 of the tenth transistor, and the active layer pattern A9 of the ninth transistor are arranged on the same layer, and the active pattern A8 of the eighth transistor and the second high voltage line VGH2 are arranged on different layers;

The orthographic projection of the active layer pattern A8 of the eighth transistor on the base substrate and the orthographic projection of the second low voltage line VGL2 on the base substrate at least partially overlap, and the orthographic projection of the active layer pattern A3 of the third transistor on the base substrate at least partially overlap the orthographic projection of the second low voltage line VGL2 on the base substrate, and the orthographic projection of the active layer pattern A11 of the eleventh transistor on the base substrate at least partially overlaps the orthographic projection of the second low voltage line VGL2 on the base substrate, so as to narrow the horizontal space and realize a narrow frame;

The orthographic projection of the active layer pattern A6 of the sixth transistor on the base substrate at least partially overlaps the orthographic projection of the second high voltage line VGH2 on the base substrate, and the orthographic projection of the active layer pattern A1 of the first transistor on the base substrate at least partially overlaps the orthographic projection of the second low voltage line VGL2 on the base substrate, and the orthographic projection of the active layer pattern A10 of the tenth transistor on the base substrate at least partially overlaps the orthographic projection of the second low voltage line VGL2 on the base substrate, and the orthographic projection of the active layer pattern A9 of the ninth transistor on the base substrate at least partially overlaps the orthographic projection of the second low voltage line VGL2 on the base substrate, so as to narrow the horizontal space and realize a narrow frame. The display device described in the embodiments of the present disclosure includes the above-mentioned display substrate.

The above descriptions are implementations of the present disclosure. It should be pointed out that those skilled in the art can make some improvements and modifications without departing from the principle of the present disclosure. These improvements and modifications shall also fall within the scope of the present disclosure.

What is claimed is:

1. A driving circuit, comprising an output circuit and a first control circuit; wherein the output circuit is electrically connected to a first node, a first voltage line and a driving signal terminal, and is configured to control to connect or disconnect the driving signal terminal and the first voltage line under the control of a potential of the first node, wherein the first control circuit is respectively electrically connected to a second node, a second voltage line and the first node, and is configured to control to connect or disconnect the first node and the second voltage line under the control of a potential of the second node, wherein the first voltage line is configured to provide a first voltage signal, and the second voltage line is configured to provide a second voltage signal; a potential of the first voltage signal is different from a potential of the second voltage signal, wherein the driving circuit further comprises an output reset circuit; and the output reset circuit is electrically connected to the second node, the driving signal terminal and a third voltage line, and is configured to control to connect or disconnect the driving signal terminal and the third voltage line under the control of the potential of the second node, wherein the driving circuit further comprises a third node control circuit and a first node control circuit, wherein the third node control circuit is electrically connected to a first clock signal line, a fourth voltage line and the third node, and is configured to control to connect or disconnect the third node and the fourth voltage line under the control of a first clock signal provided by the first clock signal line, wherein the first node control circuit is respectively electrically connected to a second clock signal line, the third node and the first node, and is configured to control the potential of the first node under the control of the potential of the third node and a second clock signal provided by the second clock signal line, wherein the third voltage line is configured to provide a third voltage signal, and the fourth voltage line is configured to provide a fourth voltage signal, wherein a potential of the third voltage signal is different from a potential of the fourth voltage signal, wherein the driving circuit further comprises a first on-off control circuit, wherein the third node control circuit is electrically connected to the first control node, and the first control node is electrically connected to the third node through the first on-off control circuit, wherein a control terminal of the first on-off control circuit is electrically connected to a fifth voltage line, and the first on-off control circuit is configured to control to connect or disconnect the first control node and the third node under the control of a fifth voltage signal provided by the fifth voltage line, wherein the fifth voltage line is the third voltage line, the fourth voltage line or the control voltage line, wherein the control voltage line is configured to provide a control voltage, a voltage value of the control voltage is different from a voltage value of the third voltage signal, and the voltage value of the control voltage is different from a voltage value of the fourth voltage signal;

wherein the driving circuit further comprises a third control circuit, wherein the third control circuit is electrically connected to a seventh voltage line, a sixth node, a seventh node, the first control node, the second clock signal line, an eighth voltage line, the first clock signal line, the input terminal and the second node respectively, is configured to control to connect or disconnect the sixth node and the seventh voltage line under the control of the potential of the first control node, and control to connect or disconnect the sixth node and the second clock signal line under the control of a potential of the seventh node, control the potential of the seventh node according to the potential of the sixth node; control to connect or disconnect the second node and the input terminal under the control of the potential of the seventh node, an eighth voltage signal provided by the eighth voltage line and the first clock signal provided by the first clock signal line, and wherein the seventh voltage line is the first voltage line or the second voltage line, and the eighth voltage line is the third voltage line or the fourth voltage line.

2. The driving circuit according to claim 1, wherein the output circuit comprises an output transistor;

a gate electrode of the output transistor is electrically connected to the first node, a first electrode of the output transistor is electrically connected to the first voltage line, and a second electrode of the output transistor is electrically connected to the driving signal terminal;

a width-to-length ratio of the output transistor is less than a width-to-length ratio threshold;

the width-to-length ratio threshold is greater than or equal to 34 and less than or equal to 45.

3. The driving circuit according to claim 1, further comprising a second control circuit; wherein the second control circuit is electrically connected to a control signal line, the second voltage line and the second node, and is configured to control to connect or disconnect the second node and the second voltage line under the control of a control signal provided by the control signal line.

4. The driving circuit according to claim 1, wherein the third node control circuit is further electrically connected to the second node, and is configured to control to connect or disconnect the third node and the first clock signal line under the control of the potential of the second node;

the first node control circuit is further electrically connected to the fourth node, and is configured to control to connect or disconnect the fourth node and the second clock signal line under the control of the potential of the third node, control a potential of the fourth node according to the potential of the third node, and control to connect or disconnect the fourth node and the first node under the control of the second clock signal provided by the second clock signal line, and maintain the potential of the first node.

5. The driving circuit according to claim 1, further comprising a second node control circuit; wherein the second node control circuit is respectively electrically connected to an input terminal, the first clock signal line and the second node, and is configured to control to connect or disconnect the second node and the input terminal under the control of the first clock signal provided by the first clock signal line.

6. The driving circuit according to claim 5, further comprising a second on-off control circuit; wherein the second node control circuit is electrically connected to a second control node, and the second control node is electrically connected to the second node through the second on-off control circuit;

a control terminal of the second on-off control circuit is electrically connected to a sixth voltage line, and the second on-off control circuit is configured to control to connect or disconnect the second control node and the second node under the control of a sixth voltage signal provided by the sixth voltage line;

the sixth voltage line is the third voltage line, the fourth voltage line or the control voltage line;

the control voltage line is configured to provide a control voltage, a voltage value of the control voltage is different from a voltage value of the third voltage signal, and the voltage value of the control voltage is different from a voltage value of the fourth voltage signal.

7. The driving circuit according to claim 1, wherein the first control circuit comprises a first transistor;

a gate electrode of the first transistor is electrically connected to the second node, a first electrode of the first transistor is electrically connected to the second voltage line, and a second electrode of the first transistor is electrically connected to the first node.

8. The driving circuit according to claim 3, wherein the output reset circuit comprises an output reset transistor, and the second control circuit comprises a second transistor;

a gate electrode of the output reset transistor is electrically connected to the second node, a first electrode of the output reset transistor is electrically connected to the driving signal terminal, and a second electrode of the output reset transistor is connected to the third voltage line;

a gate electrode of the second transistor is electrically connected to the control signal line, a first electrode of the second transistor is electrically connected to the second voltage line, and a second electrode of the second transistor is electrically connected to the second node.

9. The driving circuit according to claim 4, wherein the third node control circuit includes a third transistor and a fourth transistor, and the first node control circuit includes a fifth transistor, a sixth transistor, a first capacitor, and a second capacitor;

a gate electrode of the third transistor is electrically connected to the first clock signal line, a first electrode of the third transistor is electrically connected to the fourth voltage line, and a second electrode of the third transistor is electrically connected to the third node;

a gate electrode of the fourth transistor is electrically connected to the second node, a first electrode of the fourth transistor is electrically connected to the first clock signal line, and a second electrode of the fourth transistor is electrically connected to the third node;

a gate electrode of the fifth transistor is electrically connected to the third node, a first electrode of the fifth transistor is electrically connected to the second clock signal line, a second electrode of the fifth transistor is electrically connected to the fourth node;

a gate electrode of the sixth transistor is electrically connected to the second clock signal line, a first electrode of the sixth transistor is electrically connected to the fourth node, and a second electrode of the sixth transistor is electrically connected to the first node;

a first electrode plate of the first capacitor is electrically connected to the third node, and a second electrode plate of the first capacitor is electrically connected to the fourth node;

a first electrode plate of the second capacitor is electrically connected to the first node, and a second electrode plate of the second capacitor is electrically connected to the first voltage line.

10. The driving circuit according to claim 1, wherein the first on-off control circuit comprises a seventh transistor;

a gate electrode of the seventh transistor is electrically connected to the fifth voltage line, a first electrode of the seventh transistor is electrically connected to the first control node, and a second electrode of the seventh transistor is electrically connected to the third node.

11. The driving circuit according to claim 5, wherein the second node control circuit comprises an eighth transistor;

a gate electrode of the eighth transistor is electrically connected to the first clock signal line, a first electrode of the eighth transistor is electrically connected to the input terminal, and a second electrode of the eighth transistor is electrically connected to the second node.

12. The driving circuit according to claim 6, wherein the second on-off control circuit comprises a ninth transistor;

a gate electrode of the ninth transistor is electrically connected to the sixth voltage line, a first electrode of the ninth transistor is electrically connected to the second control node, and a second electrode of the ninth transistor is electrically connected to the second node.

13. The driving circuit according to claim 1, wherein the third control circuit includes a tenth transistor, an eleventh transistor, a third capacitor, a twelfth transistor, a thirteenth transistor, and a fourteenth transistor;

a gate electrode of the tenth transistor is electrically connected to the first control node, a first electrode of the tenth transistor is electrically connected to the seventh voltage line, and a second electrode of the tenth transistor is electrically connected to the sixth node;

a gate electrode of the eleventh transistor is electrically connected to the seventh node, a first electrode of the eleventh transistor is electrically connected to the sixth node, a second electrode of the eleventh transistor is electrically connected to the second clock signal line;

a first electrode plate of the third capacitor is electrically connected to the seventh node, and a second electrode plate of the third capacitor is electrically connected to the sixth node;

a gate electrode of the twelfth transistor is electrically connected to the first clock signal line, a first electrode of the twelfth transistor is electrically connected to the input terminal, and a second electrode of the twelfth transistor is electrically connected to a first electrode of the thirteen transistor;

a gate electrode of the thirteenth transistor is electrically connected to the eighth voltage line, and a second electrode of the thirteenth transistor is electrically connected to a first electrode of the fourteenth transistor;

a gate electrode of the fourteenth transistor is electrically connected to the seventh node, and a second electrode of the fourteenth transistor is electrically connected to the second node.

14. A driving method applied to the driving circuit according to claim 1, comprising:

when the first control circuit controls to connect the first node and the second voltage line under the control of the potential of the second node, controlling, by the output circuit, to disconnect the driving signal terminal from the first voltage line under the control of the potential of the first node.

* * * * *